US011877308B2

(12) United States Patent
Iyer et al.

(10) Patent No.: US 11,877,308 B2
(45) Date of Patent: Jan. 16, 2024

(54) FRAME STRUCTURE IN NR

(71) Applicant: InterDigital Patent Holdings, Inc., Wilmington, DE (US)

(72) Inventors: Lakshmi R. Iyer, King of Prussia, PA (US); Allan Y. Tsai, Boonton, NJ (US); Tianyi Xu, San Jose, CA (US); Guodong Zhang, Woodbury, NY (US); Pascal M. Adjakple, Great Neck, NY (US); Ahmed ElSamadouny, Austin, TX (US); Salam Khan, Richardson, TX (US); Yifan Li, Conshohocken, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 17/870,284

(22) Filed: Jul. 21, 2022

(65) Prior Publication Data
US 2022/0361180 A1  Nov. 10, 2022

Related U.S. Application Data

(63) Continuation of application No. 17/132,026, filed on Dec. 23, 2020, now Pat. No. 11,438,905, which is a
(Continued)

(51) Int. Cl.
*H04W 72/08* (2009.01)
*H04W 72/541* (2023.01)
(Continued)

(52) U.S. Cl.
CPC ........ *H04W 72/541* (2023.01); *H04B 7/0421* (2013.01); *H04B 7/0452* (2013.01);
(Continued)

(58) Field of Classification Search
CPC ............. H04W 72/082; H04W 72/042; H04W 72/1284; H04W 72/0446; H04B 7/0421; H04B 7/0452; H04L 5/0051; H04L 5/005
See application file for complete search history.

(56) References Cited

U.S. PATENT DOCUMENTS

| 934,888 A | 9/1909 | Dahlberg |
| 4,892,292 A | 1/1990 | Russell |

(Continued)

FOREIGN PATENT DOCUMENTS

| CN | 101313578 A | 11/2008 |
| CN | 101331735 A | 12/2008 |

(Continued)

OTHER PUBLICATIONS

3rd Generation Partnership Project (3GPP) TSG RAN WG1 #85, R1-165669, Way Forward on Frame Structure, Qualcomm and etc., Nanjing, China, May 23-27, 2016, Agenda Item 7.1.4, 2 pages.
(Continued)

*Primary Examiner* — Jamal Javaid
(74) *Attorney, Agent, or Firm* — BakerHostetler

(57) ABSTRACT

The present application at least describes a frame structure in new radio. The frame structure includes a self-contained transmission time interval. The transmission time interval includes a control information region including plural beams. The interval also includes a downlink transmission channel region including plural beams. The frame structure is configured for downlink control information to be swept through the time interval. The frame structure is also configured for an uplink or downlink grant resource subsequently to be swept through the time interval. The present application is also directed to a method for configuring user equipment.

21 Claims, 41 Drawing Sheets

Related U.S. Application Data continuation of application No. 16/346,972, filed as application No. PCT/US2017/059890 on Nov. 3, 2017, now Pat. No. 10,932,276.

(60) Provisional application No. 62/416,902, filed on Nov. 3, 2016.

(51) Int. Cl.
*H04B 7/0417* (2017.01)
*H04B 7/0452* (2017.01)
*H04L 5/00* (2006.01)
*H04W 72/0446* (2023.01)
*H04L 5/14* (2006.01)
*H04B 7/06* (2006.01)
*H04W 72/21* (2023.01)
*H04W 72/23* (2023.01)

(52) U.S. Cl.
CPC ............ *H04B 7/06* (2013.01); *H04B 7/0617* (2013.01); *H04B 7/0626* (2013.01); *H04B 7/0695* (2013.01); *H04L 5/005* (2013.01); *H04L 5/0023* (2013.01); *H04L 5/0051* (2013.01); *H04L 5/0053* (2013.01); *H04L 5/1469* (2013.01); *H04W 72/0446* (2013.01); *H04W 72/21* (2023.01); *H04W 72/23* (2023.01)

(56) References Cited

U.S. PATENT DOCUMENTS

| | | |
|---|---|---|
| 5,610,653 A | 3/1997 | Abecassis |
| 5,892,554 A | 4/1999 | Dicicco et al. |
| 6,750,919 B1 | 6/2004 | Rosser |
| 6,973,130 B1 | 12/2005 | Wee et al. |
| 7,114,174 B1 | 9/2006 | Brooks et al. |
| 7,117,517 B1 | 10/2006 | Milazzo et al. |
| 7,343,617 B1 | 3/2008 | Katcher et al. |
| 7,577,980 B2 | 8/2009 | Kienzle et al. |
| 7,782,344 B2 | 8/2010 | Whittaker |
| 7,949,032 B1 | 5/2011 | Frost |
| 8,055,785 B2 | 11/2011 | Liu et al. |
| 8,160,077 B2 | 4/2012 | Traversat et al. |
| 8,243,797 B2 | 8/2012 | Lin et al. |
| 8,331,760 B2 | 12/2012 | Butcher |
| 8,621,000 B2 | 12/2013 | Adimatyam et al. |
| 8,705,527 B1 | 4/2014 | Addepalli et al. |
| 8,902,773 B2 | 12/2014 | Anderson et al. |
| 9,002,979 B2 | 4/2015 | Hansen |
| 9,047,236 B2 | 6/2015 | Gigliotti |
| 9,060,187 B2 | 6/2015 | Wu et al. |
| 9,064,313 B2 | 6/2015 | Seshadrinathan et al. |
| 9,137,027 B2 | 9/2015 | Matthews et al. |
| 9,170,707 B1 | 10/2015 | Aska et al. |
| 9,177,225 B1 | 11/2015 | Cordova-Diba et al. |
| 9,198,181 B2 | 11/2015 | Blankenship et al. |
| 9,231,838 B2 | 1/2016 | Ould-Brahim et al. |
| 9,276,710 B2 | 3/2016 | Damnjanovic et al. |
| 9,288,545 B2 | 3/2016 | Hill et al. |
| 9,317,688 B2 | 4/2016 | Yegin et al. |
| 9,336,060 B2 | 5/2016 | Nori et al. |
| 9,338,700 B2 | 5/2016 | Schulist et al. |
| 9,344,888 B2 | 5/2016 | Starsinic et al. |
| 9,380,623 B2 | 6/2016 | Kim et al. |
| 9,413,451 B2 | 8/2016 | Park et al. |
| 9,559,797 B2 | 1/2017 | Liao et al. |
| 9,992,553 B2 | 6/2018 | Bennett et al. |
| 10,028,302 B2 | 7/2018 | Au et al. |
| 10,111,163 B2 | 10/2018 | Vrzic et al. |
| 10,306,671 B2 | 5/2019 | Li et al. |
| 10,432,362 B2 | 10/2019 | Iyer et al. |
| 10,530,757 B2 | 1/2020 | Seed et al. |
| 10,979,924 B2 | 4/2021 | Tooher et al. |
| 11,051,293 B2 | 6/2021 | Tsai et al. |
| 11,122,027 B2 | 9/2021 | Seed et al. |
| 11,218,267 B2 | 1/2022 | Zhang et al. |
| 2002/0065678 A1 | 5/2002 | Peliotis et al. |
| 2002/0120931 A1 | 8/2002 | Hiuber et al. |
| 2002/0126990 A1 | 9/2002 | Rasmussen et al. |
| 2002/0174425 A1 | 11/2002 | Markel et al. |
| 2004/0032495 A1 | 2/2004 | Ortiz |
| 2004/0190779 A1 | 9/2004 | Sarachik et al. |
| 2005/0093976 A1 | 5/2005 | Valleriano et al. |
| 2005/0286466 A1 | 12/2005 | Tagg et al. |
| 2006/0155842 A1 | 7/2006 | Yeung et al. |
| 2006/0193295 A1 | 8/2006 | White et al. |
| 2007/0024706 A1 | 2/2007 | Brannon et al. |
| 2007/0042784 A1 | 2/2007 | Anderson |
| 2007/0086669 A1 | 4/2007 | Berger et al. |
| 2007/0101418 A1 | 5/2007 | Wood et al. |
| 2007/0104369 A1 | 5/2007 | Weatherhead |
| 2007/0140106 A1 | 6/2007 | Tsai et al. |
| 2007/0153739 A1 | 7/2007 | Zheng |
| 2007/0171921 A1 | 7/2007 | Wookey et al. |
| 2008/0127253 A1 | 5/2008 | Zhang et al. |
| 2008/0205351 A1 | 8/2008 | Bengt et al. |
| 2008/0225116 A1 | 9/2008 | Kang et al. |
| 2008/0261711 A1 | 10/2008 | Tuxen |
| 2009/0007023 A1 | 1/2009 | Sundstrom |
| 2009/0046152 A1 | 2/2009 | Aman |
| 2009/0047902 A1 | 2/2009 | Nory et al. |
| 2009/0197630 A1 | 8/2009 | Ahn et al. |
| 2009/0201917 A1 | 8/2009 | Maes et al. |
| 2009/0217339 A1 | 8/2009 | Kim et al. |
| 2009/0220080 A1 | 9/2009 | Herne et al. |
| 2009/0225164 A1 | 9/2009 | Renkis |
| 2009/0276805 A1 | 11/2009 | Andrews et al. |
| 2009/0298497 A1 | 12/2009 | Lee |
| 2009/0300692 A1 | 12/2009 | Mavlankar et al. |
| 2009/0305708 A1 | 12/2009 | Matsui et al. |
| 2009/0316795 A1 | 12/2009 | Chui et al. |
| 2009/0323607 A1 | 12/2009 | Park et al. |
| 2010/0027466 A1 | 2/2010 | Mustapha |
| 2010/0035611 A1 | 2/2010 | Montojo et al. |
| 2010/0061361 A1 | 3/2010 | Wu |
| 2010/0097221 A1 | 4/2010 | Kreiner et al. |
| 2010/0188531 A1 | 7/2010 | Cordes et al. |
| 2010/0227611 A1 | 9/2010 | Schmidt et al. |
| 2010/0232504 A1 | 9/2010 | Feng |
| 2011/0013836 A1 | 1/2011 | Gefen et al. |
| 2011/0016321 A1 | 1/2011 | Sundaram et al. |
| 2011/0077013 A1 | 3/2011 | Cho et al. |
| 2011/0113480 A1 | 5/2011 | Ma et al. |
| 2011/0222428 A1 | 9/2011 | Charbit et al. |
| 2011/0231653 A1 | 9/2011 | Bollay et al. |
| 2011/0242997 A1 | 10/2011 | Yin |
| 2011/0263250 A1 | 10/2011 | Mueck et al. |
| 2011/0299832 A1 | 12/2011 | Butcher |
| 2011/0304772 A1 | 12/2011 | Dasher et al. |
| 2012/0009963 A1 | 1/2012 | Kim et al. |
| 2012/0047551 A1 | 2/2012 | Pattar et al. |
| 2012/0056898 A1 | 3/2012 | Tsurumi et al. |
| 2012/0062732 A1 | 3/2012 | Marman et al. |
| 2012/0072952 A1 | 3/2012 | Vaysman et al. |
| 2012/0078712 A1 | 3/2012 | Fontana et al. |
| 2012/0117140 A1 | 5/2012 | Wang et al. |
| 2012/0127934 A1 | 5/2012 | Anderson et al. |
| 2012/0163335 A1 | 6/2012 | Chung et al. |
| 2012/0238264 A1 | 9/2012 | Jindal |
| 2012/0308202 A1 | 12/2012 | Murata et al. |
| 2013/0003576 A1 | 1/2013 | Segura et al. |
| 2013/0016910 A1 | 1/2013 | Murata et al. |
| 2013/0017833 A1 | 1/2013 | Sakamoto et al. |
| 2013/0031582 A1 | 1/2013 | Tinsman et al. |
| 2013/0034071 A1 | 2/2013 | Lee et al. |
| 2013/0036442 A1 | 2/2013 | Wingert |
| 2013/0077574 A1 | 3/2013 | Ekpenyong et al. |
| 2013/0091430 A1 | 4/2013 | Zhai et al. |
| 2013/0091515 A1 | 4/2013 | Sakata et al. |
| 2013/0111609 A1 | 5/2013 | Resch et al. |
| 2013/0142118 A1 | 6/2013 | Cherian et al. |
| 2013/0155106 A1 | 6/2013 | Rolleston et al. |

(56) References Cited

U.S. PATENT DOCUMENTS

| | | |
|---|---|---|
| 2013/0155847 A1 | 6/2013 | Li et al. |
| 2013/0167062 A1 | 6/2013 | Herring et al. |
| 2013/0185353 A1 | 7/2013 | Rondao et al. |
| 2013/0188503 A1 | 7/2013 | Anepu et al. |
| 2013/0223339 A1 | 8/2013 | Nakahara |
| 2013/0225184 A1 | 8/2013 | Liu et al. |
| 2013/0225189 A1 | 8/2013 | Moon et al. |
| 2013/0242882 A1 | 9/2013 | Blankenship et al. |
| 2013/0246784 A1 | 9/2013 | Zhang et al. |
| 2013/0265932 A1 | 10/2013 | Huang et al. |
| 2013/0266286 A1 | 10/2013 | Yu et al. |
| 2013/0294506 A1 | 11/2013 | Kang et al. |
| 2013/0312042 A1 | 11/2013 | Shaw et al. |
| 2013/0342539 A1 | 12/2013 | Khan et al. |
| 2014/0022074 A1 | 1/2014 | Balinski et al. |
| 2014/0026052 A1 | 1/2014 | Thorwirth et al. |
| 2014/0029462 A1 | 1/2014 | Stewart |
| 2014/0033074 A1 | 1/2014 | Thibaux et al. |
| 2014/0036806 A1 | 2/2014 | Chen et al. |
| 2014/0059457 A1 | 2/2014 | Min |
| 2014/0082054 A1 | 3/2014 | Denoual et al. |
| 2014/0086177 A1 | 3/2014 | Adjakple et al. |
| 2014/0086217 A1 | 3/2014 | Park et al. |
| 2014/0089990 A1 | 3/2014 | Van et al. |
| 2014/0126402 A1* | 5/2014 | Nam .................. H04B 7/0452 370/252 |
| 2014/0168056 A1 | 6/2014 | Swaminathan et al. |
| 2014/0195918 A1 | 7/2014 | Friedlander |
| 2014/0204247 A1 | 7/2014 | Bilgen et al. |
| 2014/0204854 A1 | 7/2014 | Freda et al. |
| 2014/0206854 A1 | 7/2014 | Bennett et al. |
| 2014/0215043 A1 | 7/2014 | Ryu et al. |
| 2014/0223095 A1 | 8/2014 | Storm et al. |
| 2014/0245367 A1 | 8/2014 | Sasaki et al. |
| 2014/0254544 A1 | 9/2014 | Kar et al. |
| 2014/0269932 A1 | 9/2014 | Su et al. |
| 2014/0279068 A1 | 9/2014 | Systrom et al. |
| 2014/0280781 A1 | 9/2014 | Gregotski |
| 2014/0282751 A1 | 9/2014 | Lee et al. |
| 2014/0282909 A1 | 9/2014 | Cherian et al. |
| 2014/0293901 A1 | 10/2014 | Hegde |
| 2014/0293942 A1 | 10/2014 | Kang et al. |
| 2014/0314100 A1 | 10/2014 | Song |
| 2014/0315593 A1 | 10/2014 | Vrzic et al. |
| 2014/0321375 A1 | 10/2014 | Agiwal et al. |
| 2014/0351891 A1 | 11/2014 | Grube et al. |
| 2014/0369201 A1 | 12/2014 | Gupta et al. |
| 2015/0014773 A1 | 1/2015 | Cheng et al. |
| 2015/0032901 A1 | 1/2015 | Wang et al. |
| 2015/0033312 A1 | 1/2015 | Seed et al. |
| 2015/0043520 A1 | 2/2015 | Sun et al. |
| 2015/0070587 A1 | 3/2015 | Emeott et al. |
| 2015/0089023 A1 | 3/2015 | Phillips et al. |
| 2015/0089072 A1 | 3/2015 | Phillips et al. |
| 2015/0103725 A1 | 4/2015 | Sun et al. |
| 2015/0104155 A1 | 4/2015 | Bloch et al. |
| 2015/0145782 A1 | 5/2015 | Brown et al. |
| 2015/0179219 A1 | 6/2015 | Gao et al. |
| 2015/0208103 A1 | 7/2015 | Guntur et al. |
| 2015/0222815 A1 | 8/2015 | Wang et al. |
| 2015/0223279 A1 | 8/2015 | Jiao et al. |
| 2015/0234708 A1 | 8/2015 | Storm et al. |
| 2015/0264096 A1 | 9/2015 | Swaminathan et al. |
| 2015/0268822 A1 | 9/2015 | Waggoner et al. |
| 2015/0282130 A1 | 10/2015 | Webb et al. |
| 2015/0296250 A1 | 10/2015 | Casper |
| 2015/0304693 A1 | 10/2015 | Hwang et al. |
| 2015/0326353 A1 | 11/2015 | Ko et al. |
| 2015/0326484 A1 | 11/2015 | Cao et al. |
| 2015/0327245 A1 | 11/2015 | Zhu et al. |
| 2015/0341091 A1 | 11/2015 | Park et al. |
| 2015/0348247 A1 | 12/2015 | McLaughlin et al. |
| 2015/0351084 A1 | 12/2015 | Werb |
| 2015/0382262 A1 | 12/2015 | Cho et al. |
| 2015/0382268 A1 | 12/2015 | Hampel et al. |
| 2016/0020877 A1 | 1/2016 | Koutsimanis et al. |
| 2016/0036578 A1 | 2/2016 | Malladi et al. |
| 2016/0042496 A1 | 2/2016 | Ichimi et al. |
| 2016/0057494 A1 | 2/2016 | Hwang et al. |
| 2016/0073106 A1 | 3/2016 | Su et al. |
| 2016/0073302 A1 | 3/2016 | Yang et al. |
| 2016/0100395 A1 | 4/2016 | Xu et al. |
| 2016/0113039 A1 | 4/2016 | Hole et al. |
| 2016/0135153 A1 | 5/2016 | Suzuki et al. |
| 2016/0156397 A1 | 6/2016 | Onggosanusi et al. |
| 2016/0156949 A1 | 6/2016 | Hattori et al. |
| 2016/0165309 A1 | 6/2016 | Van et al. |
| 2016/0165622 A1 | 6/2016 | Luo et al. |
| 2016/0182201 A1 | 6/2016 | Jiang et al. |
| 2016/0182593 A1 | 6/2016 | Denoual et al. |
| 2016/0183234 A1 | 6/2016 | Sung et al. |
| 2016/0192433 A1 | 6/2016 | Deenoo et al. |
| 2016/0217623 A1 | 7/2016 | Singh |
| 2016/0234736 A1 | 8/2016 | Kubota et al. |
| 2016/0234759 A1 | 8/2016 | Kubota et al. |
| 2016/0249269 A1 | 8/2016 | Niu et al. |
| 2016/0249353 A1 | 8/2016 | Nakata et al. |
| 2016/0253240 A1 | 9/2016 | Cocagne |
| 2016/0270102 A1 | 9/2016 | Zeng et al. |
| 2016/0306036 A1 | 10/2016 | Johnson |
| 2016/0337706 A1 | 11/2016 | Hwang et al. |
| 2016/0344464 A1 | 11/2016 | Kim |
| 2016/0352545 A1 | 12/2016 | Johnson |
| 2016/0353343 A1 | 12/2016 | Rahman et al. |
| 2016/0353465 A1 | 12/2016 | Vrzic et al. |
| 2016/0360235 A1 | 12/2016 | Ramasubramonian et al. |
| 2016/0366454 A1 | 12/2016 | Tatourian et al. |
| 2017/0013598 A1 | 1/2017 | Jung et al. |
| 2017/0034845 A1 | 2/2017 | Liu et al. |
| 2017/0070735 A1 | 3/2017 | Ramasubramonian et al. |
| 2017/0080158 A1 | 3/2017 | Cabiri et al. |
| 2017/0118054 A1 | 4/2017 | Ma et al. |
| 2017/0118540 A1 | 4/2017 | Thomas et al. |
| 2017/0134913 A1 | 5/2017 | Cui et al. |
| 2017/0136948 A1 | 5/2017 | Sypitkowski et al. |
| 2017/0163645 A1 | 6/2017 | Bradley et al. |
| 2017/0164212 A1 | 6/2017 | Opsenica et al. |
| 2017/0164349 A1 | 6/2017 | Zhu et al. |
| 2017/0201686 A1 | 7/2017 | Choi et al. |
| 2017/0201968 A1 | 7/2017 | Nam et al. |
| 2017/0201980 A1 | 7/2017 | Hakola et al. |
| 2017/0212583 A1 | 7/2017 | Krasadakis |
| 2017/0230915 A1 | 8/2017 | Kim et al. |
| 2017/0230985 A1 | 8/2017 | Yamada et al. |
| 2017/0236288 A1 | 8/2017 | Sundaresan et al. |
| 2017/0244529 A1 | 8/2017 | Yu et al. |
| 2017/0273063 A1 | 9/2017 | Kim et al. |
| 2017/0289791 A1 | 10/2017 | Yoo et al. |
| 2017/0290052 A1 | 10/2017 | Zhang et al. |
| 2017/0302719 A1 | 10/2017 | Chen et al. |
| 2017/0310431 A1 | 10/2017 | Iyer et al. |
| 2017/0331670 A1 | 11/2017 | Parkvall et al. |
| 2017/0331785 A1 | 11/2017 | Xu et al. |
| 2017/0359731 A1 | 12/2017 | Soldati et al. |
| 2017/0366311 A1 | 12/2017 | Iyer et al. |
| 2018/0034612 A1 | 2/2018 | Lin et al. |
| 2018/0076994 A1 | 3/2018 | Lee et al. |
| 2018/0115357 A1 | 4/2018 | Park et al. |
| 2018/0123763 A1 | 5/2018 | Yu |
| 2018/0124598 A1 | 5/2018 | Zeng |
| 2018/0139656 A1 | 5/2018 | Xu et al. |
| 2018/0167938 A1 | 6/2018 | Stephenne et al. |
| 2018/0184415 A1 | 6/2018 | Rong et al. |
| 2018/0198504 A1 | 7/2018 | Li et al. |
| 2018/0199361 A1 | 7/2018 | Zhang et al. |
| 2018/0220407 A1 | 8/2018 | Xiong et al. |
| 2018/0242304 A1 | 8/2018 | Rong et al. |
| 2018/0254851 A1 | 9/2018 | Roessel et al. |
| 2018/0270696 A1 | 9/2018 | Duan et al. |
| 2018/0270698 A1 | 9/2018 | Babaei et al. |
| 2018/0287722 A1 | 10/2018 | Takano |
| 2018/0294860 A1 | 10/2018 | Hakola et al. |
| 2018/0317213 A1 | 11/2018 | Islam et al. |
| 2018/0332632 A1 | 11/2018 | Vikberg et al. |

(56) References Cited

U.S. PATENT DOCUMENTS

| | | | |
|---|---|---|---|
| 2018/0338277 A1 | 11/2018 | Byun et al. |
| 2018/0343043 A1 | 11/2018 | Hakola et al. |
| 2018/0367255 A1 | 12/2018 | Jeon et al. |
| 2018/0368018 A1 | 12/2018 | Kim et al. |
| 2019/0036910 A1 | 1/2019 | Choyi et al. |
| 2019/0037409 A1 | 1/2019 | Wang et al. |
| 2019/0045340 A1 | 2/2019 | Zhu et al. |
| 2019/0045577 A1 | 2/2019 | Kim et al. |
| 2019/0089423 A1 | 3/2019 | Davydov |
| 2019/0090284 A1 | 3/2019 | Kang et al. |
| 2019/0159107 A1 | 5/2019 | Kim et al. |
| 2019/0182856 A1 | 6/2019 | Moroga et al. |
| 2019/0190579 A1 | 6/2019 | Wang et al. |
| 2019/0200315 A1 | 6/2019 | Tsai et al. |
| 2019/0208474 A1 | 7/2019 | Ali et al. |
| 2019/0224474 A1 | 7/2019 | Yang et al. |
| 2019/0281623 A1 | 9/2019 | Andgart et al. |
| 2019/0288789 A1 | 9/2019 | Li et al. |
| 2019/0342782 A1 | 11/2019 | Yum et al. |
| 2019/0363777 A1 | 11/2019 | Karjalainen et al. |
| 2020/0021999 A1 | 1/2020 | Park et al. |
| 2020/0059969 A1 | 2/2020 | Agiwal |
| 2020/0092065 A1 | 3/2020 | Kuang et al. |
| 2020/0221480 A1 | 7/2020 | Li et al. |
| 2020/0351917 A1 | 11/2020 | Bang et al. |
| 2020/0359391 A1 | 11/2020 | Behravan et al. |
| 2020/0383129 A1 | 12/2020 | Ko et al. |
| 2020/0404655 A1 | 12/2020 | Salem |
| 2020/0404663 A1 | 12/2020 | Zhang et al. |
| 2021/0021314 A1 | 1/2021 | Sun et al. |
| 2021/0029646 A1 | 1/2021 | Park |
| 2021/0037561 A1 | 2/2021 | Lyu et al. |
| 2021/0044385 A1 | 2/2021 | Hosseini et al. |
| 2021/0045125 A1 | 2/2021 | Mondal et al. |
| 2021/0045181 A1 | 2/2021 | Li et al. |
| 2021/0051646 A1 | 2/2021 | Maaref et al. |
| 2021/0068138 A1 | 3/2021 | Baldemair et al. |
| 2021/0105104 A1 | 4/2021 | Cao et al. |
| 2021/0105833 A1 | 4/2021 | Reda et al. |
| 2021/0130629 A1 | 5/2021 | Suzuki et al. |

FOREIGN PATENT DOCUMENTS

| | | |
|---|---|---|
| CN | 101350923 A | 1/2009 |
| CN | 101622891 A | 1/2010 |
| CN | 101690271 A | 3/2010 |
| CN | 101868273 A | 10/2010 |
| CN | 101917765 A | 12/2010 |
| CN | 102026270 A | 4/2011 |
| CN | 102038998 A | 5/2011 |
| CN | 102045849 A | 5/2011 |
| CN | 102090126 A | 6/2011 |
| CN | 102238547 A | 11/2011 |
| CN | 102474394 A | 5/2012 |
| CN | 102577294 A | 7/2012 |
| CN | 102726109 A | 10/2012 |
| CN | 102752877 A | 10/2012 |
| CN | 102907068 A | 1/2013 |
| CN | 102939573 A | 2/2013 |
| CN | 102971032 A | 3/2013 |
| CN | 103069739 A | 4/2013 |
| CN | 103190089 A | 7/2013 |
| CN | 103560936 A | 2/2014 |
| CN | 103563462 A | 2/2014 |
| CN | 103944686 A | 7/2014 |
| CN | 104012106 A | 8/2014 |
| CN | 104052788 A | 9/2014 |
| CN | 104092488 A | 10/2014 |
| CN | 104205930 A | 12/2014 |
| CN | 104220975 A | 12/2014 |
| CN | 104394558 A | 3/2015 |
| CN | 104753780 A | 7/2015 |
| CN | 104782166 A | 7/2015 |
| CN | 104838713 A | 8/2015 |
| CN | 104869583 A | 8/2015 |
| CN | 104936189 A | 9/2015 |
| CN | 105050189 A | 11/2015 |
| CN | 105103566 A | 11/2015 |
| CN | 105144727 A | 12/2015 |
| CN | 105162557 A | 12/2015 |
| CN | 105264904 A | 1/2016 |
| CN | 105284172 A | 1/2016 |
| CN | 105323049 A | 2/2016 |
| CN | 105373331 A | 3/2016 |
| CN | 105471487 A | 4/2016 |
| CN | 105532050 A | 4/2016 |
| CN | 106023261 A | 10/2016 |
| CN | 106233745 A | 12/2016 |
| CN | 106416223 A | 2/2017 |
| CN | 107007910 A | 8/2017 |
| EP | 0246076 A1 | 11/1987 |
| EP | 1175785 A1 | 1/2002 |
| EP | 2086266 A2 | 8/2009 |
| EP | 2408196 A1 | 1/2012 |
| EP | 2426645 A1 | 3/2012 |
| EP | 2464076 A2 | 6/2012 |
| EP | 2530675 A2 | 12/2012 |
| EP | 2553860 A1 | 2/2013 |
| EP | 2710844 A1 | 3/2014 |
| EP | 2824883 A1 | 1/2015 |
| EP | 2824885 A1 | 1/2015 |
| EP | 2869478 A1 | 5/2015 |
| EP | 2882110 A1 | 6/2015 |
| EP | 2919471 A1 | 9/2015 |
| EP | 3051906 A1 | 8/2016 |
| EP | 3076672 A1 | 10/2016 |
| EP | 3082362 A1 | 10/2016 |
| EP | 3101971 A1 | 12/2016 |
| EP | 3110160 A1 | 12/2016 |
| EP | 3420659 A1 | 1/2019 |
| JP | 63-013503 A | 1/1988 |
| JP | 02-464076 A | 2/1990 |
| JP | 2004-104351 A | 4/2004 |
| JP | 2007-192988 A | 8/2007 |
| JP | 2010-050269 A | 3/2010 |
| JP | 2010-508789 A | 3/2010 |
| JP | 2010-519838 A | 6/2010 |
| JP | 2012-507961 A | 3/2012 |
| JP | 2013-522965 A | 6/2013 |
| JP | 2014-502128 A | 1/2014 |
| JP | 2014-525191 A | 9/2014 |
| JP | 2014-530534 A | 11/2014 |
| JP | 2015-207934 A | 11/2015 |
| JP | 2016-013351 A | 1/2016 |
| JP | 2016-504798 A | 2/2016 |
| JP | 2016-504851 A | 2/2016 |
| JP | 2016-514416 A | 5/2016 |
| JP | 6313503 B1 | 4/2018 |
| JP | 2019-518364 A | 6/2019 |
| JP | 2019-525616 A | 9/2019 |
| KR | 10-2008-0041237 A | 5/2008 |
| KR | 10-2008-0109535 A | 12/2008 |
| KR | 10-2009-0085640 A | 8/2009 |
| KR | 10-2010-0065327 A | 6/2010 |
| KR | 10-2010-0097625 A | 9/2010 |
| KR | 10-2011-0063565 A | 6/2011 |
| KR | 10-2013-0029374 A | 3/2013 |
| KR | 10-2014-0043532 A | 4/2014 |
| KR | 10-2014-0098156 A | 8/2014 |
| KR | 10-2014-0123870 A | 10/2014 |
| KR | 10-2015-0118874 A | 10/2015 |
| KR | 10-2015-0119355 A | 10/2015 |
| KR | 10-1563469 B1 | 10/2015 |
| KR | 10-2016-0021141 A | 2/2016 |
| KR | 10-2016-0055086 A | 5/2016 |
| KR | 10-2017-0128515 A | 11/2017 |
| KR | 10-2019-0089423 A | 7/2019 |
| WO | 00/65837 A1 | 11/2000 |
| WO | 01/18658 A1 | 3/2001 |
| WO | 2007/052753 A1 | 5/2007 |
| WO | 2007/125910 A1 | 11/2007 |
| WO | 2010/001474 A1 | 1/2010 |
| WO | 2010/021705 A1 | 2/2010 |
| WO | 2010/050269 A1 | 5/2010 |

(56) References Cited

FOREIGN PATENT DOCUMENTS

| | | |
|---|---|---|
| WO | 2010/082805 A2 | 7/2010 |
| WO | 2011/082150 A1 | 7/2011 |
| WO | 2011/097904 A1 | 8/2011 |
| WO | 2011/123805 A1 | 10/2011 |
| WO | 2012/021246 A2 | 2/2012 |
| WO | 2012/114666 A1 | 8/2012 |
| WO | 2012/130180 A1 | 10/2012 |
| WO | 2012/141557 A2 | 10/2012 |
| WO | 2012/155326 A1 | 11/2012 |
| WO | 2014/057131 A1 | 4/2014 |
| WO | 2014/059591 A1 | 4/2014 |
| WO | 2014/067566 A1 | 5/2014 |
| WO | 2014/090200 A1 | 6/2014 |
| WO | 2014/090208 | 6/2014 |
| WO | 2014/111423 A1 | 7/2014 |
| WO | 2014/135126 A1 | 9/2014 |
| WO | 2014/183803 A1 | 11/2014 |
| WO | 2014/190308 A1 | 11/2014 |
| WO | 2015/013645 A1 | 1/2015 |
| WO | 2015/013685 A1 | 1/2015 |
| WO | 2015/045658 A1 | 4/2015 |
| WO | 2015/059194 A1 | 4/2015 |
| WO | 2015/067196 A1 | 5/2015 |
| WO | 2015/080646 A1 | 6/2015 |
| WO | 2015/084048 A1 | 6/2015 |
| WO | 2015/100533 A1 | 7/2015 |
| WO | 2015/113205 A1 | 8/2015 |
| WO | 2015/122737 A1 | 8/2015 |
| WO | 2015/141982 A1 | 9/2015 |
| WO | 2015/166840 A1 | 11/2015 |
| WO | 2016/013351 A1 | 1/2016 |
| WO | 2016/028111 A1 | 2/2016 |
| WO | 2016/033731 A1 | 3/2016 |
| WO | 2016/040290 A1 | 3/2016 |
| WO | 2016/040833 A1 | 3/2016 |
| WO | 2016/094191 A1 | 6/2016 |
| WO | 2016/130353 A2 | 8/2016 |
| WO | 2017/061297 A1 | 4/2017 |
| WO | 2017/147515 A1 | 8/2017 |
| WO | 2017/191833 A1 | 11/2017 |
| WO | 2017/195478 A1 | 11/2017 |
| WO | 2018/028602 A1 | 2/2018 |

OTHER PUBLICATIONS

3rd Generation Partnership Project (3GPP) TSG RAN WG1 Meeting #83 R1-157351, Initial Views on Technical Design for NB-IoT, Nov. 15-22, 2015, 3 pages.
3rd Generation Partnership Project (3GPP) TSG RAN WG1 Meeting #84bis R1-162379, "Overview of new radio access technology requirements and designs" Apr. 11-15, 2016, 4 pages.
3rd Generation Partnership Project (3GPP) TSG RAN WG1 Meeting #84bis R1-162797, "Harq Enhancement for Improved Data Channel Efficiency", Busan, Korea, Apr. 11-15, 2016, 3 pages.
3rd Generation Partnership Project (3GPP) TSG RAN WG1 Meeting #85 R1-164871 "Frame structure for new radio interface", May 23-27, 2016, 3 pages.
3rd Generation Partnership Project (3GPP) TSG RAN WG1 Meeting #85 R1-165174 "Uplink multiple access schemes for NR", May 23-27, 2016, 4 pages.
3rd Generation Partnership Project (3GPP) TSG RAN WG1 Meeting #86bis R1-1610524, WF on NR RS Definition, Huawei, HiSilicon, Lisbon, Portugal, Oct. 10-14, 2016, Agenda Item: 8.1.4.4, 4 pages.
3rd Generation Partnership Project (3GPP) TSG-RAN WG1 #85, R1-164628, Frame Structure for NR, Ericsson, Nanjing, China, May 23-27, 2016, 3 pages.
3rd Generation Partnership Project (3GPP) TSG-RAN WG1 #85, R1-164694, Frame Structure Requirements, Qualcomm, Nanjing, China, May 23-27, 2016, 5 pages.
3rd Generation Partnership Project (3GPP) TSG-RAN WG1#85 R1-165027 "Basic Frame Structure Principles for 5G" May 23-27, 2016, 6 pages.
3rd Generation Partnership Project (3GPP) TSG-RAN WG1#85, R1-165363, Nokia, Alcatel-Lucent Shanghai Bell, Scalability of MIMO Operation Across NR Carrier Frequencies, Nanjing, P.R. China, May 23-27, 2016, 5 pages.
3rd Generation Partnership Project (3GPP) TSG-RAN WG2 Meeting #94 R2-163371, "System Information Signalling Design in NR", May 23-27, 2016, 7 pages.
3rd Generation Partnership Project (3GPP) TSG-RAN WG2 Meeting #94, R2-163718 "Control Plane functions in NR", Nanjing, China; May 23-27, 2016, 4 pages.
3rd Generation Partnership Project (3GPP), RI-165027, vol. RAN WG1, Nokia et al: "Basic frame structure 1 principles for 5G", 3GPP Draft; No. Nanjing, P.R. China; May 23, 2016-May 27, 2016 May 13, 2016.
3rd Generation Partnership Project (3GPP), TS 36.212 V10.8.0, RAN WG1, Technical Specification Group Radio Access Network; Evolved Universal Terrestrial Radio Access (E-UTRA); Multiplexing and Channel Coding (Release 10), Jun. 17, 2013, pp. 1-79.
3rd Generation Partnership Project (3GPP), TSG RAN WG1 Meeting #86, "RAN1 Chairman's Notes", Gothenburg, Sweden, Aug. 22-26, 2016, 105 pages.
3rd Generation Partnership Project; (3GPP) TR 22.891 V1.1.0, 3rd Generation Partnership Project; Technical Specification Group Services and System Aspects; Feasibility Study on New Services and Markets Technology Enablers; Stage 1 (Release 14), Nov. 2015, 95 pages.
3rd Generation Partnership Project; (3GPP) TR 23.799, "Technical Specification Group Services and System Aspects Study on Architecture for Next Generation System (Release 14)", vol. SA WG2, No. V0.5.0, Jun. 8, 2016, pp. 1-179.
3rd Generation Partnership Project; (3GPP) TR 38.913 V0.2.0, 3rd Generation Partnership Project; Technical Specification Group Radio Access Network; Study on Scenarios and Requirements for Next Generation Access Technologies, (Release 14), Feb. 2016, 19 pages.
3rd Generation Partnership Project; (3GPP) TS 36.211 V13.1.0, 3rd Generation Partnership Project; Technical Specification Group Radio Access Network; Evolved Universal Terrestrial Radio Access (E-UTRA); Physical Channels and Modulation (Release 13), Mar. 2016, 155 pages.
3rd Generation Partnership Project; (3GPP) TS 36.304 V13.0.0, 3rd Generation Partnership Project; Technical Specification Group Radio Access Network; Evolved Universal Terrestrial Radio Access (E-UTRA); User Equipment (UE) Procedures in idle Mode (Release 13), Dec. 2015, 42 pages.
3rd Generation Partnership Project; (3GPP) TS 36.331 V13.0.0, Technical Specification Group Radio Access Network; Evolved Universal Terrestrial Radio Access (E-UTRA); Radio Resource Control (RRC); Protocol specification (Release 13), Dec. 2015, 507 pages.
3rd Generation Partnership Project; (3GPP) TSG-RAN WG1 #86bis, R1-1610177, "DL Control Channels Overview", Qualcomm Incorporated, Oct. 10-14, 2016, Lisbon, Portugal, Discussion, Oct. 1, 2016, 6 pages.
3rd Generation Partnership Project; 3GPP TR 23.799 V0.5.0; Technical Specification Group Services and System Aspects; Study on Architecture for Next Generation System (Release 14); May 2016; 179 pages.
Budisin S. "Decimation Generator of Zadoff-Chu Sequences", In: Carlet C., Pott A. (eds) Sequences and Their Applications—SETA 2010. SETA 2010. Lecture Notes in Computer Science, vol. 6338. Springer, Berlin, Heidelberg, 2010, 40 pages.
CATT: "On interference measurement enhancement for multi-user MIMO operation", 3GPP TSG RAN WG1 Meeting #85, R1-164223, May 14, 2016, May 23, 2016-May 27, 2016, XP051096527.
CATT: "WF on Interference Measurement Enhancements", 3GPP TSG RAN WGI Meeting #86bis, R1-1610771, Oct. 18, 2016, Oct. 10, 2016-Oct. 14, 2016, XP051160249.
Chu, David, "Polyphase Codes With Good Periodic Correlation Properties", IEEE Transactions on Information Theory, Jul. 1972, 531-532.
Consideration on System Information Broadcast in New RAT, ZTE, 3GPPTSG-RANWG2 Meeting #93bis, R2-162629, Apr. 15, 2016.

(56) References Cited

OTHER PUBLICATIONS

ETRI, "FS_NEO updated requirement of network slicing", 3GPP TSG-SA WG1 #74 S1-161171, Apr. 29, 2016, URL:http://www.3gpp.org/ftp/tsg_sa/WG1_Serv/TSGS1_74_Venice/docs/SI-161171.zip, 6 pages.

ETRI, "High-level Functional Architecture for the Network Slicing", 3GPPTSG-SA WG2 #114 SZ-161833, Apr. 6, 2016, URL: http://www.3gpp.org/ftp/tsg_sa/WG2_Arch/TSGS2_114_Sophia_Antipolis/Docs/S2-161833.zip, 7 pages.

Huawei et al., "Numerology and wideband operation in NR unlicensed", 3GPP Draft; R1-1803677, 3rd Generation Partnership vol. RAN WG1, No. Sanya, China; Apr. 16, 2018-Apr. 20, 2018, Apr. 15, 2018, Apr. 16, 2018-Apr. 20, 2018.

Huawei et al., "R1-162116, Discussion on enhanced frame structure for latency reduction in TDD," 3GPP TSG RAN WG1 #84bis, (Apr. 1, 2016).

Huawei et al., "Discussion on frame structure for NR", 3 GPP TSG-RAN WG1#85, R1-164032, May 23-27, 2016, 8 pages.

Huawei et al.: "Initial access in NR unlicensed", 3GPP Draft R1-1808062 3rd Generation Partnership Project (3GPP), Mobile Competence Centre, vol. RAN WG1, No. Aug. 10, 2018, Aug. 20, 2018-Aug. 24, 2018.

Huawei, "HiSilicon, UE Slice Association/Overload control Procedure", 3GPP TSG-SA WG2 #115 SZ-162605, May 17, 2016, URL:http://www.3gpp.org/ftp/tsg_sa/WG2_Arch/TSGS2_115_Nanjing_China/Docs/S2-162605.zip, 11 pages.

Huawei, HiSilicon LTE-NR tight interworking control plane, R2-164268 LTE-NR tight interworking control plane, May 14, 2016.

Huawei,R3-161134,"Network slice selection," RAN WG3 Meeting #92, May 2016.

IEEE P802.11, Wireless LANs, Proposed TGax draft specification, Comment Resolutions on UL MU Operation, Jul. 25, 2016, 27 pages.

International Telecommunication Union (ITU-R), "IMT Vision—Framework and overall objectives of the future development of IMT for 2020 and beyond", Recommendation ITU-R M.2083-0, Sep. 2015, 21 pages.

ITRI, "Updates to Solution 6. 1.3: Introducing Network Instance ID", 3GPPTSG-SA WG2 #115 SZ-162666, May 17, 2016, URL:http://www.3gpp.org/ftp/tsg_sa/WG2_Arch/TSGS2_115_Nanjing_China/Docs/S2-162666.zip>.

MediaTek Inc., "HARQ Enhancement for Improved Data Channel Efficiency" [online], 3GPP TSG-RAN WG1#84b, R1-162797, <URL:http://www.3gpp.org/ftp/tsg_ran/WG1_RL1/TSGR1_84b/Docs/R1-162797.zip>, Apr. 2016, 4 pages.

NGMN 5G Initiative White Paper v1.0, Feb. 17, 2015, 125 pages.

Nokia et al., R1-163267, On design of DL control channel for shorter TTI operation, 3GPP TSG RAN WG1 #84bis, #GPP Apr. 1, 2016.

Nokia et al: Feature Lead's Summary on Channel Access Procedures 3GPP Draft; R1-1809801 NRU Channel Access Summary 3rd Generation Partnership Project (3GPP), Mobile Competence Centre, vol. RAN WG1, No. Gothenburg, Sweden; Aug. 23, 2018, Aug. 20, 2018-Aug. 20, 2018.

Nokia, "Alcatel-Lucent Shanghai Bell", Slice Selection solution update, 3GPP TSG-SA WG2 #115 SZ-162982, May 27, 2016, URL: http://www.3gpp.org/ftp/tsg_sa/WG2_Arch/TSGS2_115_Nanjing_China/Docs/S2-162982.zip, 15 pages.

Nokia, "Solutions for Network Slice Selection", Alcatel-Lucent Shanghai Bell, 3GPP TSGG-RAN WG3 Meeting #92, R3-161356, China, May 23-27, 2016, 9 pages.

NTT Docomo Inc., "Discussion on frame structure for NR", 3GPP TSG-RAN WG1#85, R1-165176, May 23-May 27, 2016, 10 pages.

NTT Docomo, Inc., and Uplink multiple access schemesfor NR [online] and 3GPP TSG-RANWG 1#85R1-165174, the Internet<URL:http://www.3gpp.org/ftp/tsg_ran/WG1_RL1/TSGR1_1281/Docs/R1-165174.zip>, May 27, 2016, 1-4 pages.

NTT Docomo, Inc., R1-160965, "UL aspects of TTI shortening," 3GPP TSG RAN WG1 #84, 3GPP (Feb. 5, 2016).

3rd Generation Partnership Project; 3GPP TS 23.228 V12.1.0; Technical Specification Group Services and System Aspects; IP Multimedia Substystem (IMS); Stage 2 (Release 12), Jun. 2013, 296 pages.

ASUSTeK, R1-083574, Draft CR on RNTI for UE-specific search space, 3GPP TSG-RAN1 Meeting #54bis, Oct. 2018.

Damour, N., "List of Common Services Functions-Call for Contributions", M2M Functional Architecture Technical Specification, Doc# oneM2M-ARC-2013-0304R04-List of oneM2M CSFs- Call for contributions-2.DOC Input Contribution, Jul. 11, 2013, 1-5 pages.

ETSI TS 102690 V2.0.14 Technical Specification, "Machine-to-Machine Communications (M2M) Functional Architecture", Jul. 2013, 332 pages.

European Telecommunications Standards Institute (ETSI), TS 102 690 V1.2.1; Machine-to- Machine Communications (M2M); Functional Architecture, Jun. 2013, 279 pages.

ITRI, "Discussion on resource utilization for UE-specific BF CSI-RS", R1-162987, 7.3.3.1.2, 3GPP TSG RAN WG1 Meeting #84b, 2016, 2 Pages.

Machine-to-Machine Communications (M2M) Functional Architecture, Draft ETSI TS 102 690 V1.1.1, Oct. 2011, 280 pages.

Motorola Mobility, "Synchronization signal in NR", 3GPP TSG-RAN WG1#86b R1-1609917, Oct. 2016, 5 Pages.

OMA (Open Mobile Alliance), OMA-TS-LightweightM2M-V1_0-20130206-D, Lightweight Machine to Machine Technical Specification, Draft Version 1.0—Feb. 6, 2013, 53 pages.

OneM2M Technical Specification, oneM2M-TS-0001 oneM2M Functional Architecture-V-0.0.3, Jun. 8, 2013, 11 pages.

"Consideration on TTI shortening for DL", 3GPP TSG RAN WG1 Meeting #84, R1-161017, Feb. 2016, 4 Pages.

"Considerations on required downlink physical layer enhancements for shorter TTI", 3GPP TSG-RAN WG1 Meeting #84, R1-160786, Feb. 2016, 6 Pages.

"Discussion on downlink control channel design," 3GPP TSG RAN WG1 Meeting #86bis, R1-1609432, Oct. 10-14, 2016, p. 5.

"Nokia Networks Enhancements for MTC Paging", R3-151590 Discussion Paper MTC Paging vB, Aug. 14, 2015.

"Study on TTI shortening for downlink transmissions", 3GPP TSG RAN WG1 Meeting #84, R1-160649, Feb. 2016, 6 Pages.

3GPP TS 36.211 V13.0.0, "Technical Specification Group Radio Access Network; Evolved Universal Terrestrial Radio Access (E-UTRA); Physical Channels and Modulation (Release 13)", Dec. 2015, 141pages.

3GPP TSG GERA1 Adhoc #3 GPC150521, Samsung Electronics, "Discussions of Grant-Free Multiple Access in CIoT (Update GPC150512)", Jul. 2015, 9 pages.

3GPP TSG RAN WG1 Meeting #84bis R1-163049, Design Options for Longer Cyclic Prefix for MBSFN Subframes, Apr. 2016, 3 pages.

3GPP TSG-RAN WG2 Meeting #95 R2-164693, Samsung, "System Information Signalling Design in NR" Aug. 2016, 6 pages.

3GPP TSG-RAN1#85 R1-164869, "Low code rate and signature based multiple access scheme for New Radio," May 23-27, 2016, pp. 1-4.

3GPP TSG-RAN2 meeting #95bis R2-166202, Huawei et al., "Further Discussions of Minimum SI" Oct. 2016, 3 pages.

3GPP TSG-RAN2 Meeting #95bis R2-166203, Huawei et al., "Delivery of "Other SI" in NR", Oct. 2016, 5 pages.

3GPP TSG=RAN WG2 Meeting #95bis, ETSI MCC, "Skeleton report", Oct. 2016, 5 pages.

3rd Generation Partnership Project (3GPP) R2-162571 TSGRAN WG2 Meeting #93bis, Introduction of Virtual Cell, CATT, Dubrovnik, Croatia, Apr. 11-15, 2016, 3 pages.

3rd Generation Partnership Project (3GPP) RP-160301 TSG RAN Meeting #71, Motivation for new WI on Light Connection in LTE, Huawei, HiSilicon, Goteborg, Sweden, Mar. 7-11, 2016, 14 pages.

3rd Generation Partnership Project (3GPP) RP-160425 TSG RAN Meeting #71, Further enhancements on signaling reduction to enable light connection for LTE, Intel Corporation, Gothenburg, Sweden, Mar. 7-10, 2016, 7 pages.

(56) References Cited

OTHER PUBLICATIONS

3rd Generation Partnership Project (3GPP) RP-160540 TSG RAN Meeting #71, New WI proposal: Signalling reduction to enable light connection for LTE, Gothenburg, Sweden, Mar. 7-10, 2016, 7 pages.
3rd Generation Partnership Project (3GPP) RP-161214 TSG RAN Meeting #72, Revision of SI: Study on New Radio Access Technology, NTT DOCOMO, Busan, Korea, Jun. 13-16, 2016, 8 pages.
3rd Generation Partnership Project (3GPP) S1-152395 Revision of S1-152074, ZTE Corporation et al., "Update the network slicing use case in Smarter", ZTE Smarter Update the Network Slicing Use case REV3, vol. SA WG1, No. Belgrade Serbia, Aug. 24, 2015, 3 pages.
3rd Generation Partnership Project (3GPP) S1-161323 TSG-SA WG1 Meeting #74, Editorial cleanup and alignment of eMBB TR22.863, Venice, Italy, May 9-13, 2016, 4 pages.
3rd Generation Partnership Project (3GPP) S2-161198 SA WG2 Meeting #113AH, Solution for optimized UE sleep state and state transitions, Sophia Antipolis, France, Feb. 23-26, 2016, 3 pages.
3rd Generation Partnership Project (3GPP) S2-161324 SA WG2 Meeting #113, Solution to Key Issue on Mobility Framework, Sophia Antipolis, FR, Feb. 23-26, 2016, 3 pages.
3rd Generation Partnership Project (3GPP) S2-162982 was S2-162717-MDD and Slice Selection in core and Ran V1, 3rd vol. SA WG2, , Nokia et al., No. Nanjing, P.R. China; May 27, 2016, 13 pages.
3rd Generation Partnership Project (3GPP) SA WG2 Meeting #115 S2-162511 "Common CP functions and dedicate CP function for simultaneous multiple Network Slice (update of solution 1.3)" May 23-27, 2016, 4 pages.
3rd Generation Partnership Project (3GPP) T-RAN WG1#85 R1-165027 "Basic Frame Structure Principles for 5G" May 23-27, 2016, 6 pages.
3rd Generation Partnership Project (3GPP) TR 22.861 V14.1.0, Technical Specification Group Services and Systems Aspects, Feasibility Study on New Services and Markets Technology Enablers for Massive Internet of Things, Stage 1 (Release 14), Sep. 2016, 28 pages.
3rd Generation Partnership Project (3GPP) TR 22.862 V14.1.0, Technical Specification Group Services and System Aspects, Feasibility Study on New Services and Markets Technology Enablers for Critical Communications, Stage 1 (Release 14), Sep. 2016, 31 pages.
3rd Generation Partnership Project (3GPP) TR 22.863 V0.3.1, Technical Specification Group Services and System Aspects, Feasibility Study on New Services and Markets Technology Enablers—Enhanced Mobile Broadband; Stage 1 (Release 14), Feb. 2016, 13 pages.
3rd Generation Partnership Project (3GPP) TR 22.863 V14.1.0, Technical Specification Group Services and System Aspects, Feasibility Study on New Services and Markets Technology Enablers—Enhanced Mobile Broadband, Stage 1 (Release 14), Sep. 2016, 21 pages.
3rd Generation Partnership Project (3GPP) TR 22.864 V14.1.0, Technical Specification Group Services and System Aspects, Feasibility Study on New Services and Markets Technology Enablers—Network Operation, Stage 1 (Release 14), Sep. 2016, 35 pages.
3rd Generation Partnership Project (3GPP) TR 22.891 V14.2.0, Technical Specification Group Services and System Aspects, Feasibility Study on New Services and Markets Technology Enablers, Stage 1 (Release 14), Sep. 2016, 95 pages.
3rd Generation Partnership Project (3GPP) TR 23.720 V13.0.0, Technical Specification Group Services and System Aspects, Study on architecture enhancements for Cellular Internet of Things, (Release 13), Mar. 2016, 94 pages.
3rd Generation Partnership Project (3GPP) TR 36.881 V14.0.0, Technical Specification Group Radio Access Network, Evolved Universal Terrestrial Radio Access (E-UTRA), Study on Latency Reduction Techniques for LTE (Release 14), Jun. 2016, 249 pages.
3rd Generation Partnership Project (3GPP) TR 36.897 V13.0.0, Technical Specification Group Radio Access Network, Study on Elevation Beamforming/Full-Dimension (FD) Multiple Input Multiple Output (MIMO) for LTE; (Release 13), Jun. 2015, 58 pages.
3rd Generation Partnership Project (3GPP) TR 36.912 V13.0.0, Technical Specification Group Radio Access Network, Feasibility study for Further Advancements for E-UTRA (LTE-Advanced) (Release 13), Dec. 2015, 273 pages.
3rd Generation Partnership Project (3GPP) TR 38.801 V0.2.0, Technical Specification Group Radio Access Network, Study on New Radio Access Technology: Radio Access Architecture and Interface (Release 14), Jun. 2016, 20 pages.
3rd Generation Partnership Project (3GPP) TR 38.913 V14.3.0, Technical Specification Group Radio Access Network, Study on Scenarios and Requirements for Next Generation Access Technologies, (Release 14), Jun. 2017, 39 pages.
3rd Generation Partnership Project (3GPP) TR 45.820 V13.1.0, Technical Specification Group GSM/EDGE Radio Access Network, Cellular system support for ultra-low complexity and low throughput Internet of Things (CIoT) (Release 13), Nov. 2015, 495 pages.
3rd Generation Partnership Project (3GPP) TS 23.060 V13.6.0, Technical Specification Group Services and System Aspects, General Packet Radio Service (GPRS), Service description, Stage 2 (Release 13), Mar. 2016, 362 pages.
3rd Generation Partnership Project (3GPP) TS 23.401 V13.6.1, Technical Specification Group Services and System Aspects, General Packet Radio Service (GPRS) enhancements for Evolved Universal Terrestrial Radio Access Network (E-UTRAN) access (Release 13), Mar. 2016, 365 pages.
3rd Generation Partnership Project (3GPP) TS 24.302 V13.5.0, Technical Specification Group Core Network and Terminals, Access to the 3GPP Evolved Packet Core (EPC) via non-3GPP access networks; Stage 3 (Release 13), Mar. 2016, 126 pages.
3rd Generation Partnership Project (3GPP) TS 36.133 V14.7.0, Technical Specification Group Radio Access Network, Evolved Universal Terrestrial Radio Access (E-UTRA), Requirements for support of radio resource management (Release 14), Mar. 2018, 2997 pages.
3rd Generation Partnership Project (3GPP) TS 36.213 V13.0.0, Technical Specification Group Radio Access Network, Evolved Universal Terrestrial Radio Access (E-UTRA), Physical layer procedures (Release 13), Dec. 2015, 326 pages.
3rd Generation Partnership Project (3GPP) TS 36.300 V13.3.0, Technical Specification Group Radio Access Network, Evolved Universal Terrestrial Radio Access (E-UTRA) and Evolved Universal Terrestrial Radio Access Network (E-UTRAN), Overall description; Stage 2 (Release 13), Mar. 2016, 295 pages.
3rd Generation Partnership Project (3GPP) TS 36.321 V13.0.0, Technical Specification Group Radio Access Network, Evolved Universal Terrestrial Radio Access (E-UTRA), Medium Access Control (MAC) protocol specification (Release 13), Dec. 2015, 82 pages.
3rd Generation Partnership Project (3GPP) TS TSG RAN WG1 Meeting #84bis, Busan, Korea ,Intel Corporation, Overview of New Radio Access Technology Requirements and Designs, 8.1.1, Discussion and Decision, Apr. 2016, 4 pages.
3rd Generation Partnership Project (3GPP) TS TSG RAN WG1 Meeting #85,2016 Nanjing, China 23rd-27th,NTT DoCoMo, Inc., Uplink Multiple Access Schemes for NR, 7.1.3.2, Discussion and Decision, May 2016, 4 pages.
3rd Generation Partnership Project (3GPP) TSG RAN WG1 #84bis Meeting, R1-163757, Way Forward on Channel Coding Evaluation for 5G New Radio, Busan, Korea, Apr. 11-15, 2016, Agenda Item 8.1.6.1, 5 pages.
3rd Generation Partnership Project (3GPP) TSG RAN WG1 #85, R1-164013, Framework for Beamformed Access, Samsung, Nanjing, China, May 23-27, 2016, 4 pages.
3rd Generation Partnership Project (3GPP) TSG RAN WG1 #85, R1-164014, Discussion on RS for Beamformed Access, Samsung, Nanjing, China, May 23-27, 2016, 3 pages.
Qualcomm Incorporated, S2-162339, "Solution for key issue 1 on Network Slicing: Network Slice and Network Functions Selection based on evolved eDECOR model," SA WG2 Meeting #115, May 2016.

(56) References Cited

OTHER PUBLICATIONS

Qualcomm Incorporated: "Frame structure requirements", 3GPP Draft; vol. RAN WG1, No. Nanjing, China; May 14, 2016.
Qualcomm, 3GPP R1-1612062, TSG-RAN WG1 #87, Control Channel for slot format indicator, Nov. 14-18, 2016 (Year: 2016).
Samsung: "Signaling of Slot Structure", 3GPP Draft; R1-1609127, 3rd Generation Partnership Project (3GPP), Mobile Competence Centre; 650, Route Des Lucioles; F-06921 Sophia Anti Polis CEO EX ; France, RAN WG1, No. Lisbon, Portugal; Oct. 10, 2016-Oct. 14, 2016 Sep. 30, 2016.
Sesia et al., "LTE—The UMTS Long Term Evolution", Chapter 9.3.3., LTE—The UMTS Long Term Evolution : from theory to Practice; Jul. 20, 2011, pp. 198-200.
Spreadtrum Communications, R1-164584, "HARQ feedback for sTTI scheduling," 3GPP TSG RAN WG1 #85, 3GPP (May 13, 2016).
ZTE et al., "Forward compatibilty for numerology and fr ame structure design", R1-164261, 3GPP TSG-RAN WG1#85, May 23-27, 2016, 7 pages.
ZTE, "Consideration on RAN architecture impacts of network slicing", 3GPP TSG-RAN WG2 Meeting #93bis, R2-162627, Croatia, Apr. 11-15, 2016, 10 pages.
ZTE: "Considerations on channel access procedure for NR-U", 3GPP Draft; R2-1811281 Considerations on Random Access Procedure for NR-U, 3rd Generation Partnership Project (3GPP), Mobile Competence Centre vol. RAN WG2, No. Gothenburg, Sweden; Aug. 9, 2018, Aug. 20, 2018-Aug. 24, 2018.
Huawei et al., "Design of initial downlink transmission for LBE-based LAA", R1-150980, 3GPP TSG RAN WG1, Mar. 2015, 6 Pages.
Nokia et al., "On supported Shorter TTI lengths and its configurability", 3GPP TSG RAN WG1 Meeting #85, 2016, R1-164945, 4 pages.
Spreadtrum Communications, "HARQ feedback for sTTI scheduling", R1-162546, Apr. 2016, 3GPP TSG RAN WG1 Meeting #84bis, 4 Pages.
Mavlankar et al., "Video Streaming with Interactive Pan/Tilt/Zoom", High-Quality Visual Experience, Jan. 2010, pp. 26.
Sun, et al., The Dynamic Videobook: A Hierarchical Summarization for Surveillance Video, Published in IEEE Sep. 2013, pp. 3963-3966.
Third Generation Partnership Project, "Technical Specification Group Radio Access Network; Evolved Universal Terrestrial Radio Access (E-UTRA); Multiplexing and channel coding (Release 13)," 3GPP TS 36.212 V13.2.0 (Jun. 2016).
LG Electronics, "Transmission modes for Un PDSCH", 3GPP TSG RAN WG1 Meeting #63, R1-106138, 2010, pp. 3.

\* cited by examiner

FRAME STRUCTURE IN NR

CROSS-REFERENCE TO RELATED APPLICATIONS

This application is a continuation of U.S. patent application Ser. No. 17/132,026 filed Dec. 23, 2020 which is a continuation of U.S. patent application Ser. No. 16/346,972 filed May 2, 2019 which is the National Stage Application of International Patent Application No. PCT/US2017/059890 filed Nov. 3, 2017 which claims the benefit of priority to U.S. Provisional Application No. 62/416,902 filed Nov. 3, 2016, the contents of which are incorporated by reference in their entireties.

BACKGROUND

Control channels for Uplink (UL) and Downlink (DL) New Radio (NR) have a beam centric architecture. While the NR Downlink Control Information (DCI) is precoded, the DL control signaling on multiple beams is currently undefined. Protocols to support channel estimation for DL control signals are needed in NR.

In high carrier frequencies, phase noise becomes a significant problem. Tracking RS (TRS) aids in estimating and compensating for phase noise. Resource allocations for Demodulation Reference Signals (DMRS) and TRS have not been finalized in NR.

SRS design for UL, especially in a beam centric architecture, has not been addressed in NR. Techniques for assigning SRS resources on multiple beams and in multiple numerologies is needed.

Currently in LTE, Channel State Information Interference Channel Measurement (CSI-ICM) is used to measure the interference power configured in RRC signaling. Interference may be caused by MIMO transmissions or beams from similar or different Transmission and Reception Points (TRP)s. As the number of interference sources increase, the number of interference hypotheses exponentially increase in turn. Because one CSI-ICM resource is required for each interference hypothesis, a large overhead for DL transmission is realized. This potentially limits a NR node's flexibility for scheduling MU-MIMO.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

In one aspect of the application, a frame structure in new radio is described. The frame structure includes a self-contained transmission time interval. The transmission interval includes a control information region including plural beams, and a downlink transmission channel region including plural beams. The downlink control information is swept through the time interval. Subsequently, an uplink or downlink grant resource is swept through the time interval.

In another aspect of the application, a frame structure operating in new radio is described. The frame structure includes a transmission bandwidth, which includes a timeslot for control and data signaling. The timeslot has a first numerology and a second numerology. The first numerology supports a first subcarrier spacing. The second numerology supports a second subcarrier spacing. Further, a fixed time slot includes a beam having a sounding reference signal.

In yet another aspect, a method for configuring user equipment. The method includes a step of configuring a set of 'K' channel state information interference channel measurement (CSI-ICM) and channel state interference reference signal (CSI-RS) resources for a group of user equipment. The method also includes a step of indicating, for one of the user equipment in the group, at least 'N' of the 'K' CSI-ICM resources via dynamic signaling based on interference. The method also includes a step of transmitting downlink control information including the CSI-ICM to the group; a CSI-RS (and CSI-interference channel measurement) protocol to the user equipment. The method further includes a step of receiving, from the UE in the group, feedback of the CSI and CSI-ICM for the interference channel. The method even further includes a step of scheduling a MU-MIMO transmission for the user equipment. The method yet even further includes a step of determining a cancelation of interference transmitted from one user equipment to other co-scheduled UEs. There has thus been outlined, rather broadly, certain embodiments of the invention in order that the detailed description thereof may be better understood, and in order that the present contribution to the art may be better appreciated.

BRIEF DESCRIPTION OF THE DRAWINGS

In order to facilitate a more robust understanding of the application, reference is now made to the accompanying drawings, in which like elements are referenced with like numerals. These drawings should not be construed to limit the application and are intended only to be illustrative.

FIG. 3A is a diagram that illustrates NR-DCI for a UE is repeated in all beams. FIG. 3B is a diagram that illustrates NR-DCI for a UE is transmitted only on 2 out of 4 beams.

FIG. 17A illustrates sharing between two subframes of the same user. FIG. 17B illustrates sharing between sub-frames of two different users who are precoded the same way.

FIG. 20A illustrates no TRS is allocated. FIG. 20B illustrates multiple resources allocated for TRS in frequency. FIG. 20C illustrates higher density of TRS assigned in time.

DETAILED DESCRIPTION OF ILLUSTRATIVE EMBODIMENTS

Figure 1:
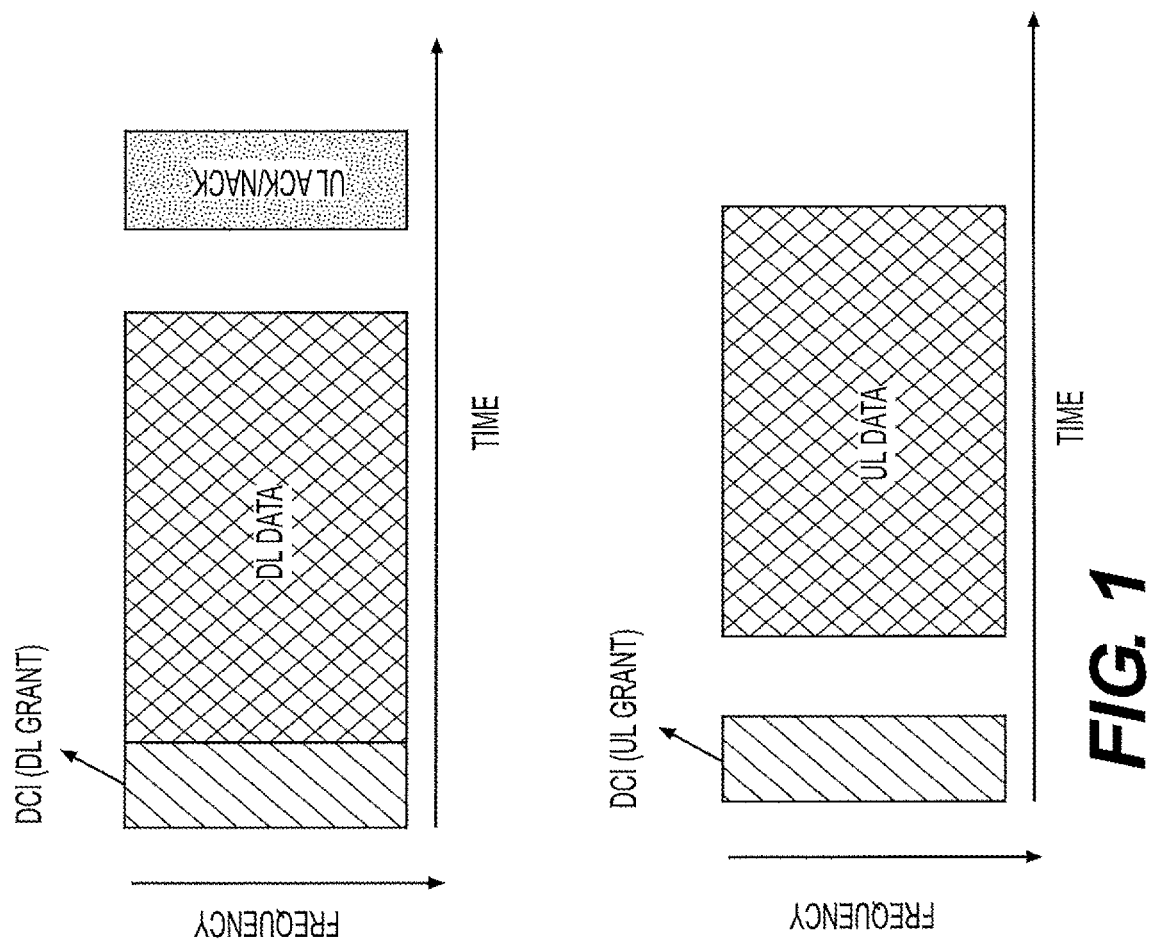
FIG. 1 is a diagram that illustrates a Flexible Frame Structure Concept in NR.

A detailed description of the illustrative embodiment will be discussed in reference to various figures, embodiments and aspects herein. Although this description provides detailed examples of possible implementations, it should be understood that the details are intended to be examples and thus do not limit the scope of the application.

Reference in this specification to "one embodiment," "an embodiment," "one or more embodiments," "an aspect" or the like means that a particular feature, structure, or characteristic described in connection with the embodiment is included in at least one embodiment of the disclosure. Moreover, the term "embodiment" in various places in the specification is not necessarily referring to the same embodiment. That is, various features are described which may be exhibited by some embodiments and not by the other.

Generally, the application is directed to methods and systems for reference signal designs and control channel designs for NR systems. In order to meet the requirements of the NR systems, enhancements related to reference signal and control channel design for NR can be employed. The application is also directed to mechanisms for control channel designs including techniques to assign resources for NR-DCI and waveforms for UL signaling. Mechanisms to aid control channel estimation and allocation of UL and DL resources within sub-bands can limit the computational burden on the UE.

Another aspect of the application is directed to mechanisms for reference signal designs. Solutions for DMRS and TRS design for NR are employed. Mechanisms can support resource allocation and cell/beam wide RS allocation and UE-specific RS allocation.

Resource allocation for NR-SRS in multiple beams and across multiple numerologies are described. Precoded SRS can be supported. Mechanisms for CSI based measurements are described. The following methods can enable CSI ICM and can make it more efficient: (i) A new RRC signaling, informs the UE about necessary information of configuration, such as RS location, code book information; (ii) a CSI-ICM resource set where CSI-ICM resources within the set may be dynamically shared among UEs. A two-step CSI-ICM configuration to support CSI-ICM and reduce the latency. Step 1 is to pre-configure a set of K CSI-ICM resources for all the UEs through RRC signaling. In step 2, for a given UE, dynamically indicate N (N>=1) CSI-ICM resources from a total of K based on the interference hypothesis to enable CSI-ICM measurement by dynamic signaling through DCI or dynamic signaling through MAC CE.

According to another embodiment, group-based CSI-ICM configuration through DCI is used to enable multiple UEs measuring the interference channel. The UEs can be grouped by experiencing the same interference hypothesis. According to yet another embodiment, a new NR PUCCH format to support CSI-ICM reporting is envisaged. In yet another embodiment, a new NR DCI design is envisaged to enable UE interference cancellation for MU-MIMO. In yet another embodiment, a procedure of interference channel measurement and interference cancellation for NR MU-MIMO is described.

According to another aspect, mechanisms for dynamic CSI-RS resource allocation are described. Two methods for RRC based configuration of CSI-RS pooling resources are envisaged. In the first technique, a UE-specific CSI-RS resources configuration is employed without configuration of a group of UEs sharing the same CSI-RS resource pool. In a second technique, a UE-specific CSI-RS resources configuration is employed with configuration of a group of UEs sharing the same CSI-RS resource pool.

Several signaling designs to dynamically indicate UE's CSI-RS resource and reporting are described (i) CSI measurement command signaled in MAC CE; and (ii) CSI measurement command signaled in DCI including: (a) CSI measurement command piggyback on DCI; (b) Standalone CSI measurement command (sent on a separate DCI) for a specific UE; and (c) Group-based DCI to schedule multiple UEs' CSI-RS measurement and feedback.

The mechanisms discussed herein may be conducted at the NR-node, Transmission and Reception Point (TRP) or Remote Radio Head (RRH). Accordingly, it is envisaged that the NR-node, TRP and RRH are interchangeable even though the NR-node is used in most exemplary descriptions or illustrations.

The time interval contains DL and/or UL transmissions are flexible for different numerologies and RAN slices and may be statically or semi-statically configured. The time interval structure may be used for a slot or a mini-slot within a subframe. The mechanisms for this time interval structure may be applicable to slot and/or mini-slot even though the exemplary descriptions and/or illustration figures use slot or mini-slot.

Acronyms

The following acronyms are used for the terms and phrases below:
AR Augmented Reality
AS Access Stratum
BF-RS BeamForm Reference Signal
BT-RS Beamformed Training Reference Signal
CE Control Element
CoMP Coordinated Multipoint
CP Cyclic Prefix
CQI Channel Quality Indication
CRS Cell-specific Reference Signals
CSI Channel State Information
CSI-RS Channel State Information Reference Signals
CSI-ICM Channel State Information—Interference Channel Measurement
DCI Downlink Control Information
DL DownLink
DM-RS Demodulation Reference Signals
eMBB enhanced Mobile Broadband
eNB evolved Node B
ePDCCH Enhanced Physical Downlink Control Channel
FD Full-Dimension
FDD Frequency Division Duplex
FFS For Further Study
GUI Graphical User Interface
HARQ Hybrid Automatic Repeat Request
ID Identification
IMT International Mobile Telecommunications
KP Kronecker-Product
KPI Key Performance Indicators
LTE Long Term Evolution
MAC Medium Access Control
MCL Maximum Coupling Loss
MCS Modulation and Coding Scheme
MME Mobility Management Entity
MIMO Multiple-Input and Multiple-Output
NAS Non-Access Stratum
NB Narrow Beam
NDI New Data Indicator
NEO Network Operation
NR-Node New Radio-Node
OCC Orthogonal Cover Codes
OFDM Orthogonal Frequency Division Multiplexing
PDCCH Physical Downlink Control Channel
PDSCH Physical Downlink Shared Channel
PMI Precoder Matrix Indication
PRS Positioning Reference Signals
PUSCH Physical Uplink Shared Channel
PUCCH Physical Uplink Control Channel
RAT Radio Access Technology
RB Resource Block
RE Resource Element
RI Rank Indication
RRC Radio Resource Control
RRH Remote Radio Head
RS Reference Signal
RSSI Received Signal Strength Indicator
RSRP Reference Signal Received Power
RSRQ Reference Signal Received Quality
RV Redundancy Version
SC-FDMA Single Carrier-Frequency Division Multiple Access
SI System Information
SIB System Information Block
SISO Single-Input and Single-Output
SRS Sounding Reference Signal
2D Two-Dimensional
3D Three-Dimensional
TDD Time Division Duplex
TPC Transmit Power Control
TRP Transmission and Reception Point
TRS Tracking Reference Signal
TTI Transmission Time Interval
TXSS Transmit Sector Sweep
UAV Unmanned Aerial Vehicle
UE User Equipment
UL UpLink
URLLC Ultra-Reliable and Low Latency Communications
VR Virtual Reality
WB Wide Beam
WRC Wireless Planning Coordination Reference Signals in LTE DL Reference Signals (RS)s are predefined signals occupying specific Resource Elements (RE)s within the downlink time-frequency RE grid. The LTE specification includes several types of DL RSs transmitted in different ways for different purposes [E. Dahlman, S. Parkvall, J. Skold, "4G LTE/LTE-Advanced for Mobile Broadband," second edition, 2014].

Cell-specific Reference Signals (CRS): CRS are used: (1) by User Equipments (UEs) for channel estimation for coherent demodulation of DL physical channels; and (2) by UEs to acquire Channel State Information (CSI); (3) by UEs for measurements of cell-selection and handover.

Demodulation Reference Signals (DM-RS): DM-RS are referred to as UE-specific reference signals, and are (1) used for channel estimation by a specific UE and only transmitted within the RBs specifically assigned for PDSCH/ePDCCH transmission to that UE, and (2) associated with data signals and precoded prior to the transmission with the same precoder as data.

Channel State Information Reference Signals (CSI-RS): CSI-RS are intended to be used by UEs to acquire CSI for channel-dependent scheduling, link adaptation and multi-antenna transmissions.

Uplink Reference Signals

Similar to LTE DL, reference signals are also used in LTE UL. Two types of reference signals are defined for LTE UL ["4G LTE/LTE-Advanced for Mobile Broadband"].

UL Demodulation Reference Signals (DM-RS): DM-RS is used by the base station for channel estimation for coherent demodulation of Physical Uplink Shared Channel (PUSCH) and Physical Uplink Control CHannel (PUCCH). DM-RS are only transmitted within the RBs specifically assigned for PUSCH/PUCCH transmission and are spanning the same frequency range as the corresponding physical channel.

UL Sounding Reference Signals (SRS): SRS is used by the base station for CSI estimation for supporting uplink channel-dependent scheduling and link adaptation. SRS are also used for the base station to obtain CSI estimation for DL under the case of channel reciprocity.

CSI Feedback in LTE

DL channel-dependent scheduling is a key feature of LTE, which selects the DL transmission configuration and related parameters depending on the instantaneous DL channel condition, including the interference situation. To support the DL channel-dependent scheduling, a UE provides the CSI to the evolved Node B (eNB). The eNB uses the information for its scheduling decisions.

The CSI consists of one or several pieces of information ["4G LTE/LTE-Advanced for Mobile Broadband"] including:

Rank Indication (RI): provide a recommendation on the transmission rank to use or, number of preferred layers that should be used for PDSCH transmission to the UE.

Precoder Matrix Indication (PMI): indicate a preferred precoder to use for PDSCH transmission.

Channel-Quality Indication (CQI): represent the highest modulation-and-coding scheme to achieve a block-error probability of at most 10%.

Together, a combination of the RI, PMI, and CQI forms a CSI feedback report to eNB. What is included in the CSI report depends on the UE's configured reporting mode. For example, RI and PMI do not need to be reported unless the UE is in a spatial multiplexing multi-antenna transmission mode.

Downlink Control Information

The Downlink Control Information (DCI) is a predefined format in which the DCI is formed and transmitted in Physical Downlink Control Channel (PDCCH). The DCI format tells the UE how to get its data which is transmitted on Physical Downlink Shared Channel (PDSCH) in the same subframe. It carries the details for the UE such as number of resource blocks, resource allocation type, modulation scheme, redundancy version, coding rate, etc., which help UE find and decode PDSCH from the resource grid. There are various DCI formats used in LTE in PDCCH.

New Radio (NR) Frame Structure

Currently, 3GPP standardization efforts are underway to define the NR frame structure. Consensus is to build the so called 'self-contained' time intervals for NR. As illustrated in FIG. 1, a self-contained time interval is understood to contain the control information for a grant, the data and it's acknowledgement (i.e. ACK/NACK) all within a time interval and is expected to have configurable UL/DL/side link allocations and reference signals within its resources [3GPP R1-164694 Frame Structure Requirements, Qualcomm, May 2016].

New Radio Requirements

3GPP TR 38.913 [3GPP TR 38.913 Study on Scenarios and Requirements for Next Generation Access Technologies; (Release 14), V0.2.0] defines scenarios and requirements for Radio (NR) technologies. The Key Performance Indicators (KPIs) for eMBB, URLLC and mMTC devices are summarized in Table 1 below.

TABLE 1

| Device | KPI | Description | Requirement |
| --- | --- | --- | --- |
| URLLC | Control Plane Latency | Control plane latency refers to the time to move from a battery efficient state (e.g., IDLE) to start of continuous data transfer (e.g., ACTIVE). | 10 ms |
|  | Data Plane Latency | For URLLC the target for user plane latency for UL and DL. Furthermore, if possible, the latency should also be low enough to support the use of the next generation access technologies as a wireless transport technology that can be used within the next generation access architecture. | 0.5 ms |
|  | Reliability | Reliability can be evaluated by the success probability of transmitting X bytes $^{NOTE1}$ within 1 ms, which is the time it takes to deliver a small data packet from the radio protocol layer 2/3 SDU ingress point to the radio protocol layer 2/3 SDU egress point of the radio interface, at a certain channel quality (e.g., coverage-edge). NOTE1: Specific value for X is FFS. | $1-10^{-5}$ within 1 ms. |
| mMTC | Coverage | "Maximum coupling loss" (MCL) in uplink and downlink between device and Base Station site (antenna connector(s)) for a data rate of [X bps], where the data rate is observed at the egress/ingress point of the radio protocol stack in uplink and downlink. | 164 dB |
|  | UE Battery Life | User Equipment (UE) battery life can be evaluated by the battery life of the UE without recharge. For mMTC, UE battery life in extreme coverage shall be based on the activity of mobile originated data | 15 years |

TABLE 1-continued

| Device | KPI | Description | Requirement |
|---|---|---|---|
| | Connection Density | transfer consisting of [200 bytes] Uplink (UL) per day followed by [20 bytes] Downlink (DL) from Maximum Coupling Loss (MCL) of [tbd] dB, assuming a stored energy capacity of [5 Wh] Connection density refers to total number of devices fulfilling specific Quality of Service (QoS) per unit area (per km$^2$). Q$_0$S definition should take into account the amount of data or access request generated within a time t_gen that can be sent or received within a given time, t_sendrx, with x % probability. | $10^6$ devices/km$^2$ |

Reference Signal Definition for NR

The following has been agreed upon at the 3GPP RAN1 #86bis meeting for the NR Reference Signal (RS) supported for downlink:

CSI-RS: Reference signal with main functionalities of CSI acquisition, beam management.
  FFS: RRM measurement
DM-RS: Reference signal with main functionalities of data and control demodulation
  FFS: channel state information estimation and interference estimation
  FFS: beam management
Reference signal for phase tracking
  FFS: Whether DM-RS extension can be applied or not
  FFS whether new RS or RS for other functionalities can be used
Reference signal for time/freq. tracking
  FFS whether new RS or RS for other functionalities can be used
Reference signal for Radio link monitoring
  FFS whether new RS or RS for other functionalities can be used
RS for RRM measurement
  FFS whether new RS or RS for other functionalities can be used At least the following RSs are supported for NR uplink:
SRS: Reference signal with main functionalities of CSI acquisition, beam management
  FFS: RRM measurement
DM-RS: Reference signal with main functionalities of data and control demodulation
  FFS: beam management
Reference signal for phase tracking
  FFS: Whether DM-RS extension can be applied or not
  FFS whether new RS or RS for other functionalities can be used
  FFS: Reference signal for RRM measurement
  FFS whether new RS or RS for other functionalities can be used CSI Feedback in LTE DL channel-dependent scheduling is a key feature of LTE, which selects the DL transmission configuration and related parameters depending on the instantaneous DL channel condition, including the interference situation. To support the DL channel-dependent scheduling, UE provides the CSI to the evolved Node B (eNB). The eNB uses the information for its scheduling decisions.

The CSI consists of one or several pieces of information: (i) Rank Indication (RI); (ii) Precoder Matrix Indication (PMI); (iii) Channel-Quality Indication (CQI). Together, a combination of the RI, PMI, and CQI forms a CSI feedback report to eNB. What is included in the CSI report depends on the UE's configured reporting mode. CSI report could be configured to be periodic or aperiodic by RRC signaling.

Aperiodic CSI Reporting Using PUSCH

Aperiodic reporting is triggered by DCI formats, and could be used to provide more detailed reporting via PUSCH. A UE is semi-statically configured by higher layer to feedback CQI and PMI and corresponding RI on the same PUSCH using one of the following CSI reporting modes given in Table 1 below. In sub-frame n, a CSI request can be transmitted in DCI format 0 and DCI format 4, which schedule a PUSCH transmission that carry aperiodic CSI report in sub-frame n+k.

TABLE 2

| | | PMI Feedback Type | | |
|---|---|---|---|---|
| | | No PMI | Single PMI | Multiple PMI |
| PUSCH CQI Feedback Type | Wideband (wideband CQI) | Mode 1-0 | Mode 1-1 | Mode 1-2 |
| | UE Selected (subband CQI) | Mode 2-0 | | Mode 2-2 |
| | Higher Layer-configured (subband CQI) | Mode 3-0 | Mode 3-1 | Mode 3-2 |

For each of the transmission modes in Table 2 above, different reporting modes are defined and supported on PUSCH.

Periodic CSI Reporting Using PUCCH

For periodic CSI reporting, UE is semi-statically configured by higher layers to periodically feedback different CSI components (CQI, PMI, and/or RI) on the PUCCH using the reporting modes given in Table 3. The periodic CSI reporting is configured by higher layer signaling (RRC).

TABLE 3

| | | PMI Feedback Type | |
|---|---|---|---|
| | | No PMI | Single PMI |
| PUCCH CQI Feedback Type | Wideband (wideband CQI) | Mode 1-0 | Mode 1-1 |
| | UE Selected (subband CQI) | Mode 2-0 | Mode 2-1 |

For each of the transmission modes defined in Table 3 above, different periodic CSI reporting modes are defined and supported on PUCCH.

Mechanisms for Control Channel Designs

According to an aspect of the application, architectures and techniques for DL and UL control signals for NR are provided. Solutions are described herein for resource allocation and reference signal design for NR-DCI.

In one embodiment, NR-DCI resource allocation in a beam centric architecture is described. Here, the 3GPP spec can support transmission of NR-DCI on multiple beams to improve coverage and reliability. Note that LTE supported only broadcast of the PDCCH. The beams may sweep through different spatial locations carrying NR-DCI as shown in FIG. 2.

Figure 2:
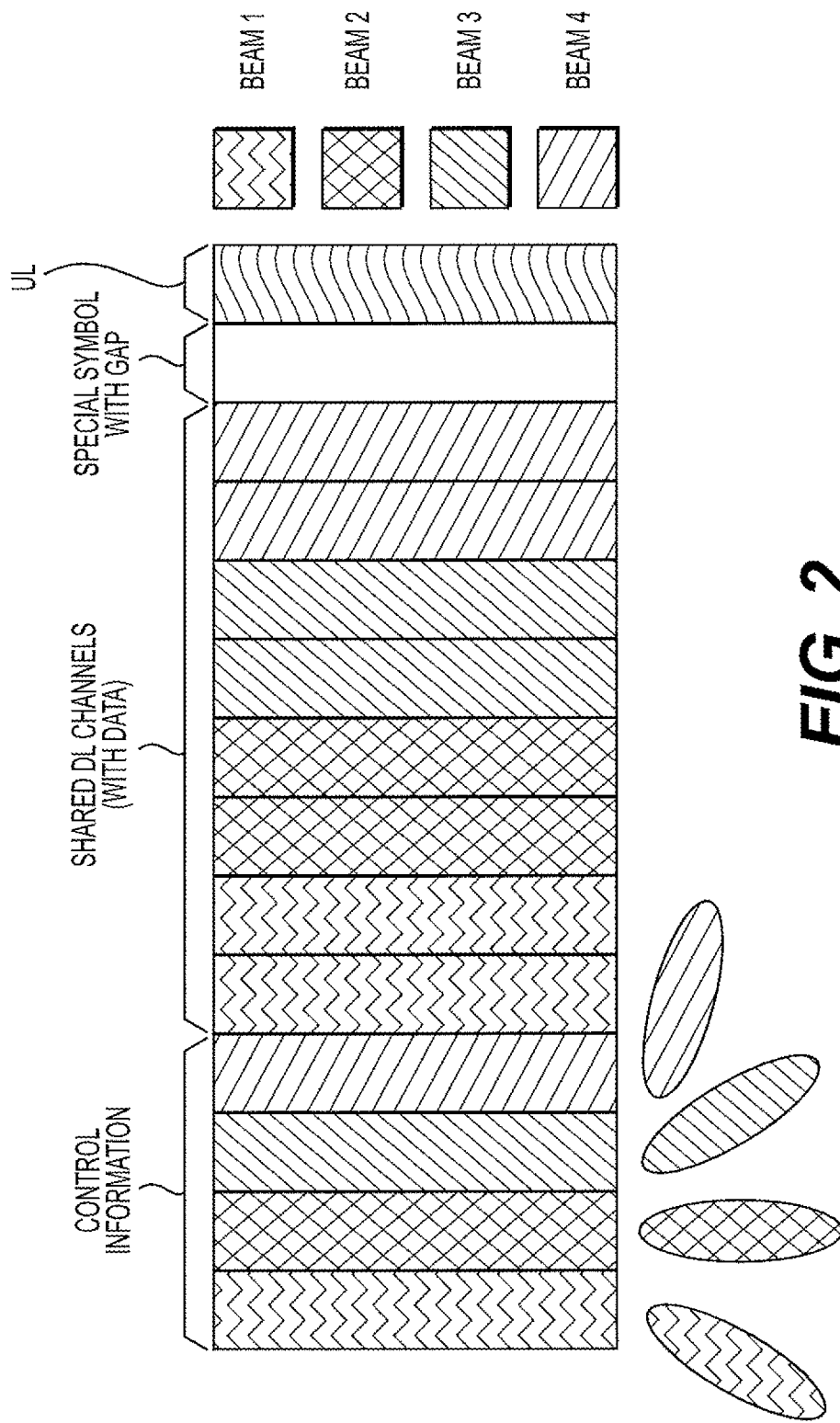
FIG. 2 is a diagram that illustrates control information transmitted on beams followed by shared channel transmission.

In this proposal, the beams carrying control information sweep through the space before the UL/DL grant resources are made available as shown in FIG. 2. The DL grant is available N symbols after the control signaling. The advantage of this scheme is that latency is reduced in decoding important control signaling related to paging, RACH, etc.

If the UE location is known a-priori, its UE-specific NR-DCI can be transmitted only in a subset of the beams. If the UE location is not known to the NR-Node, its NR-DCI may be transmitted in every beam. This concept in illustrated in FIGS. 3A and 3B where the control region is swept by 4 beams covering symbol per beam. A UE-specific NR-DCI is repeated in all the beams in FIG. 3A but transmitted only in beams 1 and 2 in FIG. 3B. The NR-DCI may be located in different subcarriers in different beams.

Similarly, NR-DCI for common control signaling may be carried in every beam. The common control search space uses the same subcarriers in all the beams carrying the control information—minimizes the overhead to indicate different common control signaling resources for each beam.

Figure 4:
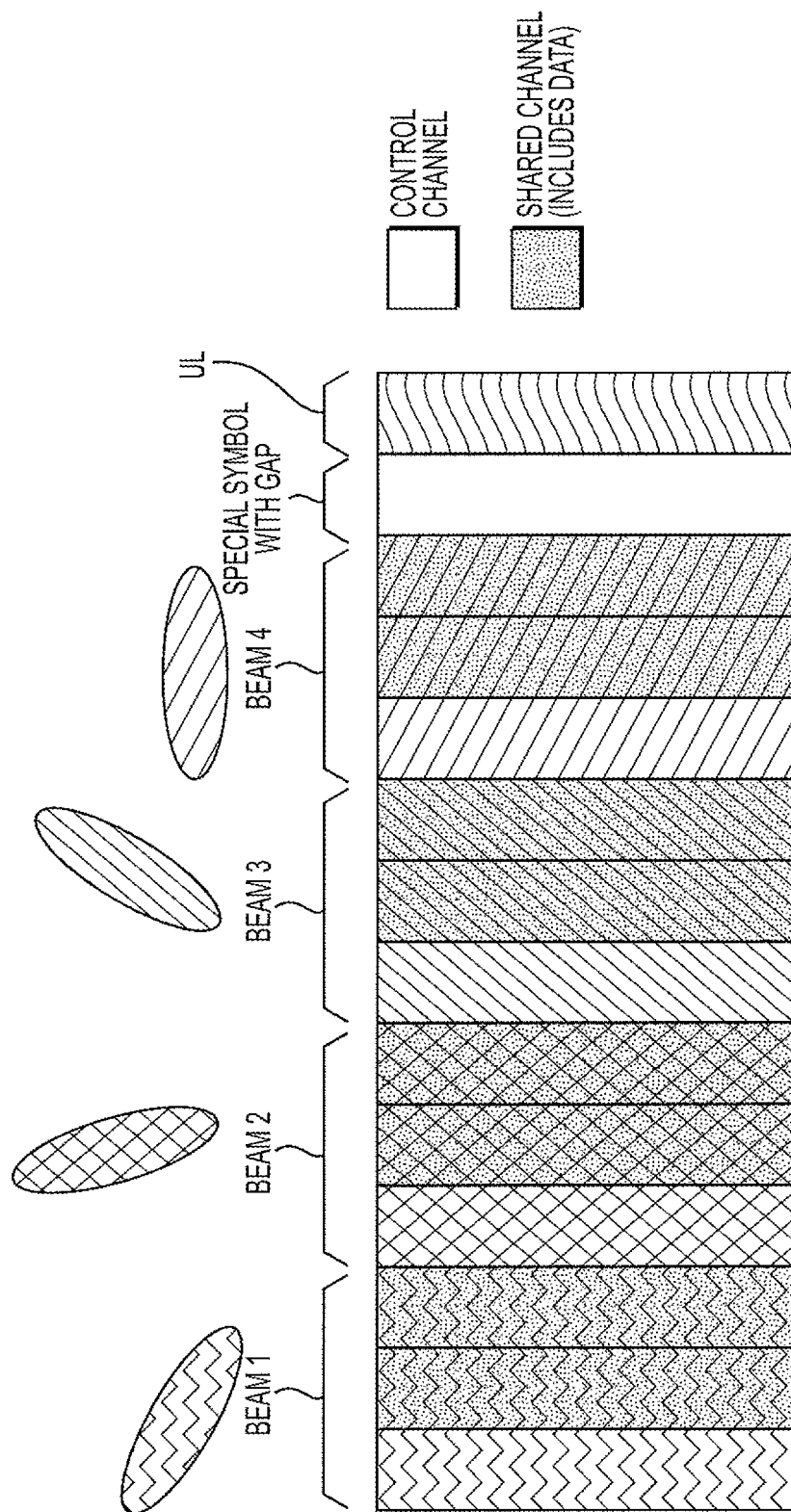
FIG. 4 is a diagram that illustrates each beam the control region is followed by shared channel transmission

In another embodiment, each beam may carry multiple symbols including control and data as shown in FIG. 4 where the NR-DCI in the beam may allocate resources for an UL and/or DL grant in the same beam. The advantage of this scheme is that the latency between the control and data is minimal. Generally, for the schemes described above, control and data transmission could occur in different beams, For example, beams for control signaling may be wider than those for data signaling.

According to another embodiment, solutions for RS design for NR are proposed. Certain types of NR-DCI such as common control signals may be transmitted for beam-wide reception. The NR-DCI can leverage the beam-RS which is intended for identifying a beam and for measurements of a beam for also estimating the channel.

If NR-DCI is transmitted through multiple ports (as in transmit diversity) a new form of "Control-RS" with appropriate density may be introduced to aid channel estimation of NR-DCI. This control-RS would be transmitted for each port that is supported for NR-DCI transmission. This control-RS may be cell/beam specific and its location and resources may depend on one or more of the following: (i) Cell ID; and (ii) Beam ID.

The control-RS may be transmitted to cover channel estimation for the entire frequency range of the DCI symbols or may be transmitted in a limited region where DCIs transmitted with those ports are mapped in frequency.

Figure 5:
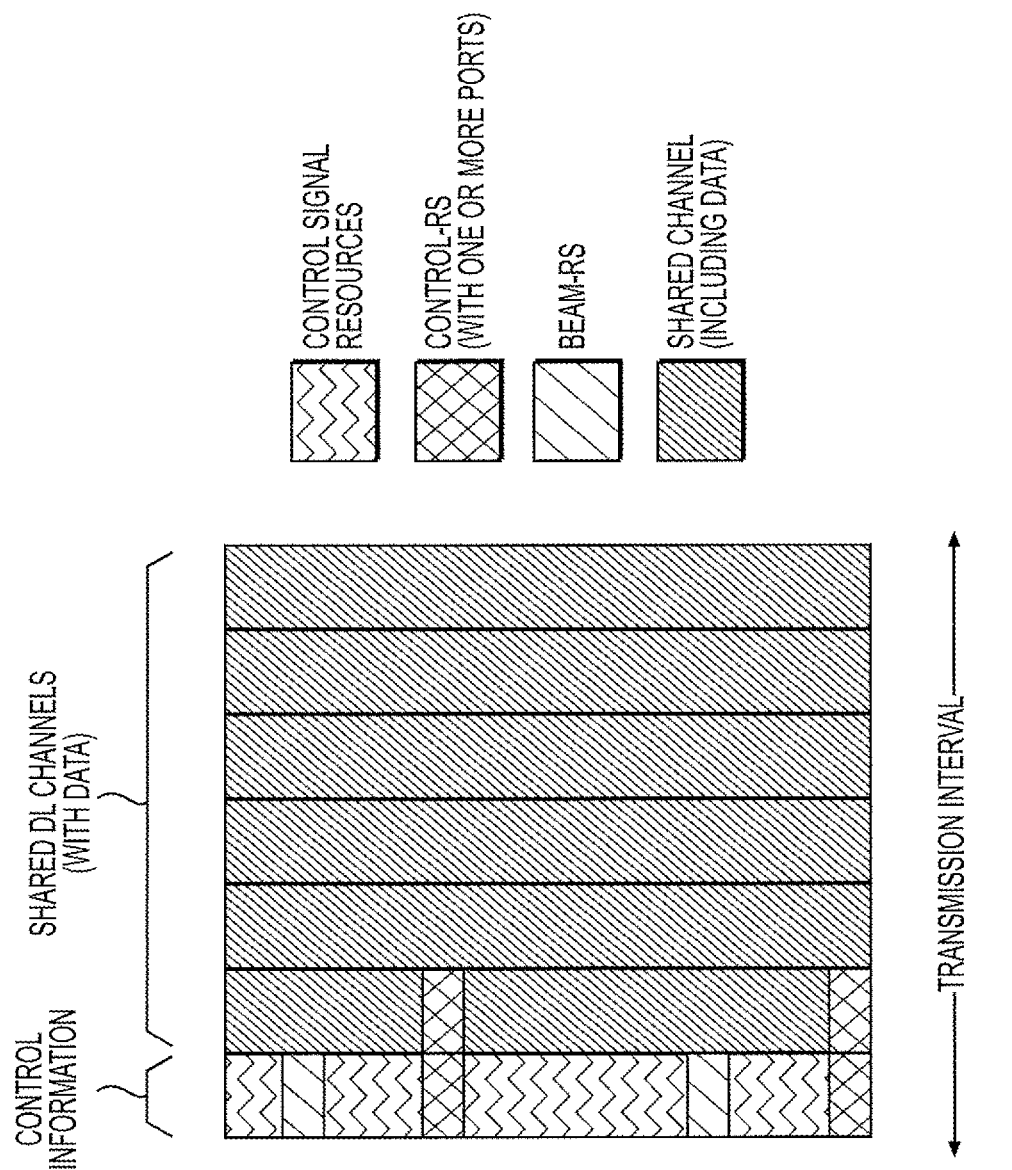
FIG. 5 is a diagram that illustrates a control RS or beam RS may be used to estimate the channel

FIG. 5 illustrates the beam-RS and control-RS ports. The control-RS may be defined for more than 1 port. The resources for multiple ports may be defined with orthogonal covering codes similar to the OCCs for DMRS ports in LTE.

Certain types of NR-DCI, especially UE-specific signals may be precoded to improve spatial separation and coverage. For such use cases, "control-DMRS" may be introduced to aid in channel estimation.

Figure 6:
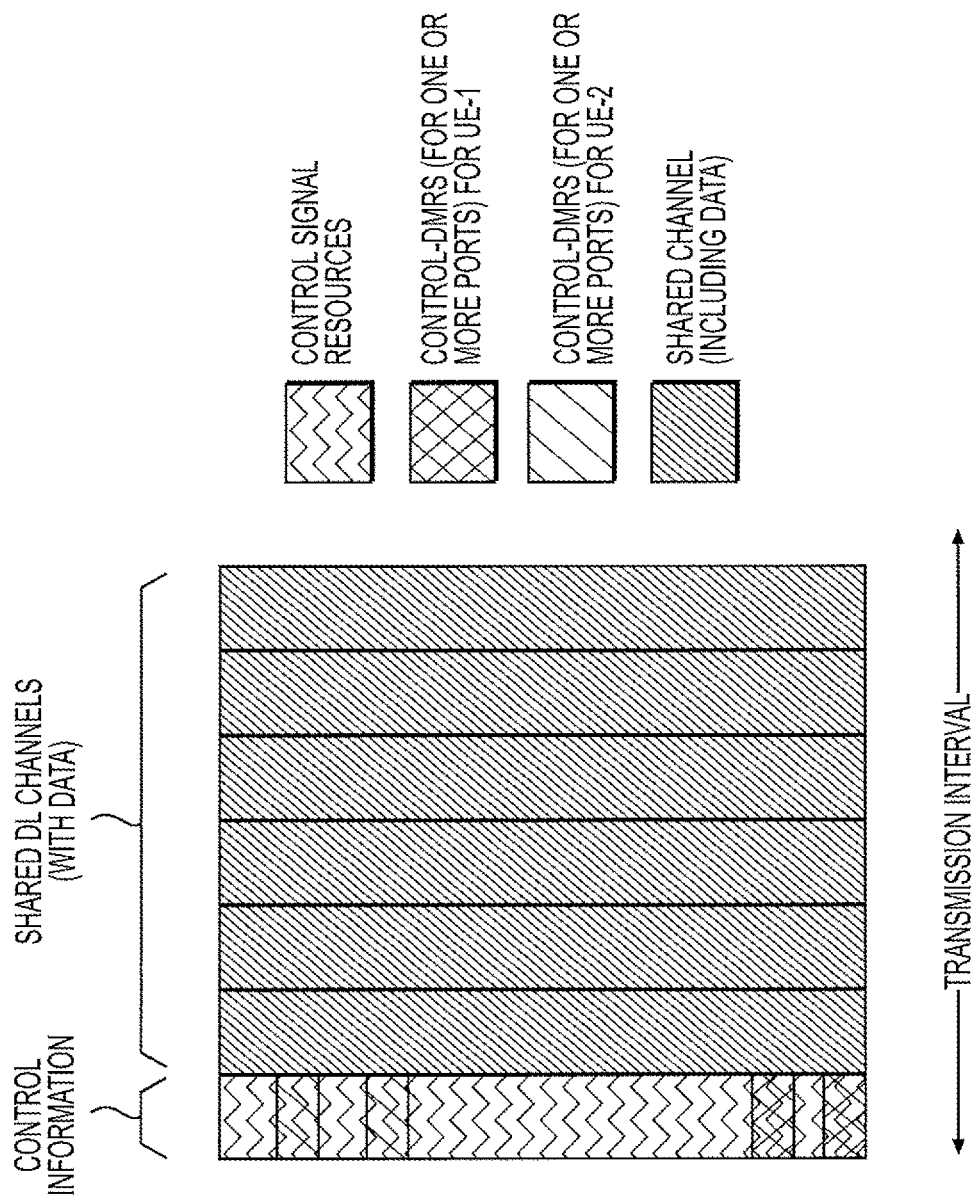
FIG. 6 is a diagram that illustrates a control DMRS is used in UE-specific manner to decode the NR-DCI.

FIG. 6 shows a Control DMRS used in UE-specific manner to decode the NR-DCI. The NR-DCI may be transmitted on multiple ports (transmit diversity or beamforming) and correspondingly the control-DMRS would be precoded similar to the precoded NR-DCI and will be supported on the ports used for data transmission. If the data and control are transmitted on the same beam, they may share the control-RS or control-DMRS resources.

Figure 7:
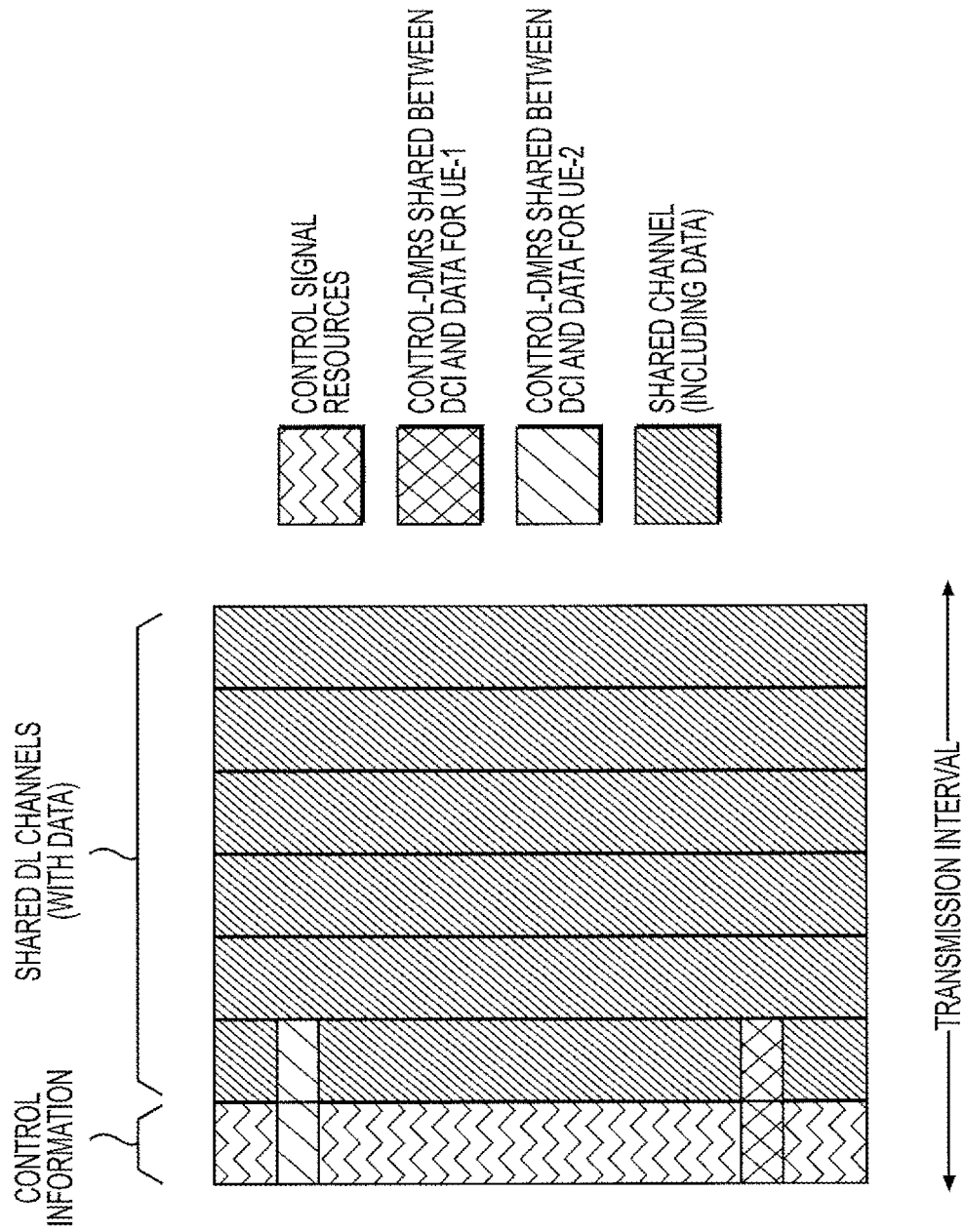
FIG. 7 is a diagram that illustrates a control DMRS shared between control and data region if they are precoded in the same way.

FIG. 7 shows a control DMRS shared between control and data region if they are precoded in the same way. The beam-RS, control-RS and control-DMRS can be located in close proximity to the control region to provide high control channel reliability.

According to yet another embodiment, the NR-DCI may use a fixed number of control signals or fixed duration for control signaling in every transmission interval. This could be a slot or mini-slot or subframe. For such a design, NR does not need to transmit a PCFICH-like channel as the control signaling resource is fixed. The control signaling resource may be indicated through critical system information such as the MIB or SIB1/SIB2 or may be set to fixed values in the spec.

Figure 8:
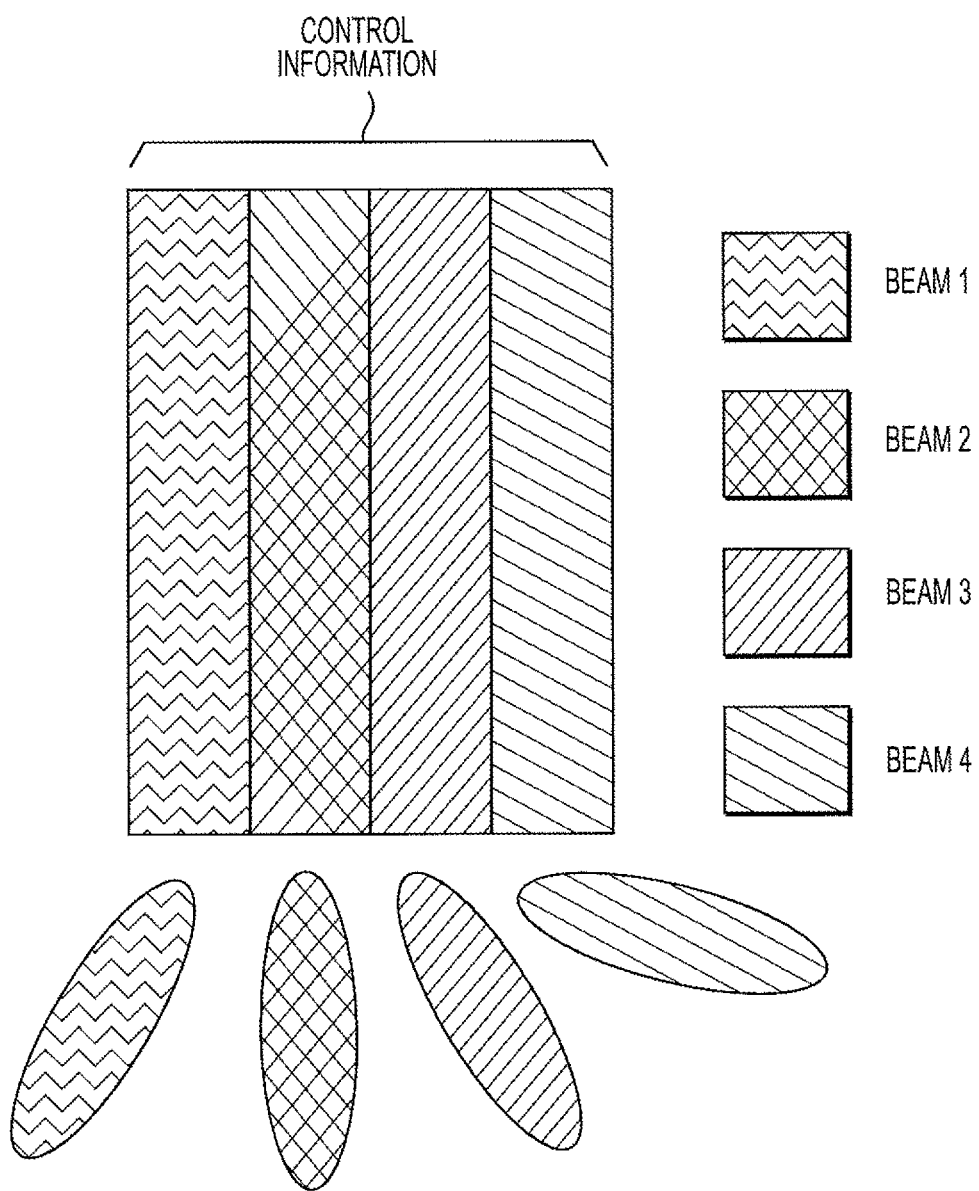
FIG. 8 is a diagram that illustrates a beam sweeping through control symbols of same numerology.
Figure 9:
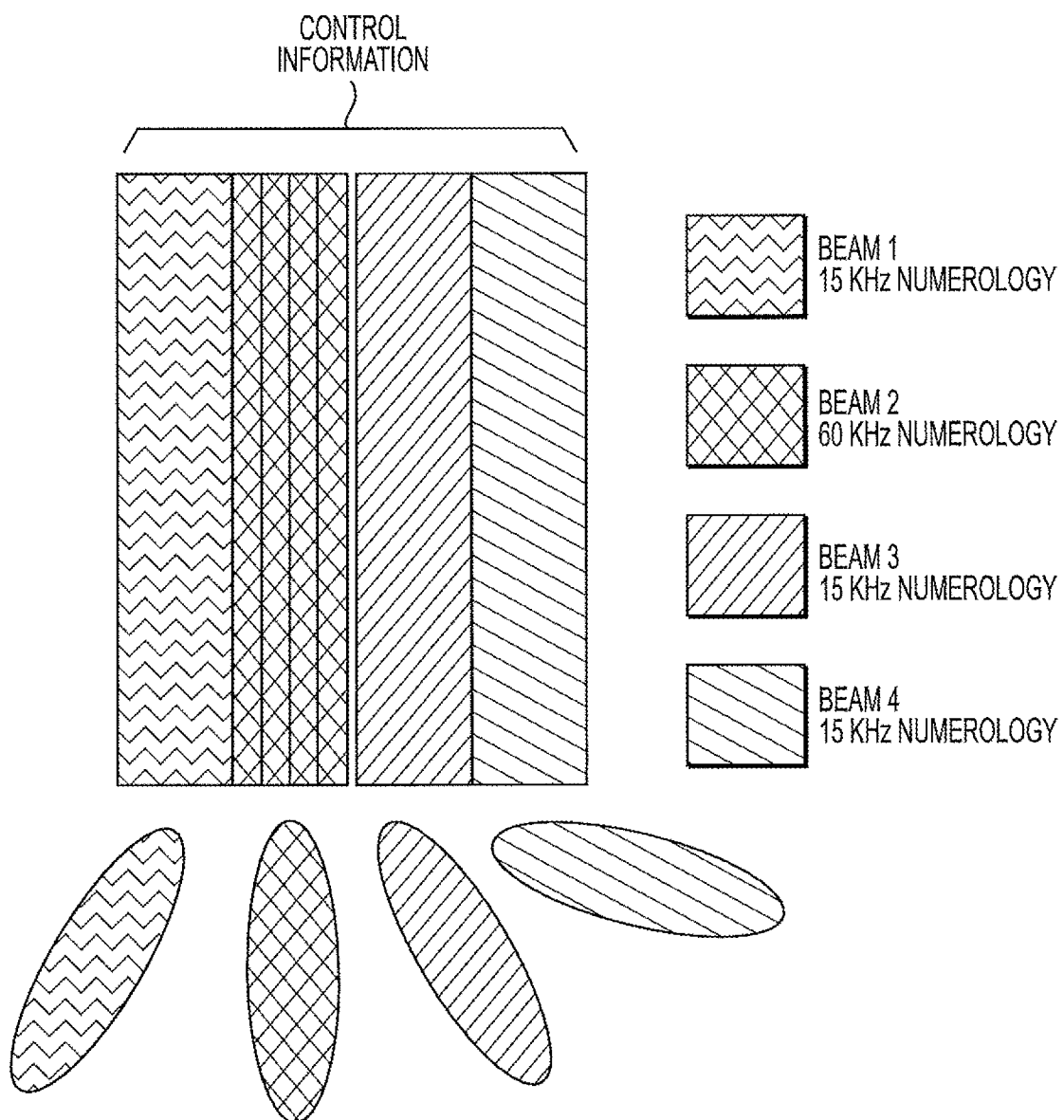
FIG. 9 is a diagram that illustrates a beam sweeping through control signals of different numerologies.

FIG. 8 shows an example where the number of control signals is the same in every transmission interval. FIG. 9 shows an example where the duration of the control signaling is the same for all numerologies multiplexed in FDM/TDM in the resource grid. So a transmission interval using 60 KHz subcarrier spacing uses 4 symbols for control signaling whereas a transmission interval operating at 15 KHz uses 1 symbol for control signaling within that transmission interval. This solution ensures that the beams sweeps in every direction for the same period of time.

Alternatively, the spec may specify the number of symbols for each numerology. The number of symbols may depend on one or more of the following: (i) center frequency; (ii) bandwidth; and (iii) number of beams supported.

According to a further embodiment, NR has support for large bandwidths exceeding 80 MHz. If a UE is required to blindly decode the NR-DCI across the entire bandwidth it will experience significant latency and battery drain. As a result, NR must allow transmission of the NR-DCI to a UE in specific subbands. The UE must be configured to have knowledge of the resources of these subbands.

Figure 10:
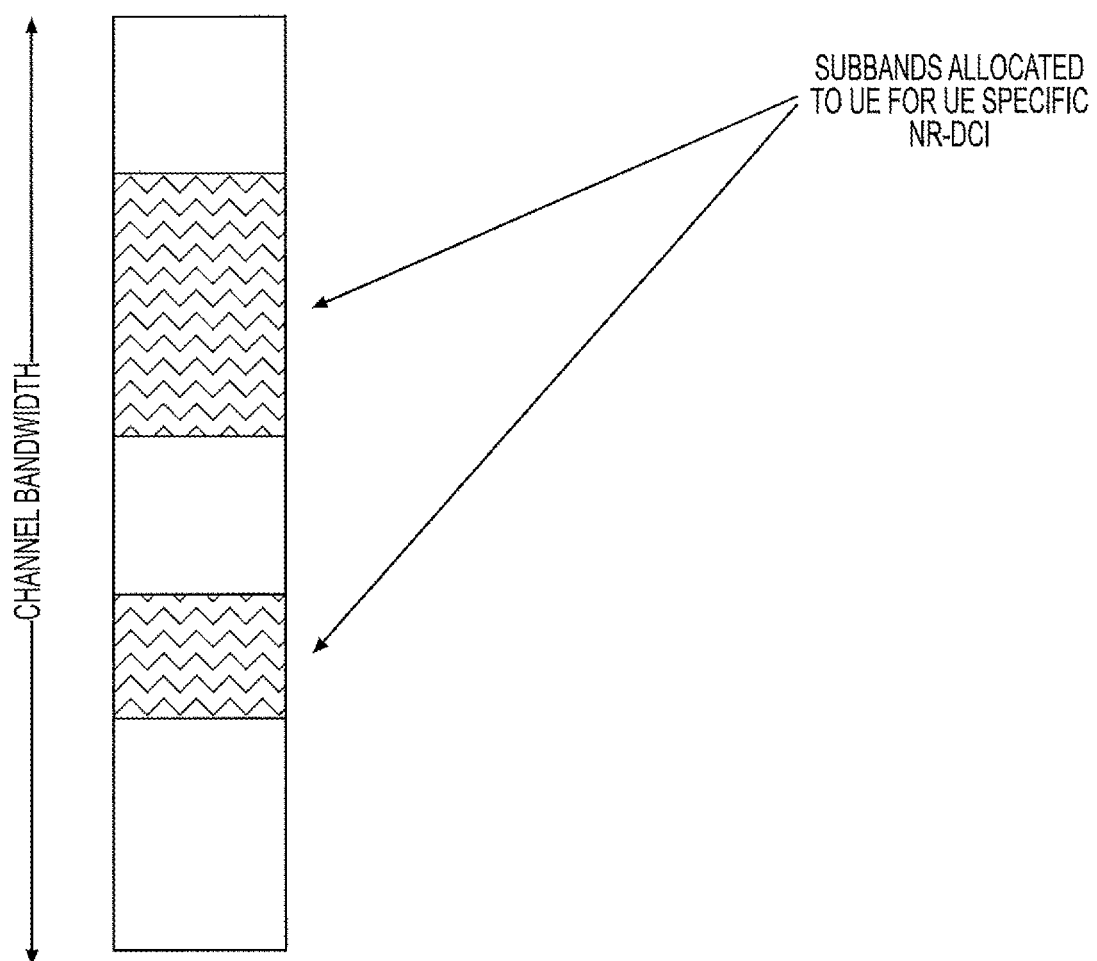
FIG. 10 is a diagram that illustrates a Sub-band allocation to a UE to limit the search space for control signaling.

The UE-specific NR-DCI may be indicated within a limited number of resources (subbands) which are known apriori at the UE. The subbands may be configured semi-statically through RRC and MAC CE updates. FIG. 10 shows an example where the NR-DCI is carried in UE-specific subbands. The subbands may be allocated based on UE capabilities, i.e. the UE may inform the network about the maximum bandwidth that it can process at a time. Note that the subbands allocated to a UE need not be contiguous in frequency.

The search space for common control signaling may carry NR-DCI such as those for paging, RACH response, etc. be limited to specific subbands so that UEs do not have to blindly decode all the resources in the common control signaling search space.

Figure 11:
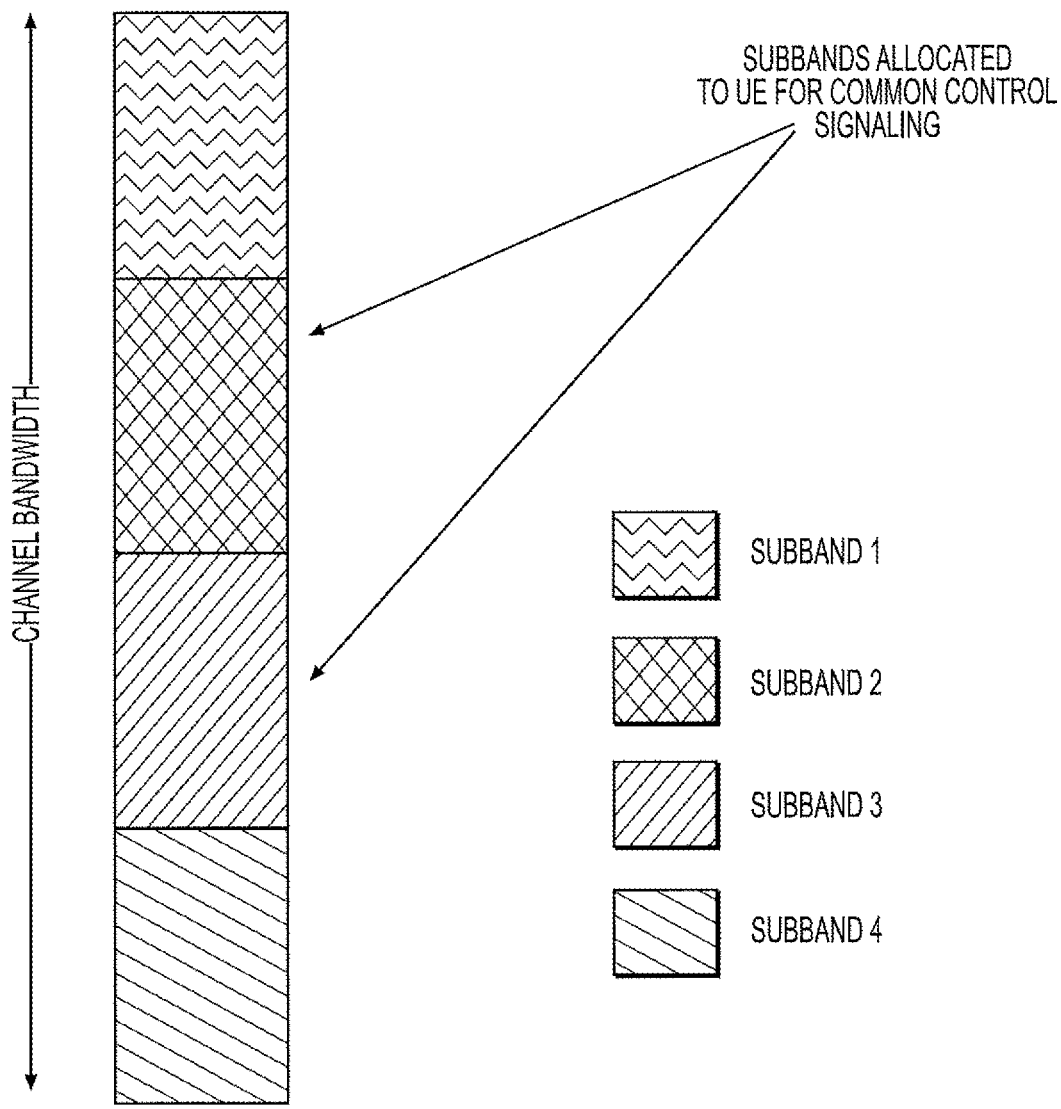
FIG. 11 is a diagram that illustrates a Sub-band allocation to common control signaling.

The common control signaling search space may be partitioned into multiple search spaces and UE may be assigned to search for the common NR-DCI only within a subset of those search spaces. FIG. 11 shows an example where the common signaling search space is partitioned into 4 search spaces and a UE is configured to search for its common NR-DCI only within 2 of those spaces.

Figure 12:
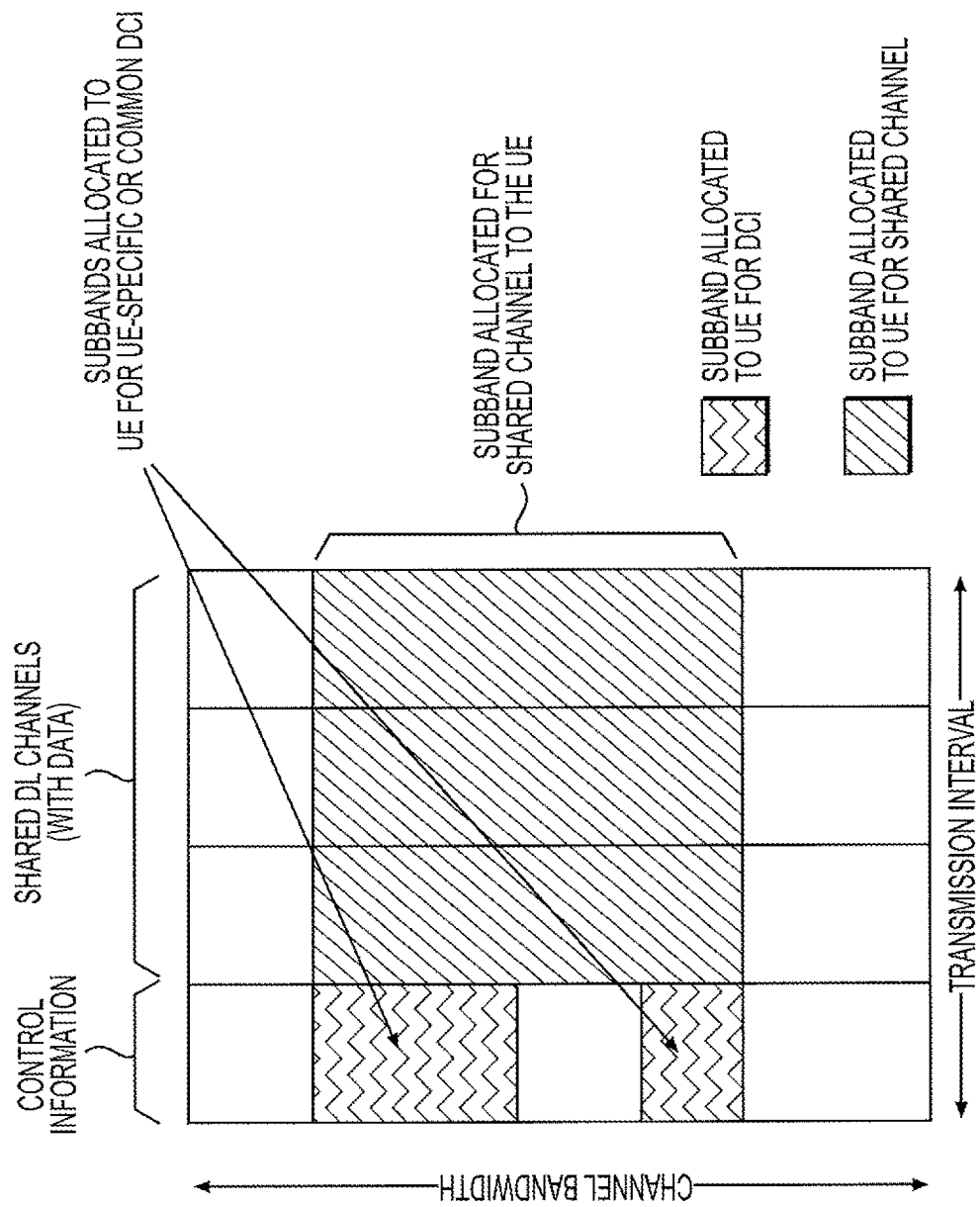
FIG. 12 is a diagram that illustrates Sub-band operation for shared channel.

Similar to the solution described above for subband operation for UE-specific and common NR-DCI, Physical DL shared channel (NR-PDSCH) carrying the data may also be restricted to subbands. This limits the number of times the UE's front end has to be re-tuned to a new frequency for reception. The subbands for NR-PDSCH may be semi-statically configured through RRC and MAC CE updates. FIG. 12 shows an example where the NR-PDSCH for a UE is transmitted over preconfigured subbands; so the UE is tuned to perform reception of data only over the range of frequencies covering the subbands.

According to a further embodiment, the UE may be configured to transmit within a subband rather than the entire bandwidth to limit the amount of front end and receiver processing. Accordingly the UL resources would be constrained within a subband. The subband may be preconfigured semi-statically through RRC or MAC CE updates or specified dynamically through the UL grant.

Figure 13:
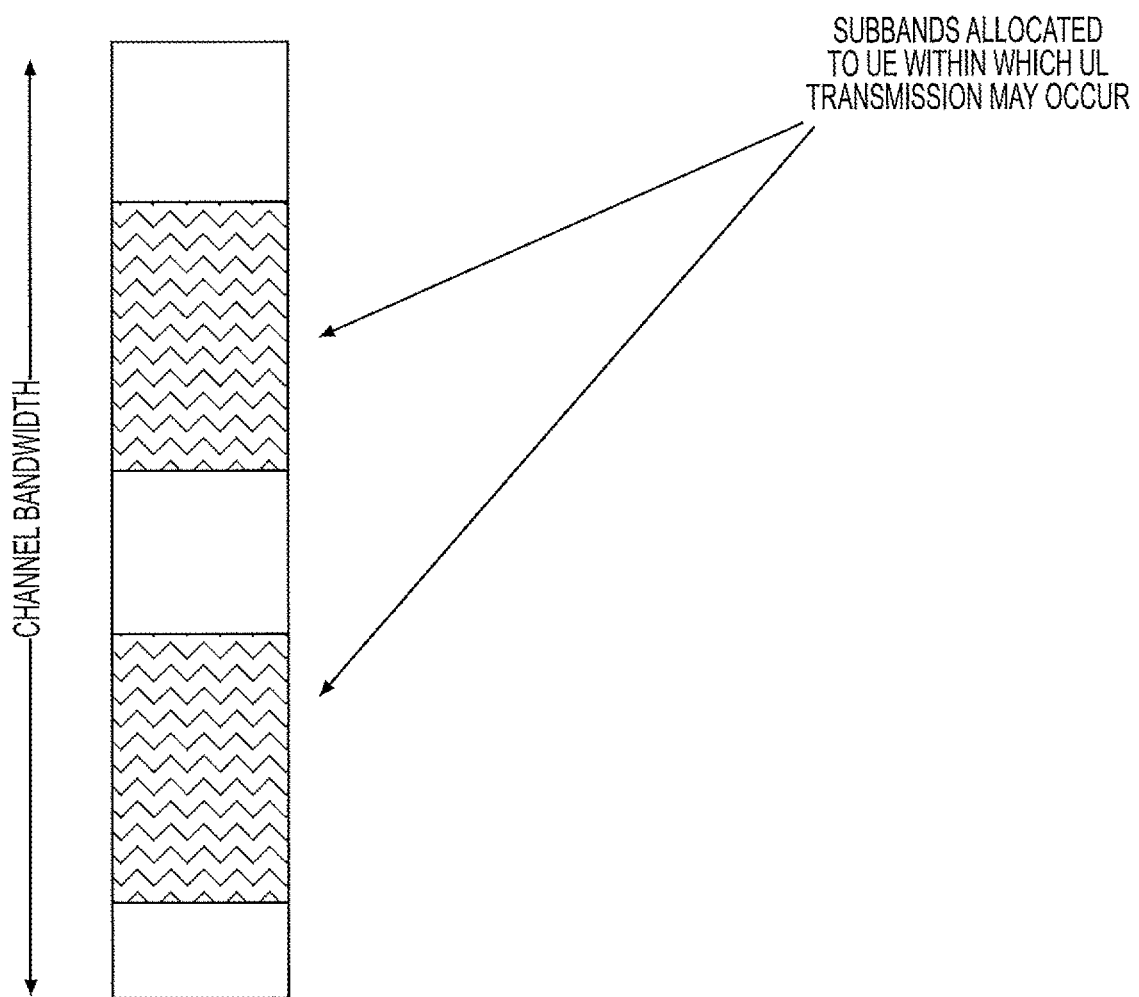
FIG. 13 is a diagram that illustrates UL operation of UE within allocated subbands.

FIG. 13 shows example of resource allocation for UL transmission for CP-OFDM or DFTS-OFDM within a subband. Here one or more subbands are allocated to the UE within which the UE is provided its UL grant. Similarly, for UL grantless transmission, a subband of frequencies may be indicated to a UE to transmit its grantless signal. When resource hopping is used, the UE may transmit within one or more subbands and the hopping resources may not occupy the entire bandwidth.

In an embodiment, it is envisaged that the waveform (CP-OFDM or DFT-S-OFDM) is assigned to a UE by the network. Here, the NR-Node makes the decision for the UE on which waveform to use. NR-Node can decide the waveform for the UE based on feedback from UE (such as beam or cell measurements or CQI) or from SRS or other RS on the UL. The configuration of the waveform may be done in the following ways:
  1. Dynamically through DL-control signaling (DCI/PDCCH) (DCI may support multiple formats which may explicitly indicate the waveform or the DCI may have to be blindly decoded for either possibility of the waveform); and
  2. Semi-static through RRC and MAC CE Mechanisms for Reference Signal Designs According to another aspect of the application, it is envisaged to support a wide range of user mobility scenarios with low-latency in NR, reference signaling may be enhanced in DL NR. DM-RS location within a slot/mini-slot or subframe should be flexible and adaptive to scenario-specific performance requirements. For example, FIG. 2 shows that DM-RS could be front-loaded, bringing two-fold advantages. Firstly, the proximity of DM-RS to control data allows accurate estimation channel at control data resources, thereby rendering accurate demodulation/decoding of control data. Secondly, an early DM-RS will minimize the delay in demodulation/decoding by delivering channel estimates early on. These two advantages make it very suitable for the use case of URLL.

Figure 3:
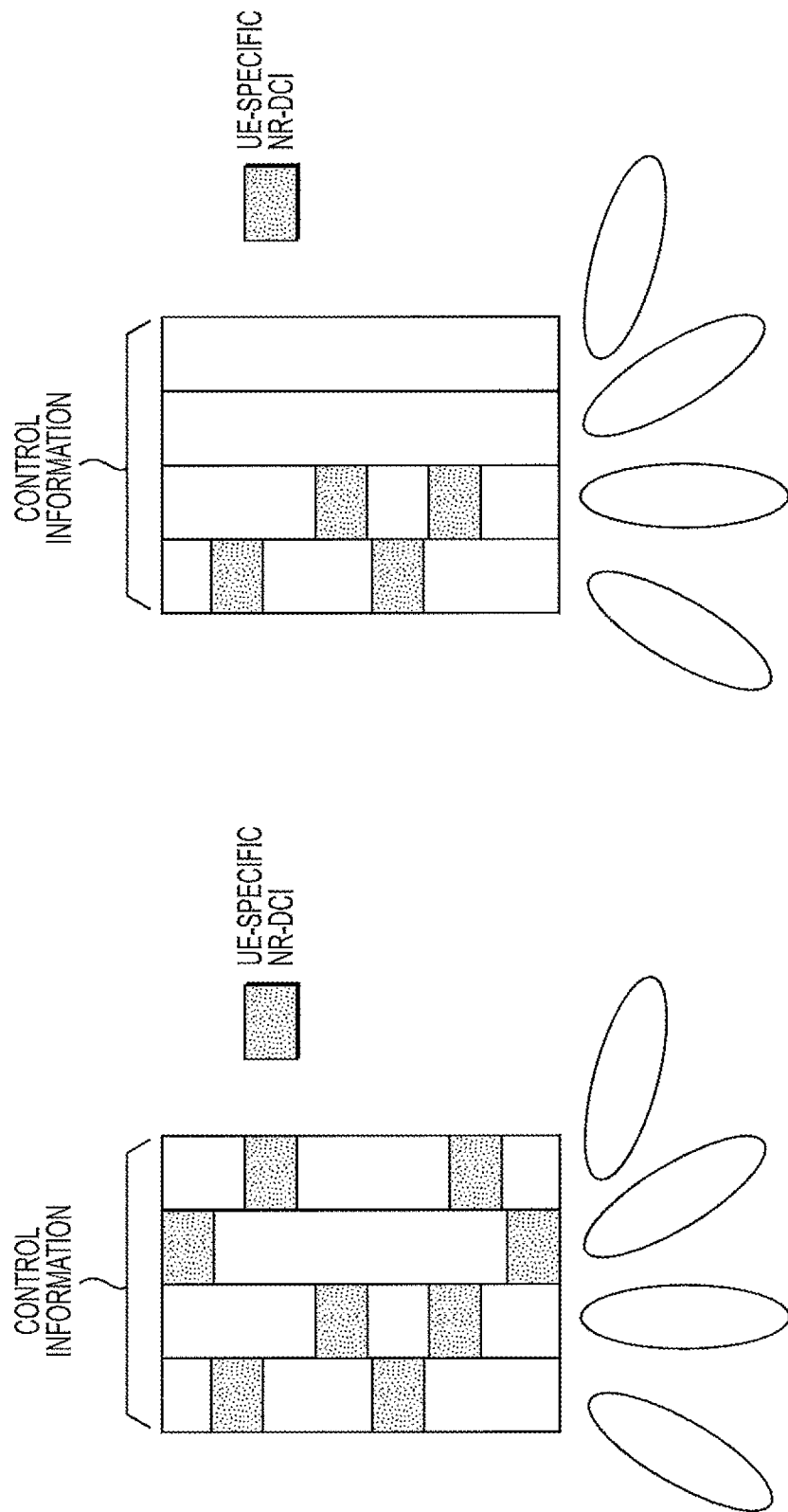
FIGS. 3A-B illustrate some NR-DCI may be repeated on the beams.
Figure 14:
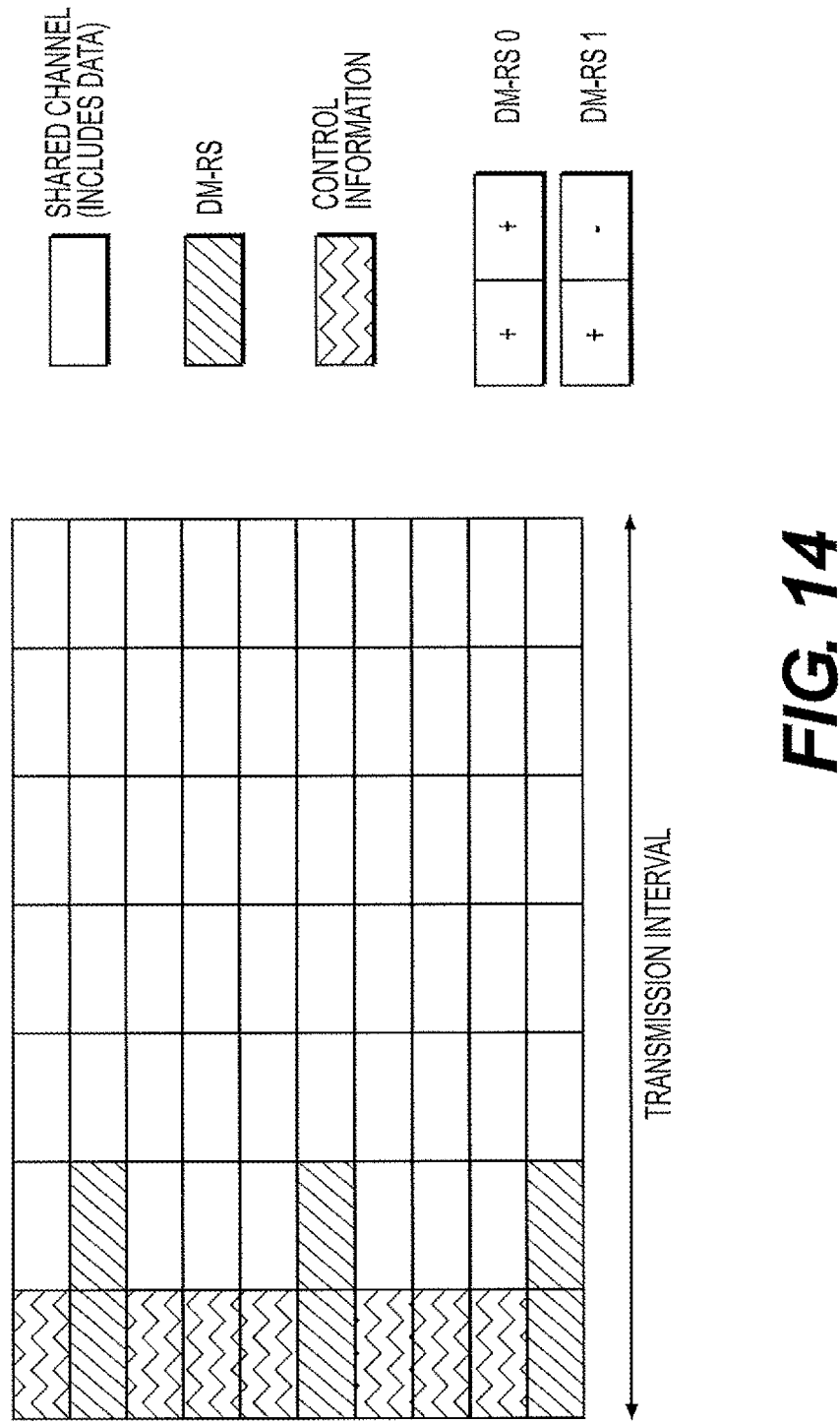
FIG. 14 is a diagram that illustrates Front Loaded DM-RS pattern multiple ports may be supported using OCC.
Figure 15:
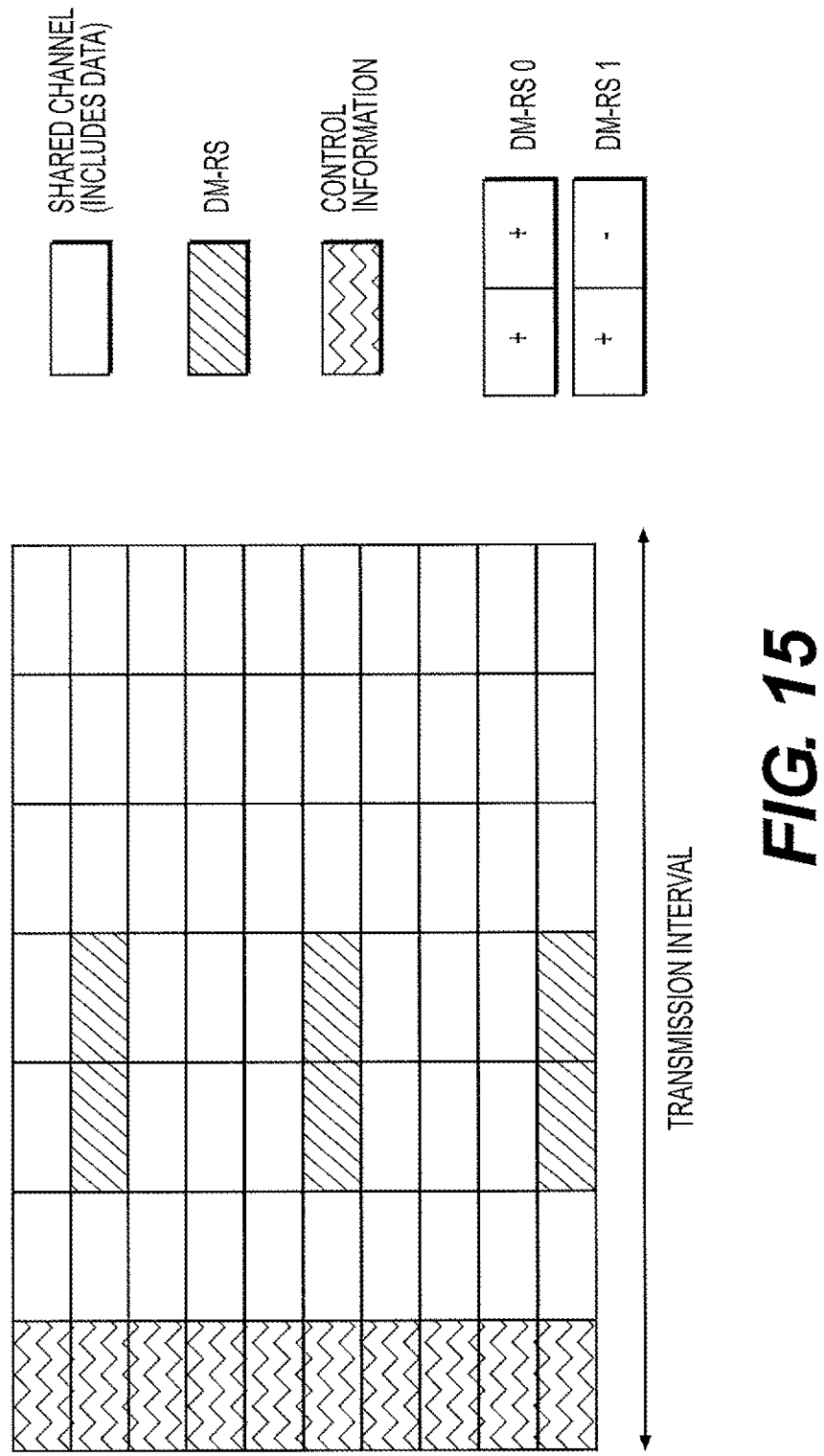
FIG. 15 is a diagram that illustrates a DM-RS placement in center symbols of the transmission time

FIG. 14 shows support for two ports via OCC. In general support for N-layers can be achieved via appropriate codes. FIGS. 3 to 5 further show three examples of suggested placement of DM-RS. FIG. 15 shows that DM-RS may be placed in the middle of a transmission interval so that channel estimates obtained over the entire duration of the interval are more accurate compared to having front-loaded DM-RS. Although the latency is higher for decoding control information, mMTC and eMBB may be able to tolerate the latency.

Figure 16:
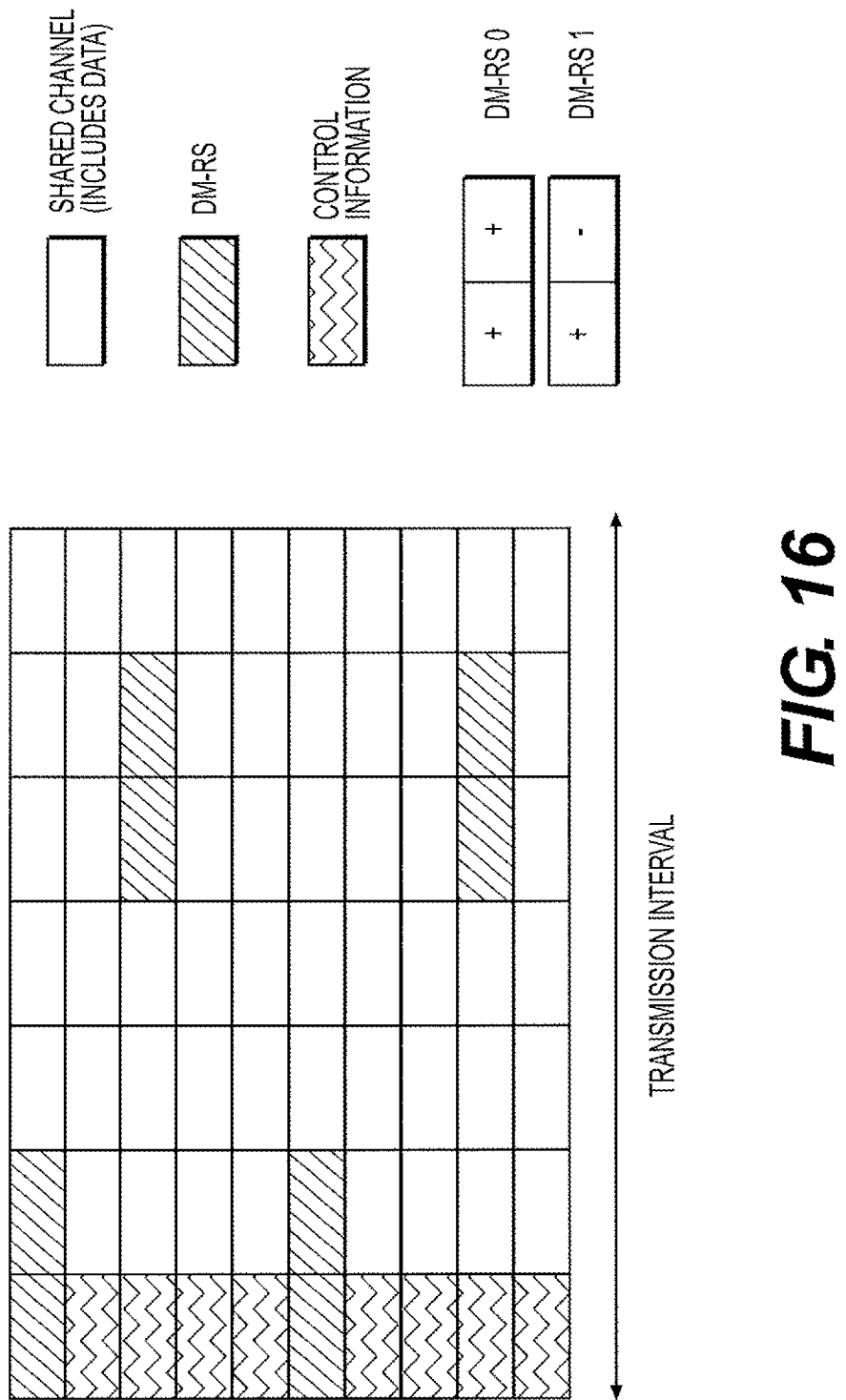
FIG. 16 is a diagram that illustrates DM-RS for higher mobility scenarios should be spread over time.

FIG. 16 shows DMRS allocated with higher density in the transmission interval. For example, for high Doppler scenarios, the DM-RS may be allocated in multiple symbols spread over time, to enable accurate channel estimation.

For a scenario where the UEs have low mobility, the DM-RS could be placed at the end of a minislot 'i', and be used to provide channel estimates to subframes 'i' and 'i+1'.

Figure 17A:
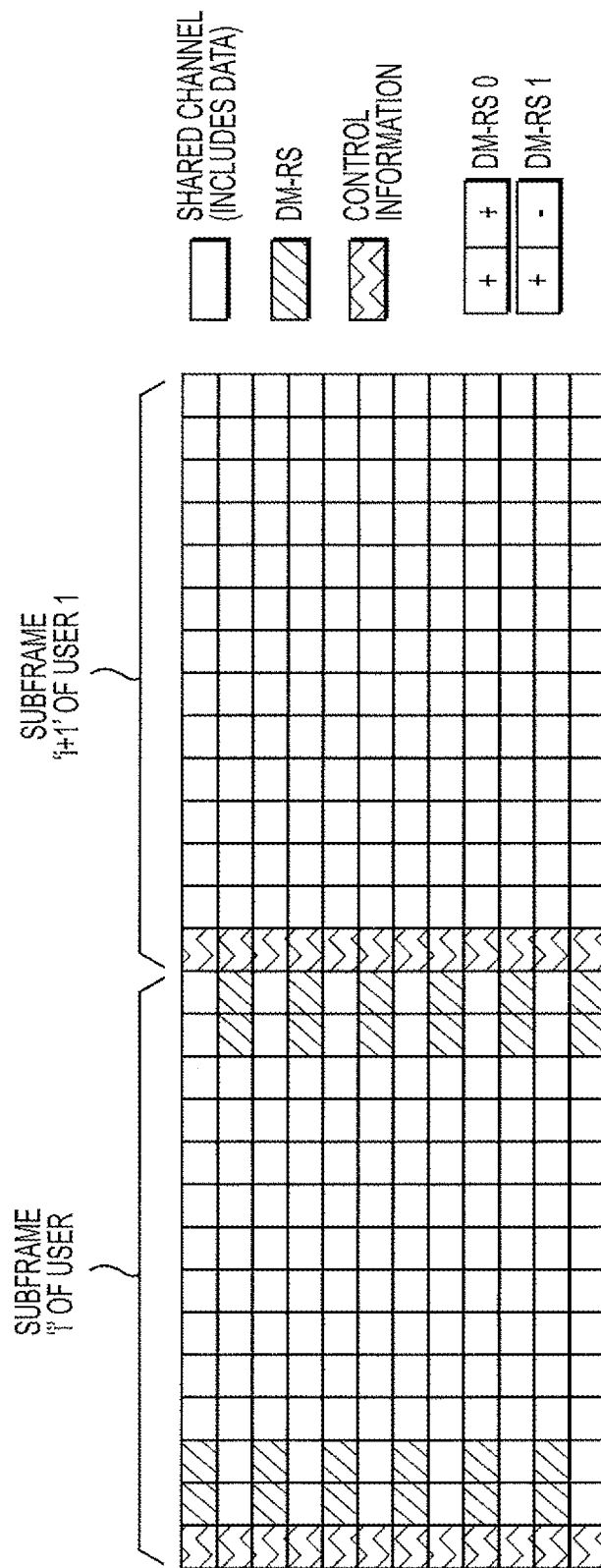
FIGS. 17A-B illustrate DM-RS sharing between two sub-frames for low mobility, high throughput scenarios.
Figure 17B:
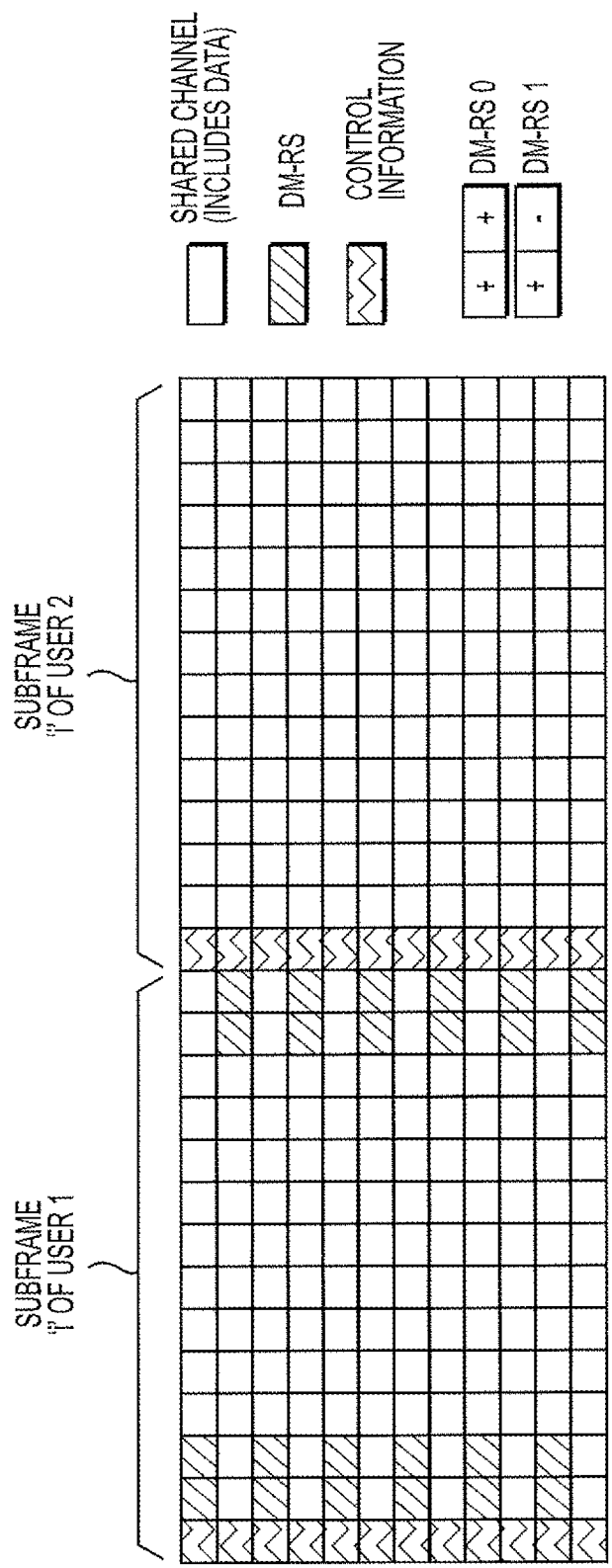

Similarly, DM-RS can be shared between multiple UEs. For UEs 1 and 2 that have consequent RBs in the same band, the DM-RS could be placed at the end of subframe '1', and be used to provide channel estimates to two subframes belonging to different users. FIGS. 17A-B illustrate the aforementioned scenarios.

In FIGS. 17A-B, DM-RS is shared between two subframes for low mobility, high throughput scenarios: (a) Sharing between two subframes of the same user; and (b) Sharing between subframes of two different users precoded the same way.

Figure 18:
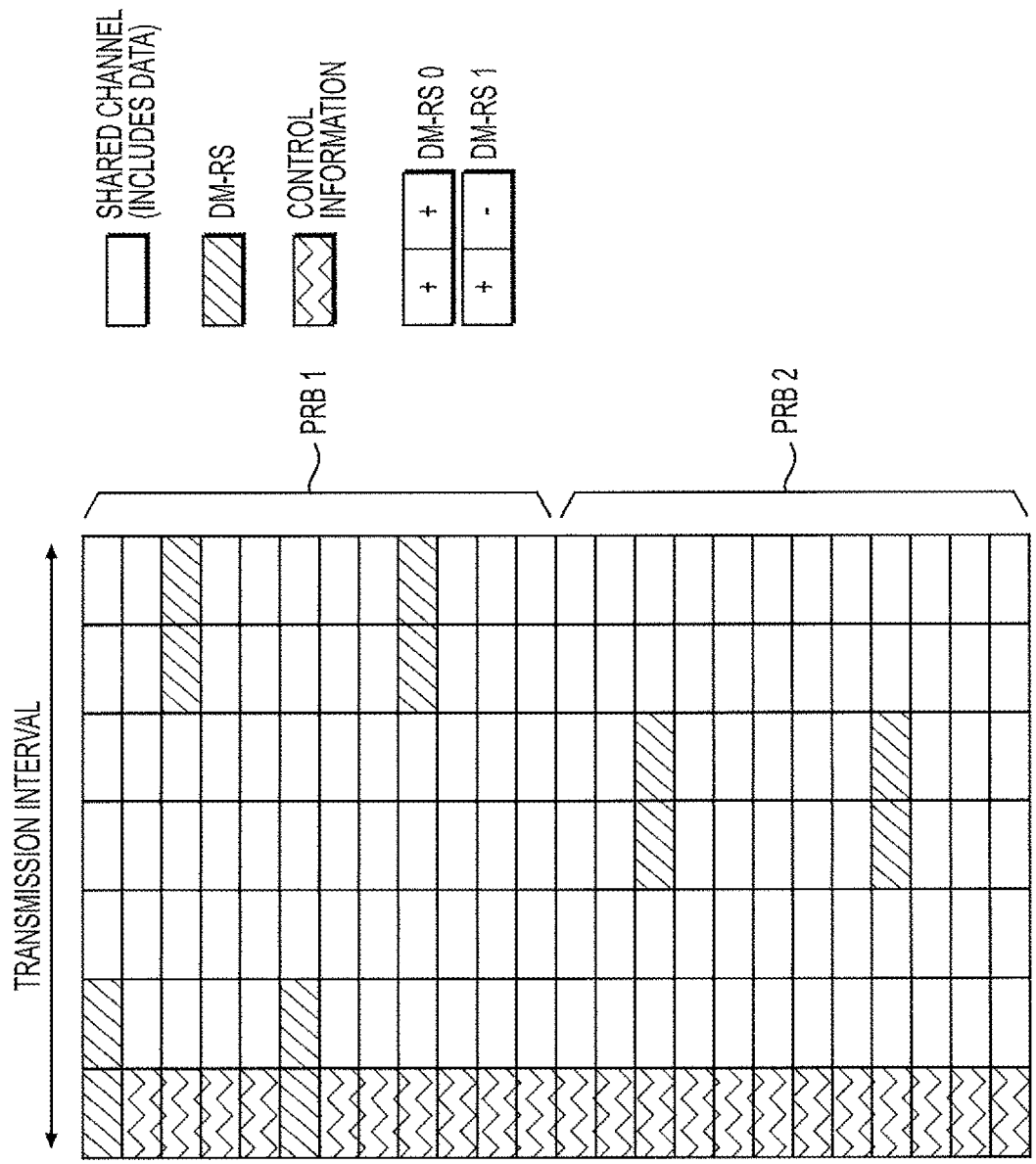
FIG. 18 is a diagram that illustrates two bundled PRBs undergoing the same precoding may have different DM-RS patterns.

NR can support PRB bundling and allow flexible location of DMRS resources in the bundled PRBs. In FIG. 18, two bundled PRBs with different DM-RS patterns undergo the same precoding. PRB1 may have the DMRS allocated in a manner where it can be shared with a neighboring UE. But PRB 2 may have lower density of DMRS allocation.

The resource assignment of DM-RS can be either dynamic or semi-static. Dynamic signaling can be done through DCI. The specification may specify a list of possible DM-RS patterns (locations and sequences) out of which one may be assigned to a UE. The assigned resource may be indicated through an index into the list. When semi-static signaling is used, RRC or MAC CE updates will indicate the DM-RS configurations. It is envisaged the DM-RS will in general have same numerology as data.

In an embodiment, Tracking Reference Signals (TRS) for phase tracking in NR is described. Here, phase noise increases with increasing carrier frequency, thereby making it an important issue to solved in NR. The following solutions address phase tracking in NR.

TRS may not be sent all the time. Tracking RS need only be sent when needed and not always. This is important to avoid costly transmission overhead brought by TRS transmission. One or more of the following factors may influence the choice of switching TRS on or off:

Modulation order: The absence of phase tracking RS will have a much more deteriorating effect on BLER when data is higher order modulated compared to when it is lower order modulated.

Carrier frequency: Increasing carrier frequency will necessitate the need turn on Tracking RS.

UE speed: Increasing UE speed will increase the Doppler implying the need to turn on Tracking RS.

Sub-carrier Spacing: Increased sub-carrier spacing will increase inherent immunity of system to carrier frequency offset, thereby reducing the need for Tracking RS.

TRS may be UE specific or cell specific. On/Off signaling for tracking RS may be done via distinct signaling depending on whether it is UE specific or cell-specific. If it is UE specific then it may be configured via RRC signaling and turned on/off through RRC signaling/MAC CE updates or dynamically through the DCI. If TRS is cell/beam wide then system information may be used to signal its presence and resources.

Figure 19:
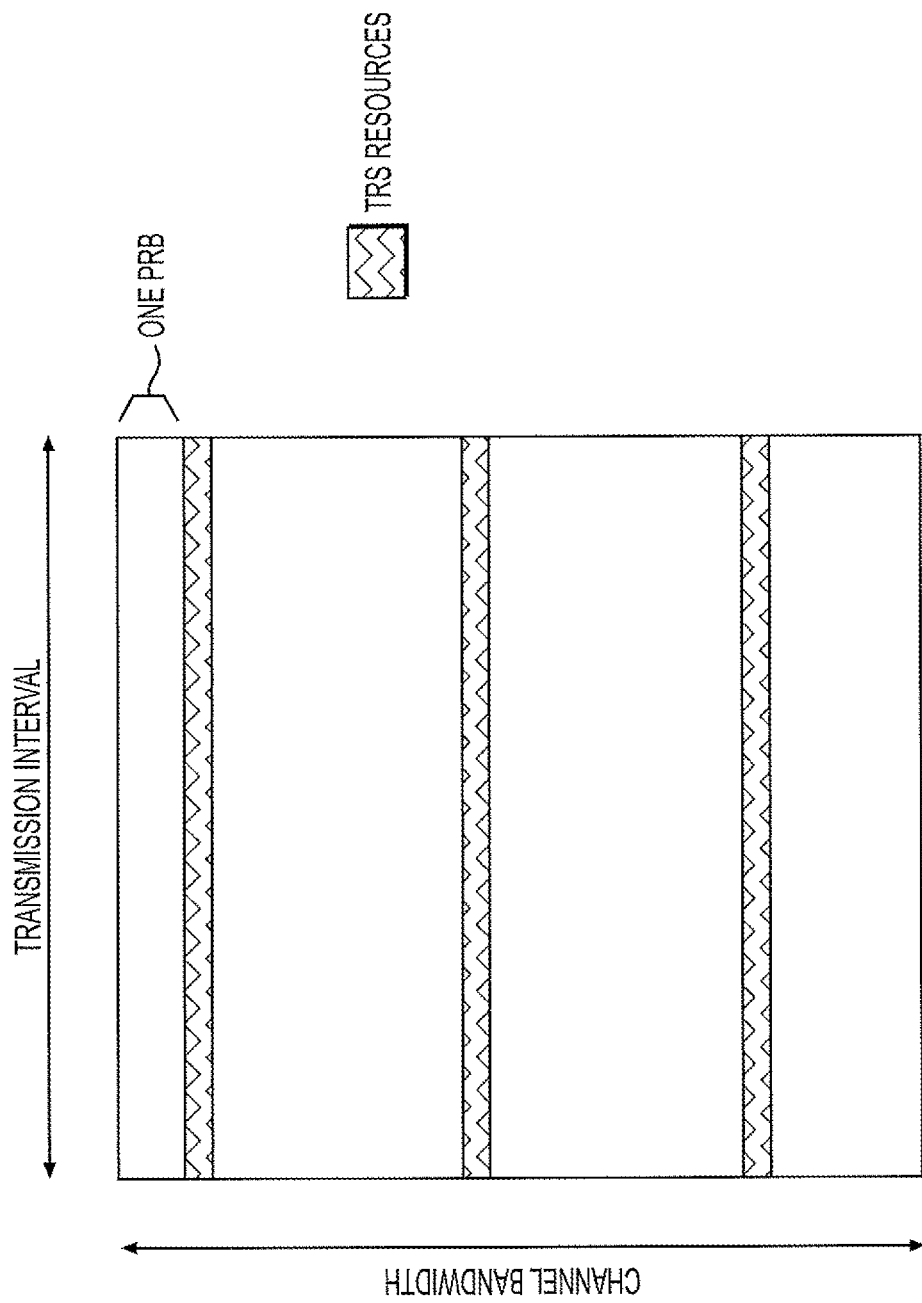
FIG. 19 is a diagram that illustrates TRS assigned in specific resources across the available bandwidth.
Figure 20A:
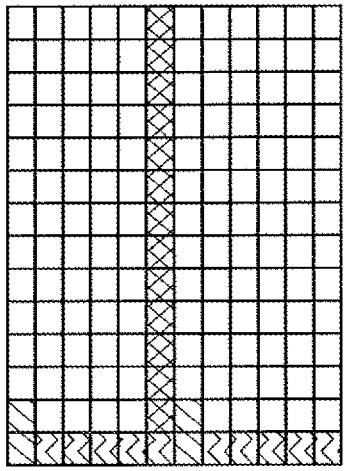
FIGS. 20A-C illustrate tracking RS is configured independently for each UE.
Figure 20B:
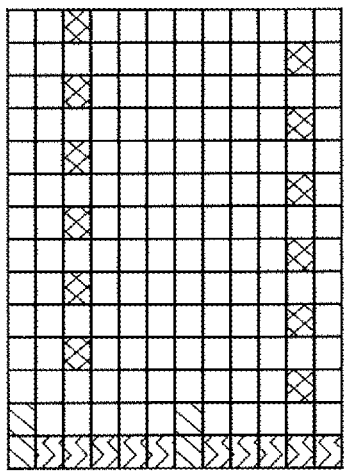
Figure 20C:
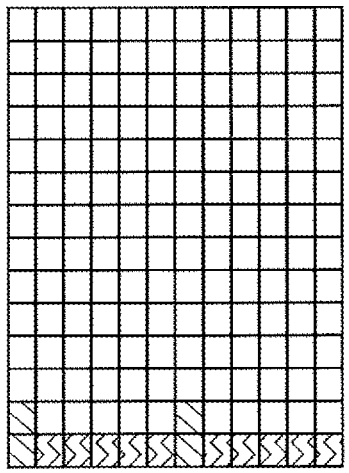

FIG. 19 shows the cell/beam wide case where TRS resources are assigned in specific locations in the grid. Enough TRS resources may be reserved so that UEs that may operate only in certain subbands of available spectrum can access the TRS. FIGS. 20A-C show the UE specific case where each UE can have TRS resources assigned according to its SNR, modulation, numerology, etc.

In case of UE specific TRS, tracking RS may be precoded. In addition, location and sequence of Tracking RS may depend on one or more of beam ID, cell ID, and UE specific resources, such as for example, a root/shift of a sequence assigned to the UE or location of the DL resources for the UE.

In case of cell/beam wide TRS, TRSs are transmitted in resources that are known to all UEs. TRSs could be a function of one or more of: (a) Cell ID; and (b) Beam ID. TRS transmission could be configured on one or more ports. In some instances, it may be sufficient to track phase by transmitting TRS on a single port. As a result, TRS on a single port may be supported by default. However, NR must also support more ports for TRS. The resources for the ports maybe configured for both cell/beam wide and UE specific use cases through DCI or RRC signaling.

Figure 21:
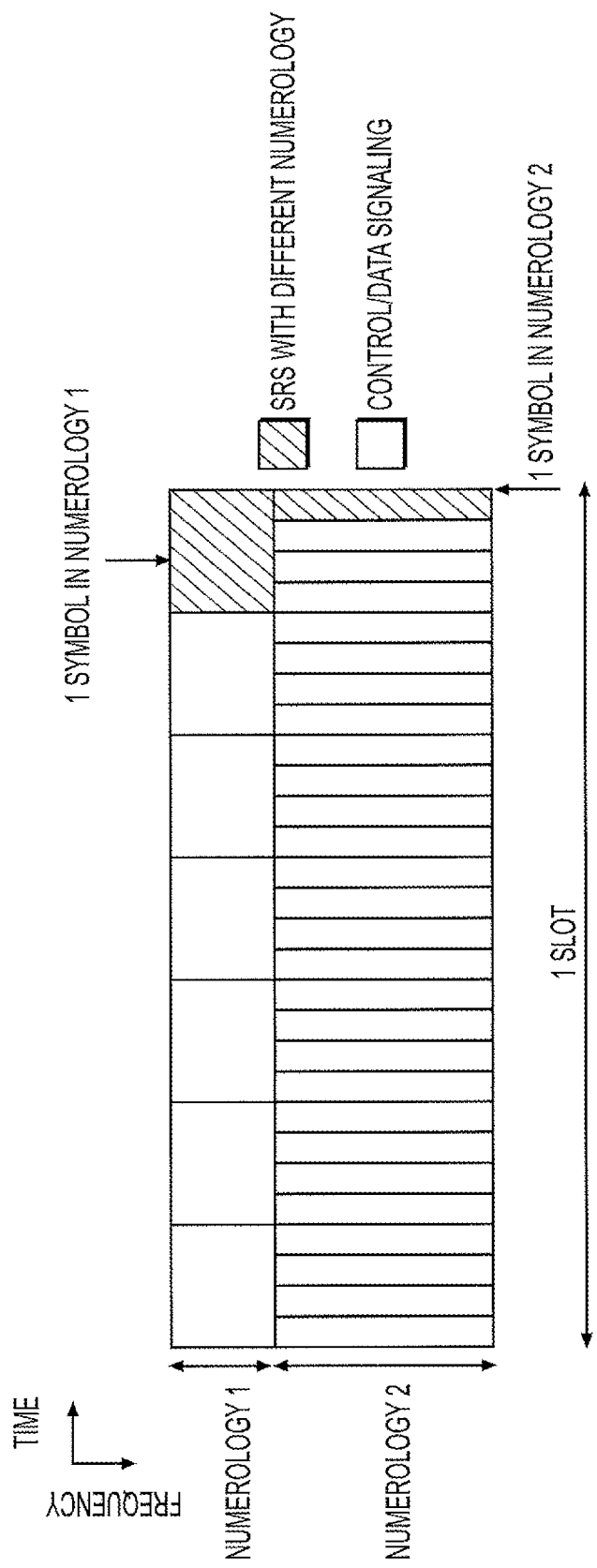
FIG. 21 is a diagram that illustrates sub-bands with different numerologies support NR-SRS resources corresponding to their respective numerologies

According to yet another embodiment, NR Sounding reference signal on UL (NR-SRS) is described. Since NR will support different numerologies, NR-SRS numerology and resources must allocated in a manner compatible with all supported data and control signal numerologies and TDM/FDM multiplexing of multiple users. The following solutions can address NR-SRS signaling aspects when multiple numerologies are supported simultaneously in a carrier. NR-SRS resource signaling may fall into one of the categories described below where the NR-Node can allocate any of the following resources for NR-SRS transmission:

1. Certain OFDM symbols or portions of the OFDM symbols may be reserved in a cell-wide or beam-wide manner for transmitting NR-SRS in each supported numerology. In FIG. 21, the network divides the transmission BW into two numerologies. Numerology 1 supports 15 KHz subcarrier spacing and Numerology 2 supports 60 KHz subcarrier spacing. Within the bandwidth assigned to each numerology, NR-SRS transmission will have the same numerology.

Figure 22:
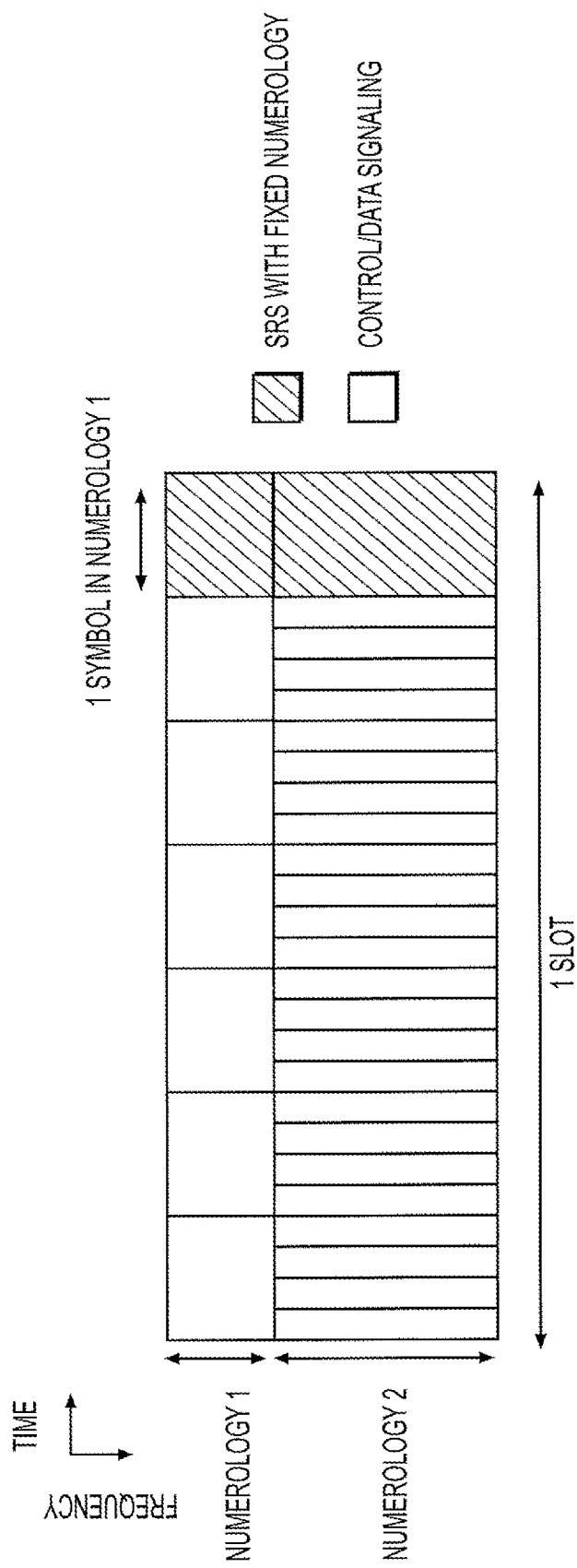
FIG. 22 is a diagram that illustrates fixed numerology for NR-SRS resources.

2. Certain OFDM symbols or portions of the OFDM symbols may be reserved in a cell-wide or beam-wide manner in a reference numerology that may be associated to the carrier frequency or indicated by the system information. This concept is illustrated in FIG. 22 where SRS is always transmitted at fixed numerology although other signaling may occur in other numerologies. FIG. 22 shows that NR-SRS is transmitted over 1 symbol corresponding to Numerology 1. The specific numerology can be assigned via either semi-static configuration such as RRC signaling or dynamic assigned by DL DCI.

Figure 23:
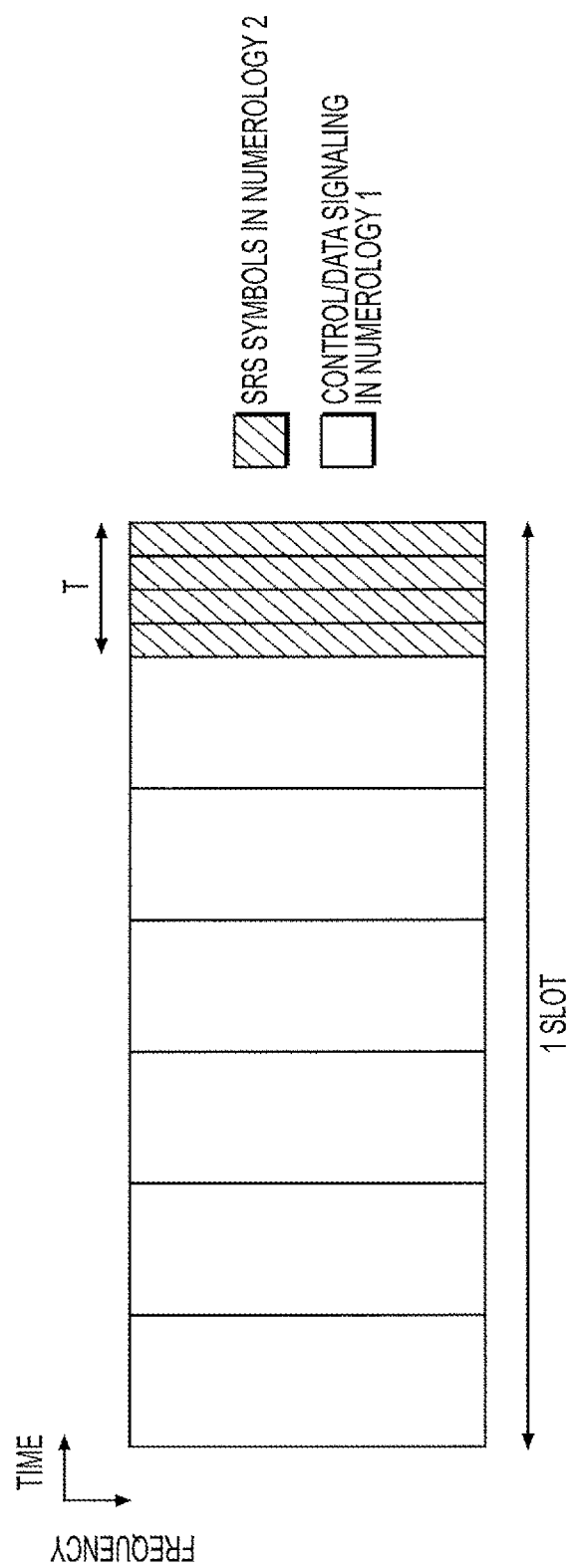
FIG. 23 is a diagram that illustrates NR-SRS signaled with different numerologies with reserved resources in time duration T.

Alternatively, the SRS resources may be defined in units of time and may be configured to support any numerology. In this case, the reserved time may carry a different number of NR-SRS symbols for different numerologies. This concept is illustrated in FIG. 23 where NR-SRS resource is reserved for a fixed duration T. Different numerologies may be used within this duration, for example, 1 symbol of NR-SRS at 15 KHz subcarrier spacing (Numerology 1), or 2 symbols of NR-SRS at 60 KHz subcarrier spacing (Numerology 2).

Figure 24:
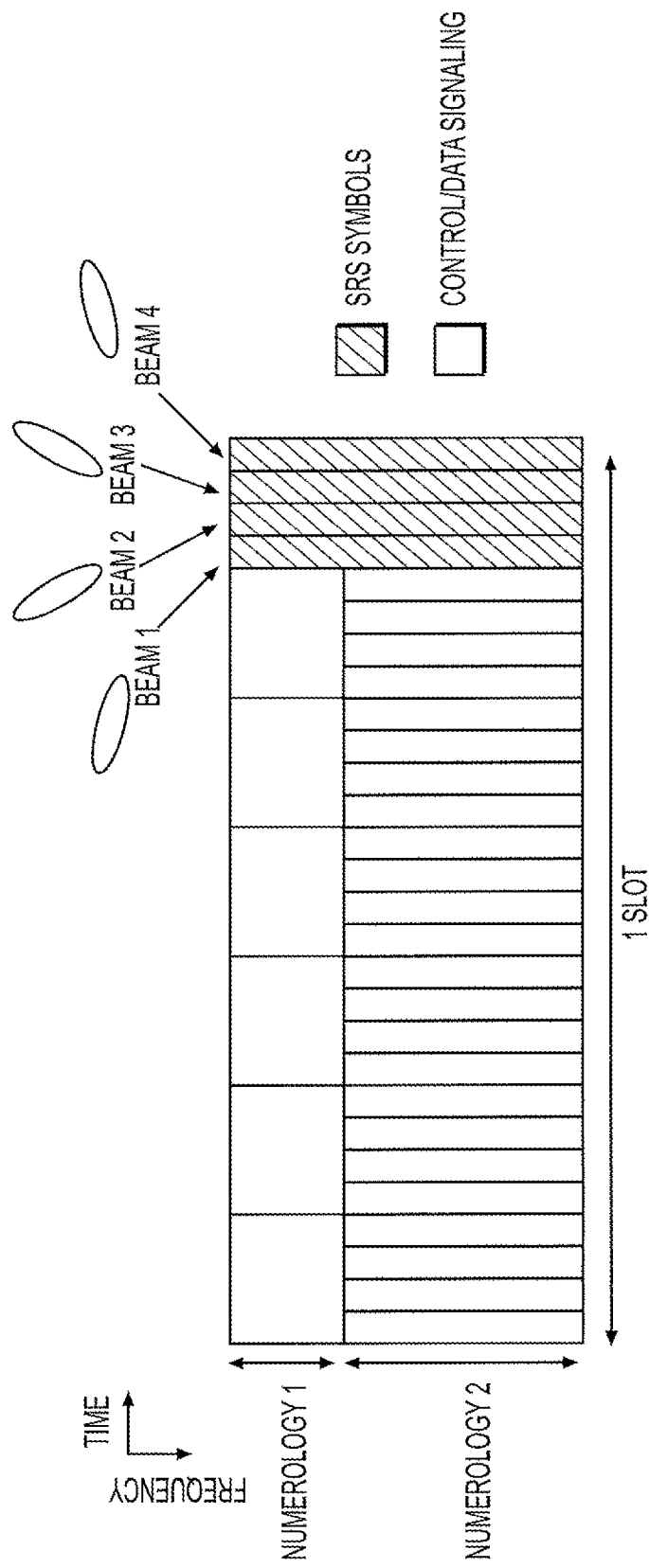
FIG. 24 is a diagram that illustrates NR-SRS in different beams.

In an embodiment, a UE may transmit NR-SRS on multiple beams in a reserved SRS resource. This concept is illustrated in FIG. 24. Each NR-SRS symbol is reserved for a certain beamforming direction. It is envisaged that these solutions can apply to a self-contained subframe as well.

In another embodiment, SRS port mapping techniques may be used to support non-precoded, precoded and beamforming. The NR-SRS port mapping methods for non-precoded, precoded, and beamforming cases are described.

Figure 25:
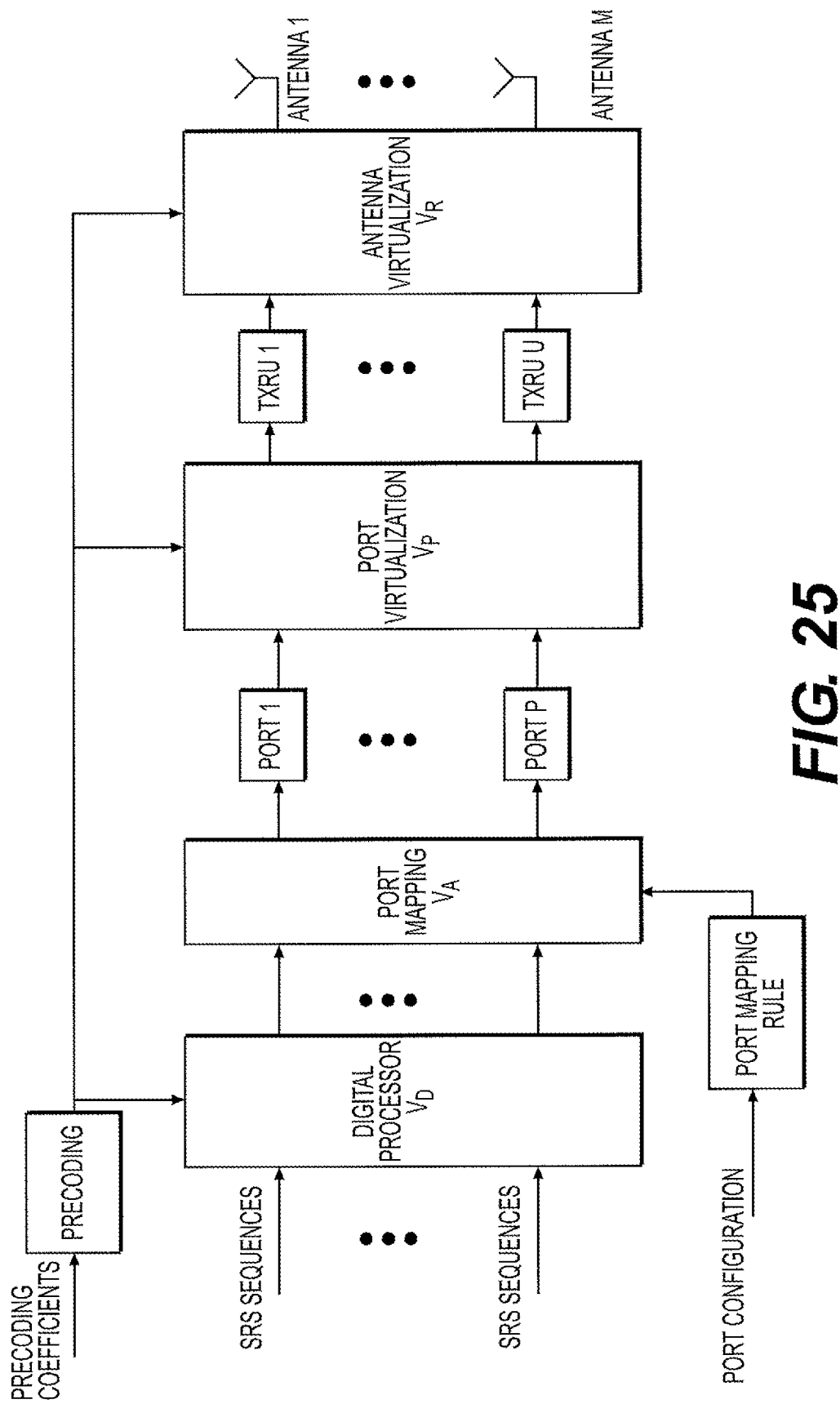
FIG. 25 is a diagram that illustrates antenna virtualization and port mapping.

In an exemplary embodiment, the UE may transmit a maximum number of ports that it can support and feedback to NR-NB. The maximum number of available, supported ports may be dependent on UE capability. Here, a unified method for NR-SRS port mapping for non-precoded, precoded and beamforming can be employed. The porting mapping can work with the UL antenna virtualization. The antenna virtualization method is depicted in the following FIG. 25. The antenna virtualization can be partitioned into four stages. The first stage performs digital precoding or beamforming via generation of $V_D$. After applying antenna virtualization, the effective precoding/beamforming matrix/vectorV from FIG. 25 can be expressed as:

$$V=V_T V_P V_A V_D,\qquad \text{Eq. 1}$$

where the $V_D$ is the codebook that can be defined or specified in the digital domain, $V_A$ is the codewords to port mapping matrix, the $V_P$ is the port to TXRU mapping matrix and $V_T$ is the TXRU to physical antenna mapping.

Figure 26:
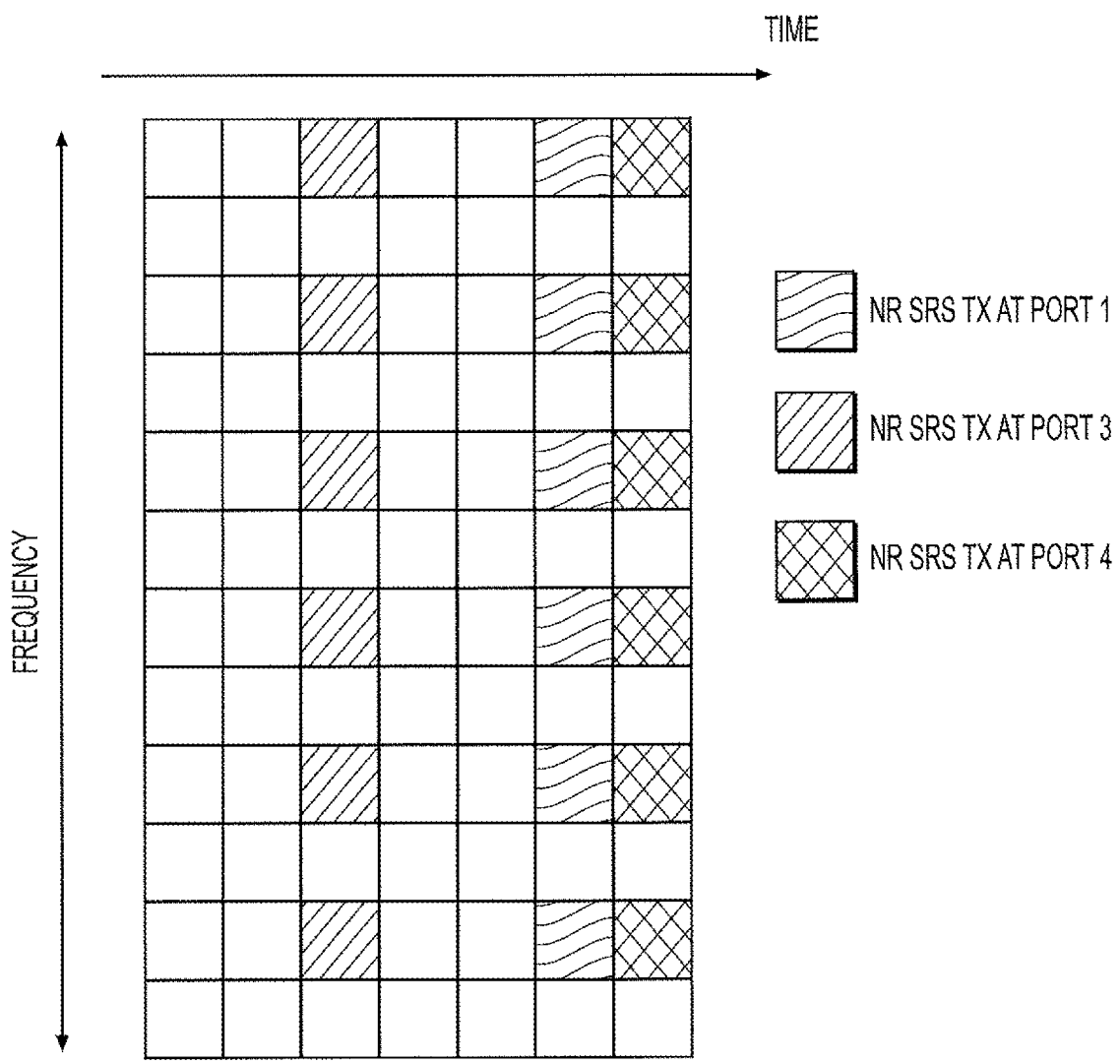
FIG. 26 is a diagram that illustrates NR-SRS transmission port mapping.

If there is no precoding or beamforming applied on the NR SRS, then the NR SRS can be directly transmitted via the port configured/assigned from NR gNB. In other words, the $V_D$ $V_P$ and the $V_T$ can be set as an identify matrix, and the $V_A$ is dependent on the NR-SRS port configuration setting. For example, if a UE can support up to 8 ports and the RRC configuration parameters srs-TxAntennaPorts is set to {1, 2, 3, 4}, then UE can transmit NR-SRS to ports 1, 2, 3 and 4. The active port number may be dynamic signaling via DL DCI. In an instance, if the configuration parameter srs-TxAntennaPorts is set to {1, 2, 3, 4} and NR configure the transmission active port as {1, 3, 4} at a certain SRS transmission subframe then the UE transmit the NR-SRS on port {1, 3, 4} only. If there is no DL DCI is involved in the transmission port configuration then the UE can transmit the NR-SRS based on the RRC configuration ports setup. The NR-SRS transmit at the different port may be transmitted at the same or different CP-OFDM/DFT-S-OFDM symbol and can be associated with a specific numerology. In FIG. 26, NR-SRS set up at different transmission port is configured to transmit at different CP-OFDM/DFT-S-OFDM symbol.

Similarly, when there is a precoded or beamforming involved in the NR-SRS, the $V_D$, $V_P$ and $V_T$ can be properly design to meet the precoding or beamforming requirement. The $V_A$ can be decided from the SRS port mapping configuration. In short, the following NR-SRS port mapping methods can be used:

1. NR-SRS set up at the different transmission port may be configured to transmit at different CP-OFDM/DFT-S-OFDM symbol and can be associated with a specific numerology
2. The port mapping can be either semi-static configured via RRC or dynamic configured via DL control.

Here, the $V_P$ and the $V_T$ can leave to UE implementation and without standardization effort.

Figure 27:
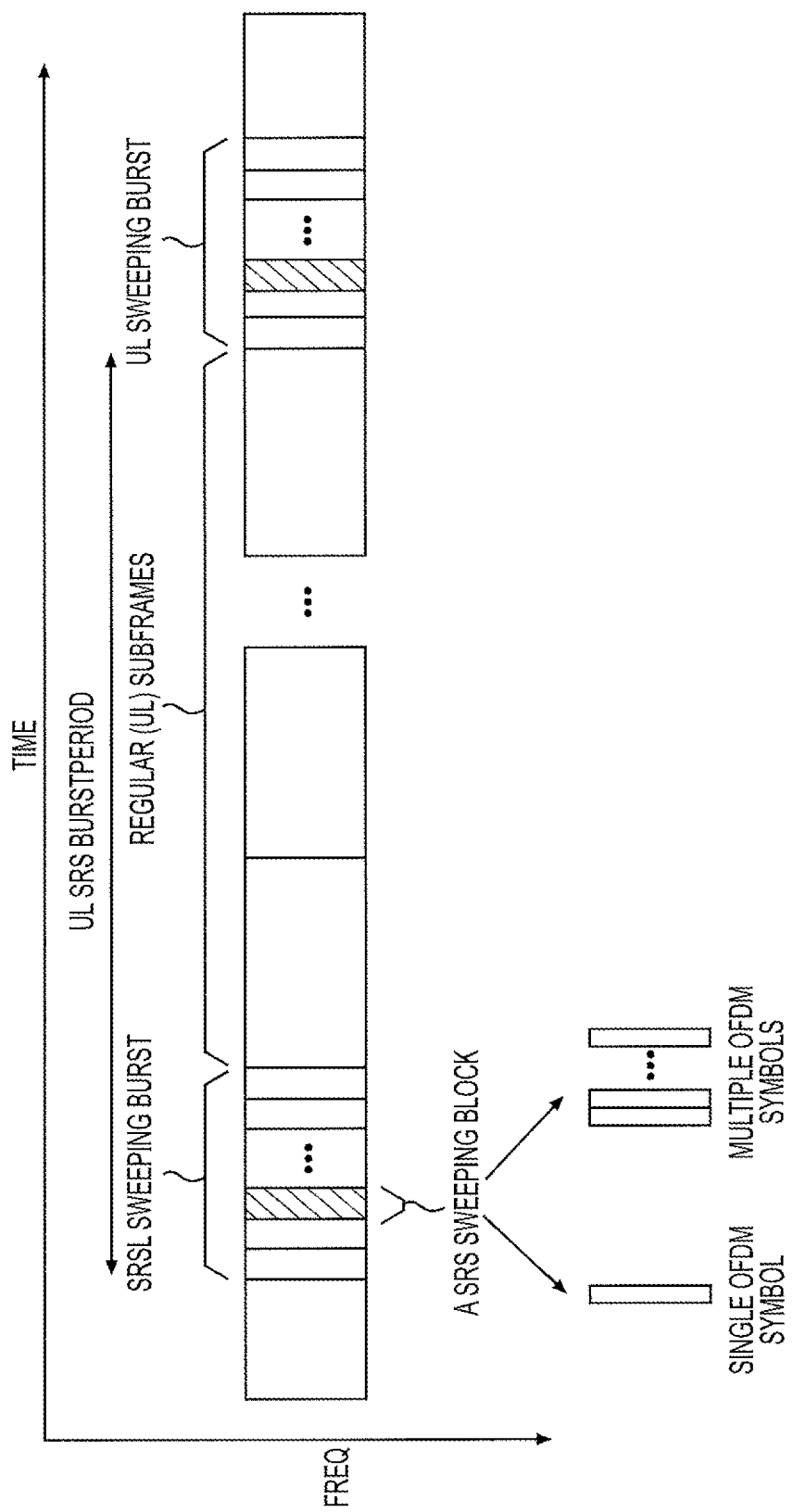
FIG. 27 is a diagram that illustrates NR SRS beam sweeping block and burst.

According to yet a further embodiment, NR-SRS beam sweeping can be treated as a unit of beam sweeping time for transmitting NR-SRS. Each NR-SRS beam sweeping block may include at least one or more CP-OFDM/DTF-S-OFDM symbols and be associated with a specific numerology. Multiple beam sweeping blocks can form a beam sweeping burst. This is shown in FIG. 27. The NR-SRS beam sweeping burst can be either configured as periodic or aperiodic transmission via semistatic RRC signaling or dynamic configuration via DL DCI. The SRS beam sweeping block can be associated with a single beam or multiple beams.

NR CSI Interference Channel Measurement

According to yet another aspect of the application, solutions to support CSI-ICM in NR are envisaged. In one embodiment, a new RRC signaling is employed to signal to the CSI-ICM. In another embodiment, two-step dynamic signaling is described. In yet another embodiment, a group based CSI-ICM configuration through DCI is described. In yet a further embodiment, the PUCCH format for CSI-ICM reporting is described. In yet even a further embodiment, the DCI design enables UE interference cancellation for MU-MIMO. In even a further embodiment, procedures of interference channel measurement and interference cancellation is described below.

According to this aspect, a new information element CSI-ICM-Config is used as the only signaling to indicate all the necessary information of the configuration is described. For example, the NR node configured the UE using the RRC signaling with the CSI-RS/ICM location. This could be based on one or more of the following: (i) UE interference hypotheses, (ii) the number of interference channel; and (iii) multiuser MIMO scheduling. Meanwhile, the information of precoding matrix used in the CSI-ICM transmission also need to be indicated. This is because the UE want to measure the real interference channel, so the precoding matrix need to be removed from the effective channel and the interference channel information can be feedback to the NR node. An example of CSI-ICM configuration information element CSI-ICM-Config in the RRC configuration message is listed below as follows:

```
-- ASN1 START
CSI-ICM-Config :=       SEQUENCE {
    csi-ICM-ConfigId    ,
    resourceConfig      INTEGER (0..maxNumberofResourceConfig),
    subframeConfig      INTER (0..maxNumberofSubframeConfig),
    pmiConfig           INTEGER (0.maxNumberofPMIConfig),
}
- ASN1STOP
```

Alternatively, the technique may implement the CSI-ICM configuration by two steps signaling via NR DCI to avoid the large latency issue introduced by the RRC only signaling method. The steps are as follows:

Step 1: Initial resource set configuration through RRC signaling. Here, a set of K CSI-ICM resources are pre-configured for all the UEs through RRC information element CSI-ICMset-Config to indicate all the available CSI-RS/ICM location used for CSI_ICM. An example of information element CSI-ICMset-Config in the RRC message is listed as follows.

```
--ASN1START
CSI-ICMset-Config ::= SEQUENCE {
    csi-ICMset-list ,
    CSI-ICMset-List::= SEQUENCE (size 1 ... maxNumberOfcsi-ICM-ConfigId) of csi-
ICM-
ConfigID
-- ASN1STOP
```

Step 2: Dynamic CSI-ICM configuration signaling through NR DCI. Here, for a given UE, the NR node indicates N out of K (where N>=1) of the CSI-ICM resources from the set based on the interference hypothesis to enable CSI-ICM by dynamic signaling through a configurable DCI or dynamic signaling through MAC CE. The value of N increases as the number of interference sources increases. By introducing the second step, it can reduce the latency in the CSI-ICM configuration comparing to the RRC only signaling. For each UE in different interference hypotheses, the DCI information may be different, in terms of the number of the CSI-ICM resources and location, CSI-ICM feedback configuration and UL resources to transmit the CSI-ICM feedback if applicable. An example of the configurable fields for DCI scheme are listed in Table 4 below. One or more or all of the fields may be used to configure the DCI.

TABLE 4

| Field Element | Meaning of each Field |
|---|---|
| UE ID | Identification of the UE, which is scrambled in CRC parity bits. |
| CSI-ICM resource indication | CSI-ICM configuration (indicates number of the resource, location, antenna ports or the source of the interference channel.) |
| CSI-ICM feedback Configuration | NR PUCCH Format for CSI-ICM feedback and other information |
| CSI-RS resource indication | CSI-RS configuration |
| CSI-IM resource indication | CSI-IM configuration |
| CSI feedback configuration | NR PUCCH Format for CSI feedback and other information |
| UL resources indication | UL resources used to transmit the CSI-RS/CSI-ICM feedback |
| . . . | |

As an alternative method, the dynamic CSI-ICM configuration can be also done through MAC Control Element (CE) once the resources set is pre-configured. A new MAC Control Element, CSI-ICM configuration MAC control element which carries the similar information as that defined in Table 1 is defined below:

The CSI-ICM configuration MAC control element may be defined over a fixed number n of octets. The CSI-ICM configuration MAC control element may be identified with Logical Channel Identifier (LCID), which may be one of the existing reserved value of LTE downlink logical channels between the range 01011 and 10111 (binary coding) or alternatively the LTE logical channel value ranges may be extended with new defined values assigned to CSI-ICM configuration MAC CE.

As discussed above, the DCI needs to be transmitted to every UE separately to indicate the CSI-ICM configuration which requires a large number of DCI transmission when there are a lot of UEs. To reduce this overhead, group-based CSI-ICM configuration can be used through DCI to enable multiple UEs measuring the interference channel. The UEs that have the same interference sources or share some resources when doing the CSI-ICM can be grouped and transmitted in one DCI containing the common information and the individual information to all the UEs in the group. The common information is the shared fields that are the same to all UEs in the group, in terms of group ID, CSI-ICM configuration, CSI-RS/ICM structure and etc. The individual information indicates the UE ID, UL resources to transmit the CSI-ICM feedback and all the other signaling cannot be shared among the UEs within the group which each UE has its unique information. An example of the configurable fields for group-base CSI-ICM configuration DCI scheme are listed in Table 5 below.

TABLE 5

| Field Element | Meaning of each Field |
| --- | --- |
| Group ID | Identification of the group |
| CSI-ICM resources indication | CSI-ICM configuration (indicates number of the resource, location, antenna ports or the source of the interference channel.) |
| CSI-ICM feedback indication | NR PUCCH Format for CSI-ICM feedback and other information |
| CSI-RS resource indication | CSI-RS configuration |
| CSI-IM resource indication | CSI-IM configuration |
| CSI feedback configuration | NR PUCCH Format for CSI feedback and other information |
| UE ID 1 | UE 1's index in the group |
| UL resources indication 1 | UL resources used to transmit the CSI-ICM feedback for UE 1 |
| UE ID 2 | UE 2's index in the group |
| UL resources indication 2 | UL resources used to transmit the CSI-ICM feedback for UE 2 |
| ... | |

According to another embodiment, upon measuring the interference channel, the UE needs to feedback the interference channel estimation to NR node/TRP. This will be used in MU-MIMO scheduling. The interference channel feedback could be implicit, explicit or a combination of implicit and explicit feedbacks. For example, when the largest eigenvalue is less than a pre-defined threshold, only the implicit feedback is required, and otherwise, the UE needs to feedback the explicit channel measurement according to the eigenvalues greater than the threshold. The implicit feedback may contain information such as CQI, PMI or RI for the interference channel, and explicit feedback may be in the following forms: (i) The exact interference channel measurement; (ii) The eigenvectors of the interference channel according to the largest eigenvalues; and (iii) The covariance matrix of the interference channel.

To reduce the overhead of the explicit interference feedback, it could be quantized by a pre-defined codebook or transformed to a reduced-dimension form. The CSI-ICM feedback may be tolerant to a higher quantization error or a transforming error comparing to explicit CSI feedback.

A UE is configured by higher layer or NR DCI to periodically or aperiodically or semi-persistently send CSI-ICM feedback via NR PUCCH. A new NR PUCCH reporting type could be defined for CSI-ICM feedback. For periodic CSI-ICM feedback, the periodicity and relative offset are configured by higher layer signaling. For aperiodic or semi-persistent CSI-ICM, the resource to transmit CSI-ICM feedback is configured by NR DCI.

According to yet another embodiment, after receiving the CSI and CSI-ICM feedbacks, the NR node could be able to schedule MU-MIMO transmission. For the UE scheduled for MU-MIMO, beside the general transmission information such as resource allocation, Modulation and coding scheme, and HARQ process number, the NR DCI should also include the following information:

1. Antenna port indices: The antenna port index could be signaled to the UE implicitly or explicitly. For implicit signaling, a set of limited configurations of these parameters could predefined in the standard specification or configured by higher layer signaling, and then in the NR DCI format only the index of the selected configurations is signaled.
2. Precoding/decoding matrix information: It could include information such as codebook index for the precoding matrix, PMI, or index of the suggested decoding matrix. With the help of this information, the UE is able to cancel the interference transmitted to other co-scheduled UEs or from other beams/TRPs.

According to another embodiment, procedures of interference channel measurement and interference cancellation are described. These include, for example:

1. NR node first configures the UEs for CSI-RS and CSI-ICM via RRC signaling or NR DCI/MAC CE.
2. Based on the CSI-RS and CSI-ICM configurations, the UE measures the desired channel and interference channel.
3. The UE transmits the CSI and CSI-ICM feedbacks to NR node, where the feedbacks could be implicit, explicit or a combination of implicit and explicit feedbacks.
4. NR node schedules MU-MIMO transmission based the CSI and CSI-ICM feedbacks, and sends scheduling decision and transmission information to the UEs via NR DCI, which includes the information such as antenna port indices and precoding/decoding matrix information.

Based on the information from its NR DCI, the UE is able to cancel the interference transmitted to other co-scheduled UEs or from other beams/TRPs.

Figure 28:
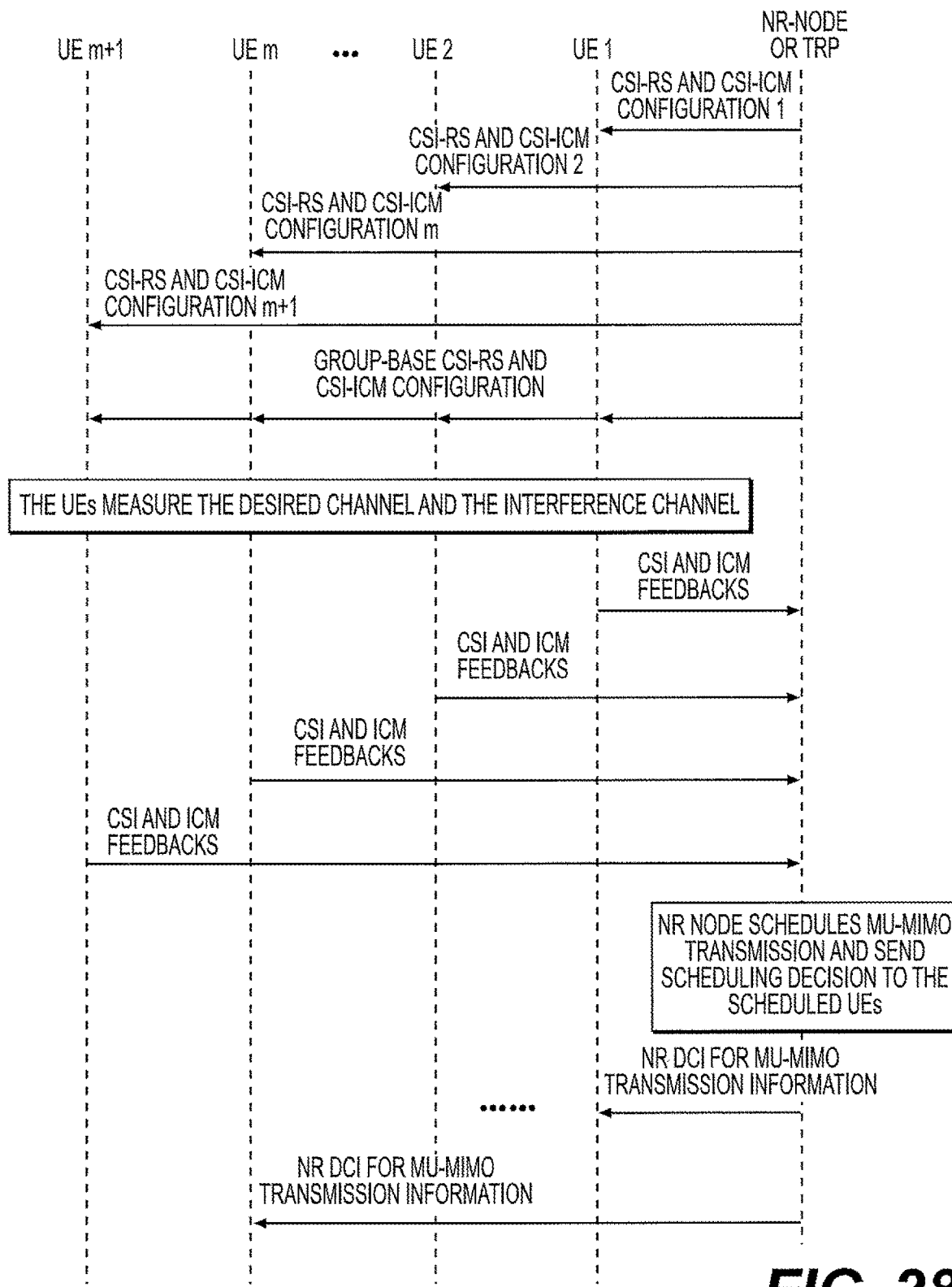
FIG. 28 is a diagram that illustrates CSI-ICM Configuration Procedure Example.

A call flow to portray the CSI-ICM procedure is illustrated in FIG. 28.

Dynamic CSI Measurement and Report

According to a further aspect of the application, a semi-static RRC configuration of CSI measurement and the pool of CSI-RS resource element for the UE, and dynamic signaling to schedule CSI measurement are described. Two methods for RRC based configuration of CSI-RS pooling resources.

Method 1: UE-specific CSI-RS resources configuration, without configuration of a group of UEs sharing the same CSI-RS resource pool. The NR node (e.g., gNB) configures the UE with a set of K CSI-RS resources using dedicated RRC message (e.g., like RRCConnectionReconfiguration message or NR RRC equivalent). The UE uses the CSI-RS configuration to identify CSI-RS resources used for channel state measurement. The NR node may signal to the UE the exact CSI-RS to use from the configured set via MAC CE signaling or DCI signaling. The configuration set the NR node configures the UE with may include one or more of the parameters:

A. The antenna port count i.e. the number of antenna ports to be used for the transmission of the CSI-RS. The antenna port count to be used for CSI-RS may be numerology specific.
B. The CSI RS mapping to resource element configuration. The CSI RS mapping to resource element may be numerology specific.
C. The CSI RS transmission interval configuration (for e.g. could be in terms of subframe configuration) which may indicate the period and the time interval (e.g. subframe) offset (within the CSI-RS period) for the occurrence of the CSI reference signals. The time interval offset specified the exact time interval of subframe within the CSI-RS transmission periodicity for the transmission of the CSI-RS. The CSR-RS transmission time interval of subframe configuration may be numerology specific.
D. Beam configuration in DL and as well beam configuration in UL for reporting of measurements performed of the CSI-RS.

E. For each of the configuration parameters above, the configuration may be predefined (for e.g. in the specification) and only the index to these predefined configurations are signaled to the UE.

F. It should be noted that even if each terminal is provided through dedicated RRC signaling with terminal specific CSI-RS resource configuration, the network may still configured more than one UE with the same set of CSI-RS resources.

G. By default, the set of CSI-RS pre-configured in the UE by the NR node via RRC signaling are not activated i.e. the UE doesn't perform measurement on these CSI-RS. The UE performs measurements on these CSI-RS upon CSI-RS measurement activation command from NR node through MAC CE signaling of physical layer DCI signaling.

Method 2: UE-specific CSI-RS resources configuration, with configuration of a group of UEs sharing the same CSI-RS resource pool. In this embodiment, the NR node may limit CSI-RS configuration related signaling overhead by using group configuration. In addition to the parameters used in Method 1, the configuration set the NR node configures the UE with may include one or more of the parameters:

A. A UE Group identity

B. UE's position or index within this group.

C. NR node may configure each UE, for e.g. at the time of UE configuration with dedicated signaling bearers (e.g. SRB1 or SRB2 or NR equivalent) or at the time of UE configuration with dedicated radio bearers, with a UE group identity for e.g. a group RNTI (Radio Network Temporary Identifier). The group RNTI is use to address the resources/location of the CSI-RS configuration for the specific group of UEs configured with this group RNTI. The group RNTI may be mapped to the DL-SCH (Downlink Shared Channel) transport channel, a multi-cast logical channel or similar NR transport channel. The UE monitors the transmission of this group RNTI from the NR node. Upon detection of this group RNTI, the UE uses the group RNTI to search and decode the associated CSI-RS configuration.

D. For each configured group, all UEs in this group are arranged in an order. UE's position or index within this group is basically UE's order in the group, which can be used by group-based DCI (using group RNTI) to identify a UE in a signaling-efficient manner. For example, consider a group #3 with UEs 2, 77, 105, 269. Then, UE's position or index within the group 3 are 1, 2, 3, 4 for UEs 2, 77, 105, 269, respectively.

In one embodiment, the NR node may initially signals the CSI-RS configuration to the UE in dedicated UE RRC signaling as described in the embodiment above and then subsequently uses the group signaling to configure group of UEs with a common pool of CSI-RS resources.

According to another embodiment, a detailed design of CSI-RS Pooling DCI or MAC CE Signaling is described. Several signaling designs include: (i) CSI measurement command signaled in DCI; and (ii) CSI measurement command signaled in MAC CE MAC CE based signaling. In an embodiment, the following method can be used to signal CSI measurement command in MAC CE. Specifically, the NR node dynamically signals in MAC CE to the UE, transmission of CSI-RS preconfigured by RRC signaling. The indication of CSI-RS transmission in MAC CE may include the CSI-RS configuration index previously pre-configured in the UE (for e.g. via RRC signaling). The UE uses this index to locate the CSI-RS configuration information stored in its internal database. The UE may then perform measurement of the CSI-RS using the CSI-RS configuration parameters (e.g. antenna port count, resource information, CSI-RS transmission interval information, beam configuration) identified by the information (e.g. CSI-RS configuration index) received in the MAC CE.

In an exemplary embodiment, the MAC CE may carry in addition to the CSI-RS configuration index, the measurement time window. The measurement time windows may be pre-defined in the specification. It may be expressed in terms of an integer number of CSI-RS transmission time interval (e.g. CSI transmission periodicity time value), for e.g. 1, 2, 3, 4 etc. For example, if the measurement time window is 1, the UE measures CSI-RS over one CSI-RS transmission time interval and stop. Similarly, if the measurement time window is k, the UE measures CSI-RS over k CSI-RS transmission time intervals. In this embodiment, the NR node doesn't signals a MAC CE to the UE in order to terminate the CSI-RS measurement. The UE implicitly terminates the measurement using the received transmission time window.

In another embodiment, the NR node may explicitly signal to the UE in MAC CE, the termination (or de-activation) or a previously activated CSI-RS measurement. This may be the case, if the NR node didn't include in the prior CSR-RS measurement activation MAC CE, a measurement time window information. An example of CSI-RS measurement activation and deactivation MAC CE are depicted in FIGS. 17A-B and FIG. 18. The MAC CE may be defined over a fixed number n of octets. The transmission MAC CE may be identified by a MAC PDU subheader with Logical Channel Identifier (LCID) as defined later below.

Two examples of MAC CE are illustrated below. The CSI RS measurement Activation/Deactivation MAC control element with one octet is defined in FIGS. 17A-B. It has a fixed size and consists of a single octet containing some RS-fields part and some TW field where TW encodes the measurement Time Window while the RS fields encode the activation or deactivation of CSI-RS measurement. Similarly, an example of Activation/Deactivation MAC control element of k octets with k=4 as an example is defined in FIG. 18. It has a fixed size and consists of a k octets containing RS-fields part and TW field part. The RS field is set to "1" to indicate that the CSI-RS configuration identified by configuration index i shall be activated. The RSi field is set to "0" to indicate that the CSI-RS configuration identified by configuration index i shall be deactivated.

The MAC CE as illustrated includes only one measurement time window TW. This means the measurement time window is common for all the CSI-RS configuration included in the MAC CE. However, the MAC CE may also be structure to include more than one TW. For example, assuming each of the CSI RS included in the MAC CE has different TW, then there will be as many TWs as RSs in the MCA CE.

Figure 29:
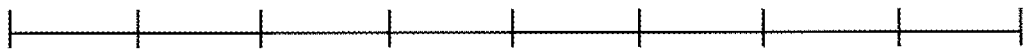
FIG. 29 is a diagram that illustrates CSI-RS Measurement Activation/Deactivation MAC Control Element of one octet.
Figure 30:
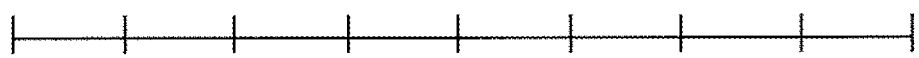
FIG. 30 is a diagram that illustrates CSI-RS Measurement Activation/Deactivation MAC Control Element of k (k=4) octets.

FIG. 29 illustrates CSI-RS Measurement Activation/Deactivation MAC Control Element of one octet. FIG. 30 illustrates CSI-RS Measurement Activation/Deactivation MAC Control Element of k (k=4) octets.

The logical channel ID associated with the CSI-RS measurement activation/deactivation MAC CEs may be one of the existing reserved value of LTE downlink logical channels between the range 01011 and 10111 (binary coding). Alternatively, the LTE logical channel value ranges may be extended with new defined values assigned to CSI-RS measurement activation/deactivation MAC CE. The logical channel ID should uniquely identify the MAC CE. For e.g., the MAC CE in two figure above should have different logical channel IDs. The signalings described for MAC CE can be applicable to the DCI based signaling as well.

According to another embodiment, the following DCI based signaling methods can include: (i) CSI measurement command piggyback on DCI; (ii) Standalone CSI measurement command (sent on a separate DCI) for a specific UE; and (iii) Group-based DCI to schedule multiple UEs' CSI-RS measurement and feedback.

In Signaling Method 1, CSI measurement command is piggybacked on another DCI using one or both of the following options:

1. CSI measurement command is signaled in a DCI that is used for scheduling of NR-PUSCH. In addition, such a DCI may schedule one or several PUSCHs in different sub-frames, which will carry UL, control information of CSI measurement.
2. CSI measurement command is signaled in a DCI that is used for scheduling of NR-PDSCH. Such a DCI may schedule one or several PUCCHs in different sub-frames will carry UL control information of CSI measurement.

According to Option 1, the CSI measurement command is signaled in a DCI that is used for scheduling of NR-PUSCH, so called UL grant DCI. It will carry the following information (explicitly or implicitly):

A. CSI request: for example 1 bit field to indicate if CSI measurement and report is set to triggered.
B. CSI-RS resources indication. This is an indication of N out of K (where N>=1) of the CSI-RS resources from the set of resources configured by RRC signaling. This can be signaled by bitmap or other methods.
C. Antenna ports to CSI-RS resource elements mapping:
 1. This information can be signaled in several ways or implicitly signaled
 2. If the design of CSI-RS allows different density of CSI-RS for antenna ports at different measurement instances, then the information of the number of antenna ports should be signaled. For example, if a subset of indicated CSI-RS resources can be used interpreted as either for 4 or 8 CSI-RS ports, then 1 bit signaling should be used to indicate number of antenna ports.
 3. If the design of CSI-RS allows only fixed density of CSI-RS for antenna ports at different measurement instances, then the UE can infer the information of the number of antenna ports from the set of CSI-RS resources.
D. Location/indices of RBs where the UE should receive its CSI-RS and perform channel or interference measurement.
 1. If this field is omitted, the UE will receive CSI-RS on all RBs in the cell.
 2. The indication of CSI-RS resources will be applied to all RBs locations indicated.
E. CSI measurement configuration to be used for the UE.
 1. Each CSI measurement configuration include a set of CSI measurement/feedback reporting parameters: measurement/feedback metrics (RI, PMI, CQI and etc.), whether the metric is wideband or sub-band measurement, the reporting frequency of each feedback metric, and relative time offset.
 2. One of the CSI measurement configuration is indicated in the DCI. Or the UE can be configured a subset of allowed CSI measurement configurations in the standards by higher layer signalings (such as RRC signaling). Then, one of the CSI measurement configuration subset is indicated in the DCI.
F. CSI measurement reporting, physical uplink channel and start time
 1. The number of CSI measurement reports to be transmitted in the uplink can be explicitly signaled or implicitly interfered from the CSI measurement configuration. For example, CSI measurement reporting signaling can indicate 2 report instances of CSI measurement type 3. If CSI measurement type 3 is carried on NR-PUSCH, it needs only 1 report; if carried on NR-PUCCH, it needs J NR-PUCCHs to carry one complete CSI report.
 2. The DCI can schedule several NR-PUSCHs in the subsequent sub-frames, each carry one complete CSI report (or part of it). Alternatively, such a DCI explicitly can schedule one NR-PUSCH, and several NR-PUCCHs in subsequent sub-frames. The indices of these sub-frames will be signaled.
 3. The NR-PUSCH resource allocation is included in the uplink grant DCI already. If several subsequent NR-PUSCHs are scheduled as well, they can have the same resource allocation or different resource allocation (extra signaling); If several subsequent NR-PUCCHs are scheduled, the NR-PUCCH index can be signaled implicitly from either the search space index of the uplink grant DCI or starting RB index of the RBs where the uplink grant DCI is transmitted.
 4. CSI measurement report starting time: signaled as an timing offset from the current sub-frame, where the range of the offset value is 0 to H sub-frames. The default value of the timing offset is zero. As shown in the figures below, when the offset is set to zero, the CSI measurement can be reported as early as the end of the NR-PUSCH scheduled by the uplink grant DCI in the beginning of the sub-frame (or the flexible time interval).

Figure 31:
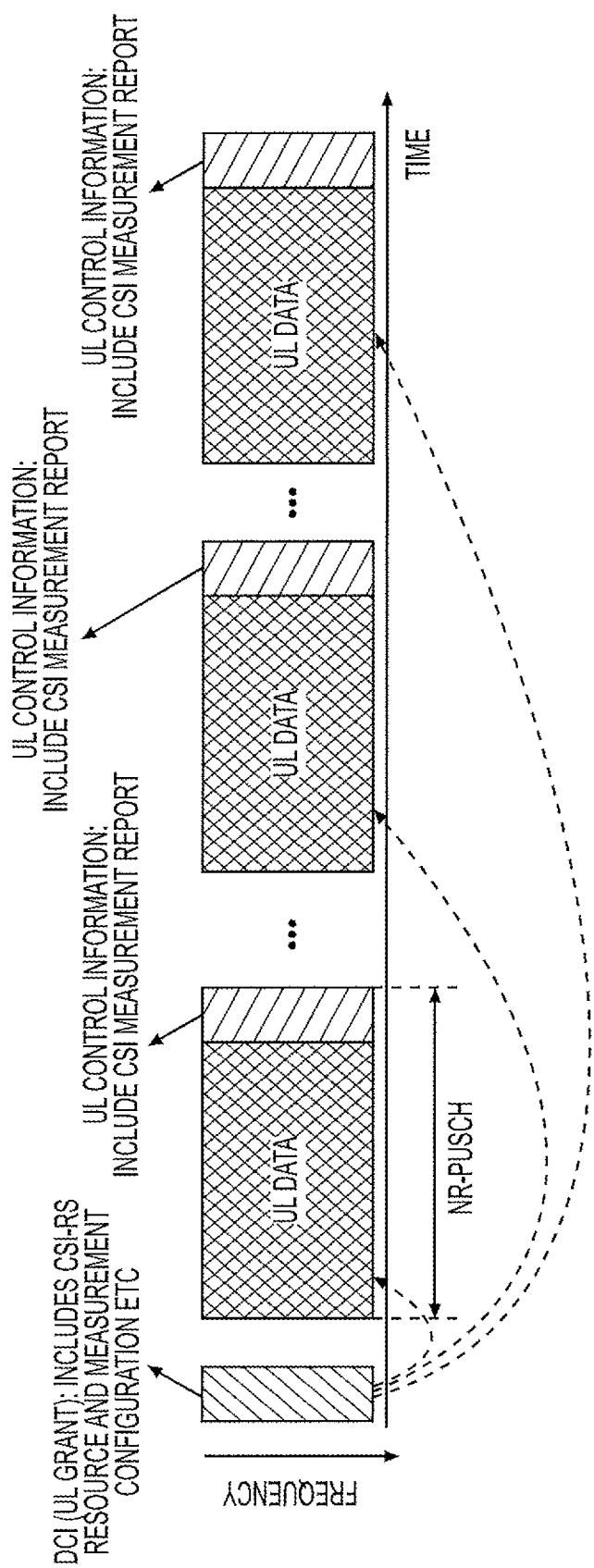
FIG. 31 is a diagram that illustrates one or several NR-PUSCHs are scheduled for CSI measurement reporting.

FIG. 31 illustrates one or several NR-PUSCHs are scheduled for CSI measurement reporting.

Figure 32:
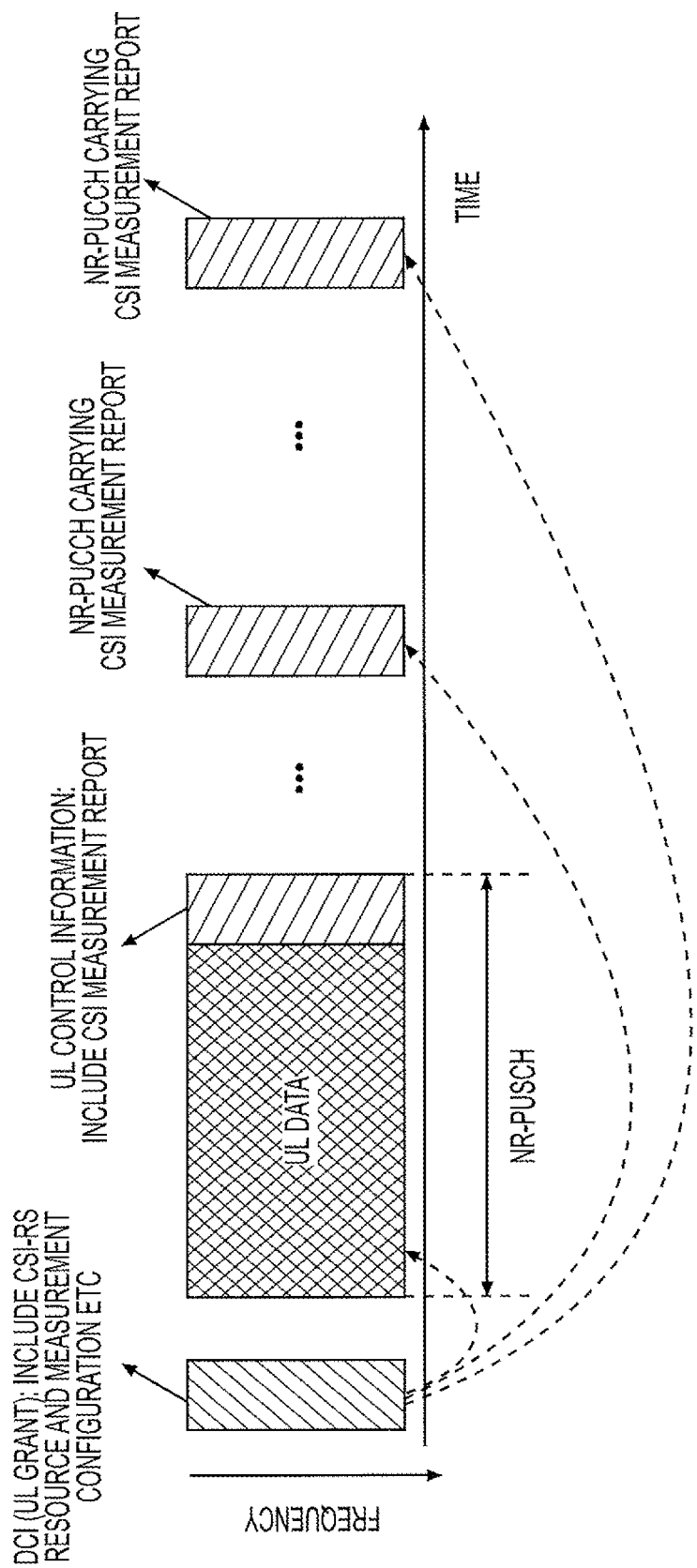
FIG. 32 is a diagram that illustrates one NR-PUSCH and or several NR-PUCCHs are scheduled for CSI measurement reporting.

FIG. 32 illustrates one NR-PUSCH and or several NR-PUCCHs are scheduled for CSI measurement reporting.

According to Option 2, the CSI measurement command is signaled in a DCI that is used for scheduling of NR-PDSCH, which is the DL grant DCI. It will carry the following information (explicitly or implicitly) similar to Option 1, and will include the following additional fields.

G. CSI measurement reporting, physical uplink channel and start time
H. The number of CSI measurement reports to be transmitted in the uplink can be explicitly signaled or implicitly interfered from the CSI measurement configuration.
I. The DCI can schedule several NR-PUCCHs in the subsequent sub-frames, each carry one complete CSI report (or part of it). The indices of these sub-frames will be signaled.
J. The NR-PUCCH index can be signaled implicitly from either the search space index of the uplink grant DCI or starting RB index of the RBs where the uplink grant DCI is transmitted.
K. CSI measurement report starting time: signaled as a timing offset from the current sub-frame, where the range of the offset value is zero to H sub-frames. The default value of the timing offset is zero. As shown in the figures below, when the offset is set to zero, the CSI measurement can be reported as early as the PUCCH at the end of current sub-frame following the NR-PDSCH scheduled by the DL grant DCI.

Figure 33:
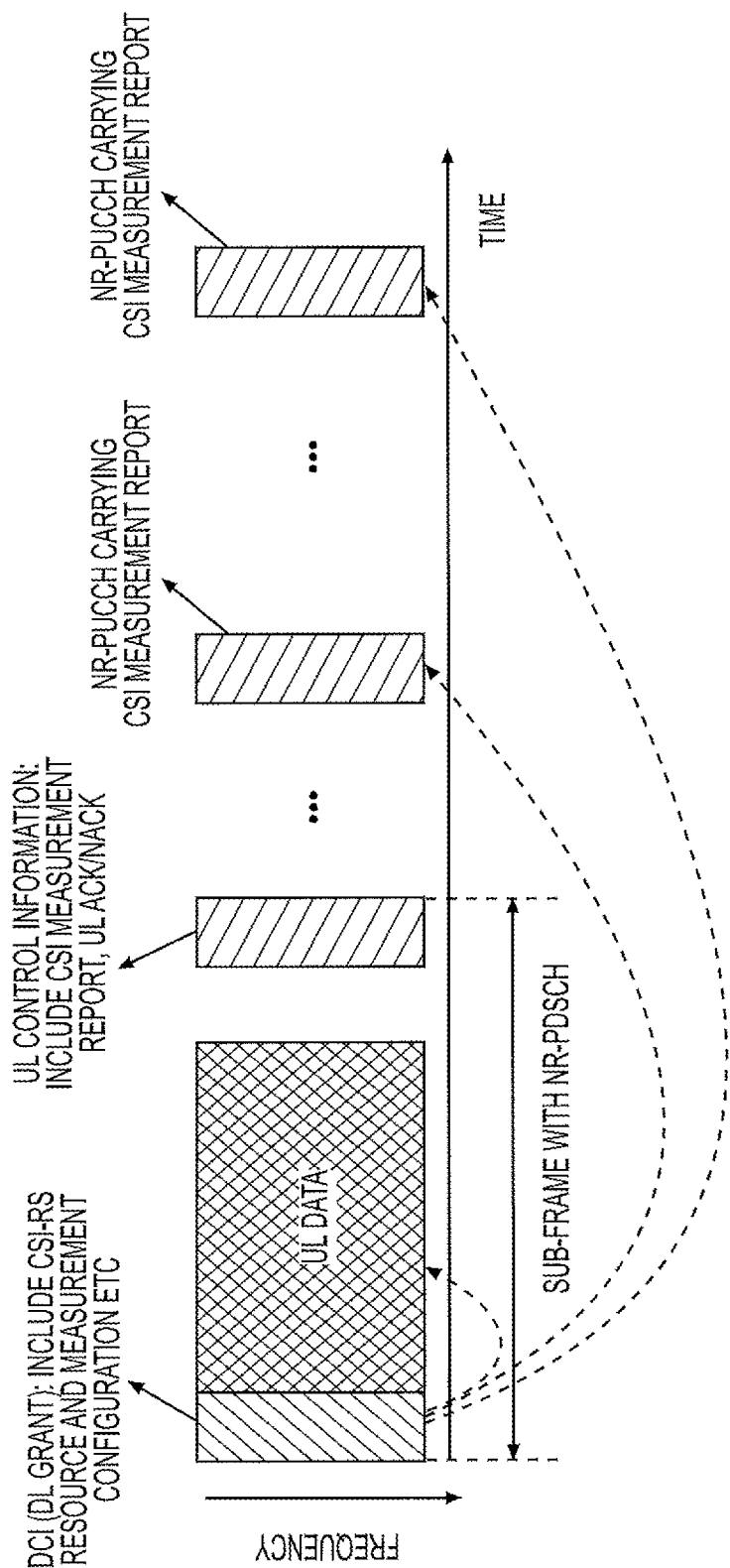
FIG. 33 is a diagram that illustrates several NR-PUCCHs are scheduled for CSI measurement reporting.

FIG. 33 illustrates several NR-PUCCHs are scheduled for CSI measurement reporting. The UE Procedures for Signaling method 1 (including options 1 and 2) are described below as follows:

- Step 1: A UE that has CSI-RS pooling resources configured by higher layer signaling will monitor downlink NR-PDCCH search spaces to detect DCI.
- Step 2: If it successfully detects a UL or DL grant DCI addressed to its C-RNTI or other format of UE ID, and the CSI request field is set to be "triggered" or "on", then the UE will process the received CSI measurement command information.
- Step 3: The UE will perform CSI measurement by processing the CSI-RS received in the resources indicated in the CSI measurement command according to the parameters in CSI-RS resource allocation field and location of RBs of these CSI-RS (optional). CSI measurement type (such as wideband CQI/PMI etc.) will be done according to the CSI measurement configuration parameter.
- Step 4: The UE will report the CSI measurement to the gNB using the parameters in the "CSI measurement reporting, physical uplink channel and timing" field. For example, the UE will transmit its CSI measurement on NR-PUSCHs or NR-PUCCHs scheduled by the UL or DL grant DCI.

According to another embodiment, a standalone CSI measurement command can be transmitted on a separate DCI can be used to active a CSI measurement for a UE. Such a standalone CSI measurement command DCI will carry the following information (explicitly or implicitly) as in Option 1 of signaling method 1, and include the following additional fields:

- A. UE ID, which can be implicitly signaled as using UE's C-RNTI or other ID to scramble the CRC of the DCI.
- B. No need to transmit the field of "CSI Request" as in Option 1 of signaling method 1.
- C. CSI measurement reporting, physical uplink channel and start time
  1. The number of CSI measurement reports to be transmitted in the uplink can be explicitly signaled or implicitly interfered from the CSI measurement configuration.
  2. The DCI can schedule several NR-PUCCHs in the subsequent sub-frames, each carry one complete CSI report (or part of it). The indices of these sub-frames will be signaled.
  3. The NR-PUCCH index can be signaled implicitly from either the search space index of the standalone CSI measurement DCI or starting RB index of the RBs where the standalone CSI measurement DCI is transmitted.
  4. CSI measurement report starting time: signaled as a timing offset from the current sub-frame, where the range of the offset value is 0 to H sub-frames. The default value of the timing offset is zero. As shown in the figures below, when the offset is set to zero, the CSI measurement can be reported as early as the PUCCH in the current sub-frame as the CSI measurement DCI.

Figure 34:
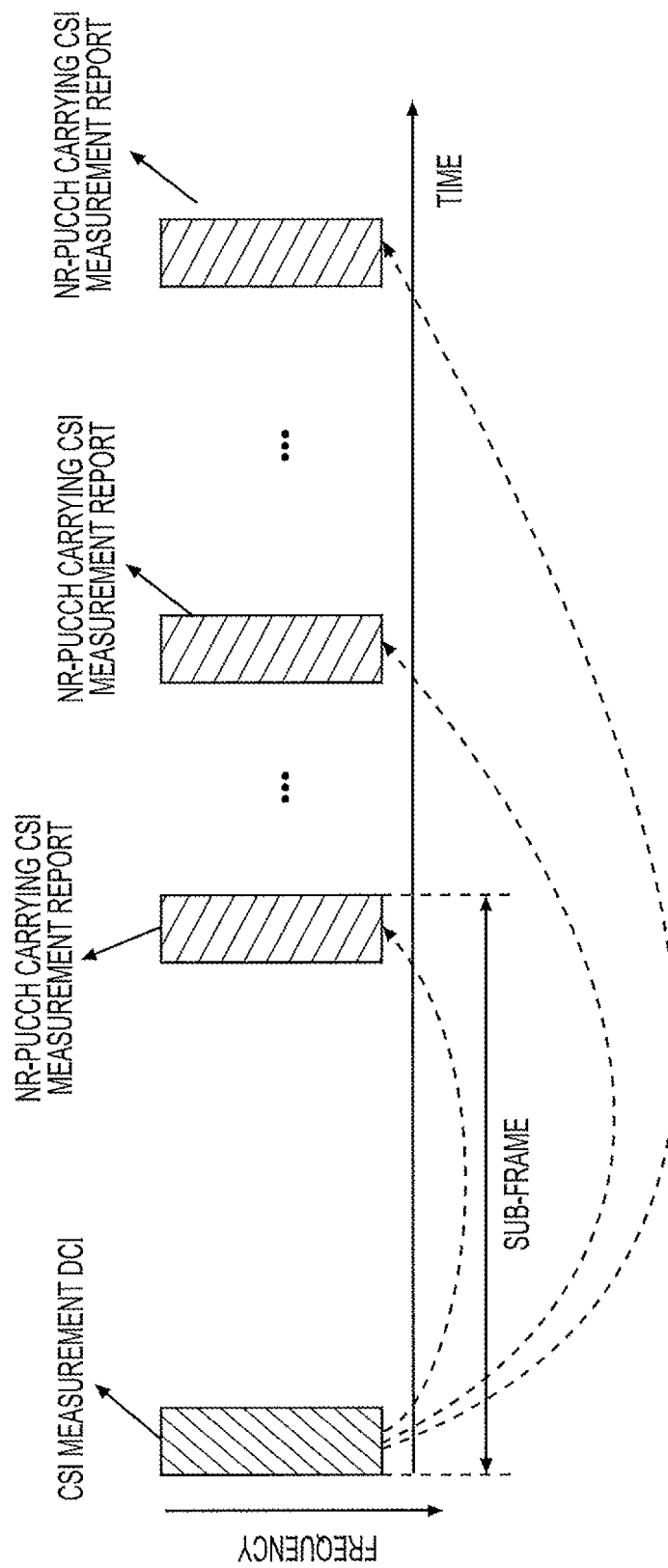
FIG. 34 is a diagram that illustrates several NR-PUCCHs are scheduled for CSI measurement reporting.

FIG. 34 illustrates several NR-PUCCHs are scheduled for CSI measurement reporting.

According to yet a further embodiment, UE Procedures for Signaling method 2 are as follows:

- Step 1: A UE that has CSI-RS pooling resources configured by higher layer signaling will monitor downlink NR-PDCCH search spaces to detect DCI that has the format of standalone CSI measurement DCI.
- Step 2: If it detects a standalone CSI measurement DCI addressed to its C-RNTI or other format of UE ID, then the UE will process the received CSI measurement command information.
- Step 3: The UE will perform CSI measurement by processing the CSI-RS received in the resources indicated in the CSI measurement command according to the parameters in CSI-RS resource allocation field and location of RBs of these CSI-RS (optional). CSI measurement type (such as wideband CQI/PMI, etc.) will be done according to the CSI measurement configuration parameter.
- Step 4: The UE will report the CSI measurement to the gNB using the parameters in the "CSI measurement reporting, physical uplink channel and timing" field. For example, the UE will transmit its CSI measurement on NR-PUCCHs scheduled by the standalone CSI measurement DCI.

Signaling Method 3 is described in accordance with a further embodiment. Here, a group-based CSI measurement DCI can be used to schedule CSI-RS measurement and feedback for multiple UEs. Group-based CSI measurement DCI can achieve reduced signaling overhead when these UEs have the same CSI reporting configuration and share the same CSI-RS resource pool configured by higher layer signalings. Such a group-based CSI measurement DCI will carry the following information (explicitly or implicitly) similar to those in Option 1 of signaling method 1, except the following different fields:

- A. Group ID: as described, such multiple UEs are already configured by higher layer signaling (such as RRC) to be in a group. Then, they can addressed their group ID or group-RNTI in the group-based CSI measurement DCI.
- B. Signaling of which UEs need to perform CSI measurement: This can be done by a bitmap in order of UE's index/position within the group configured by higher layer signaling. For each UE that needs to perform CSI measurement, the corresponding position in the bitmap will be set to "1", otherwise it will be set to "0".
- C. CSI-RS resources indication.
  1. UEs being indicated in the same CSI measurement DCI may have the same or different CSI-RS resource allocation. Both can be signaled by bitmap or other methods.
- D. Antenna ports to CSI-RS resource elements mapping, which will be the same for all UEs in the SCI measurement DCI.
- E. Signaling method can be the same as in Option 1 of signaling method 1.
- F. Location/indices of RBs where the UE should receive its CSI-RS and perform channel or interference measurement, which will be the same for all UEs in the SCI measurement DCI.
  1. If this field is omitted, the UE will receive CSI-RS on all RBs in the cell.
  2. The indication of CSI-RS resources will be applied to all RBs locations indicated.
- G. CSI measurement configuration to be used for the UE, which will be the same for all UEs in the SCI measurement DCI.
  1. Signaling method can be the same as in Option 1 of signaling method 1.
- H. CSI measurement reporting, physical uplink channel and start time 1. The number of CSI measurement reports to be transmitted in the uplink can be explicitly signaled or implicitly interfered from the CSI measurement configuration.
2. The DCI can schedule several NR-PUCCHs in the subsequent sub-frames, each carry one complete CSI report (or part of it). The number of scheduled NR-PUCCHs will be the same for all UEs in the CSI measurement DCI. The indices of these sub-frames will be signaled may be the same for all UEs in the SCI measurement DCI, or different but scheduled in the time domain according to pre-defined pattern. For example, the NR-PUCCHs of the first UE is scheduled in sub-frame 1, 5, 9; and the NR-PUCCHs of the second UE is scheduled in sub-frame 2, 6, 10; and so on.
3. If NR-PUCCHs of different UEs are scheduled in different sub-frames, the NR-PUCCH index of each UE can be the same. For example, it can be signaled implicitly from either the search space index of the group-based CSI measurement DCI or starting RB index of the RBs where the group-based CSI measurement DCI is transmitted. If NR-PUCCHs of different UEs are scheduled in the same sub-frames, the NR-PUCCH index of each UE shall be different. For example, it can be signaled implicitly from either the search space index of the group-based CSI measurement DCI plus an offset value equals to the UE's index or position in the group or starting RB index of the RBs where the group-based CSI measurement DCI is transmitted plus an offset value equals to the UE's index or position in the group.
4. CSI measurement report starting time: signaled as an timing offset from the current sub-frame, where the range of the offset value is 0 to H sub-frames. The default value of the timing offset is zero. As shown in the figures below, when the offset is set to zero, the CSI measurement can be reported as early as the PUCCH in the current sub-frame as the group-based CSI measurement DCI. CSI measurement report starting time may be the same for all UEs in the CSI measurement DCI, or different but scheduled in the time domain according to pre-defined pattern. For example, the offsets of the UEs are 1, 3, 5, . . . etc.

UE Procedures for Signaling method 2 are described below in accordance with a further embodiment as follows:

Step 1: A UE that has CSI-RS pooling resources configured by higher layer signaling will monitor downlink NR-PDCCH search spaces to detect DCI that has the format of group-based CSI measurement DCI.

Step 2: If it detects a group-based CSI measurement DCI addressed to its group RNTI or group Id (configured by higher layer signaling), then the UE will process the received CSI measurement command information.

Step 3: The UE will perform CSI measurement by processing the CSI-RS received in the resources indicated in the CSI measurement command according to the parameters in CSI-RS resource allocation field and location of RBs of these CSI-RS (optional). CSI measurement type (such as wideband CQI/PMI, etc.) is performed according to the CSI measurement configuration parameter.

Step 4: The UE will report the CSI measurement to the gNB using the parameters in the "CSI measurement reporting, physical uplink channel and timing" field. For example, the UE will transmit its CSI measurement on NR-PUCCHs scheduled by the standalone CSI measurement DCI.

The signalings described for DCI based signaling in this section can be applicable to the MAC CE based signaling as well.

It is understood that the functionality, steps, and configurations illustrated in FIGS. 1-34 may be implemented in or produced by the form of software (i.e., computer-executable instructions) stored in a memory of, and executing on a processor of, a wireless device or other apparatus (e.g., a server, gateway, device, or other computer system), such as one of those illustrated in FIGS. 36 B and F described below.

Figure 35:
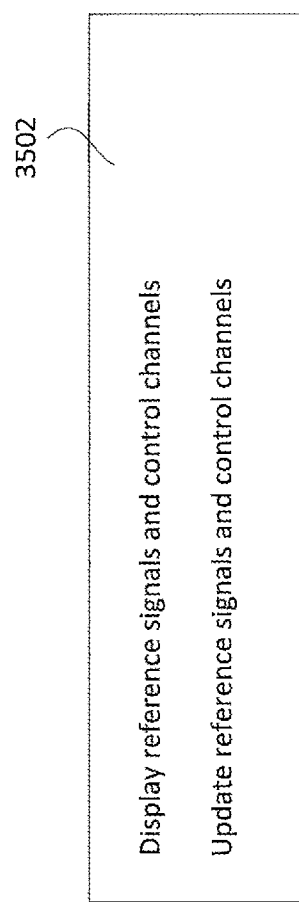
FIG. 35 is a diagram of a Graphical User Interface of one embodiment.

Interfaces, such as Graphical User Interfaces (GUIs), can be used to assist user to control and/or configure functionalities related to reference signals and control channels in NR. FIG. 35 is a diagram that illustrates an interface 3502 that allows a user to input and view parameters corresponding to reference signals and control channels in NR. It is to be understood that interface 3502 can be produced using displays such as those shown in FIGS. 36 B and F described below.

The 3rd Generation Partnership Project (3GPP) develops technical standards for cellular telecommunications network technologies, including radio access, the core transport network, and service capabilities—including work on codecs, security, and quality of service. Recent radio access technology (RAT) standards include WCDMA (commonly referred as 3G), LTE (commonly referred as 4G), and LTE-Advanced standards. 3GPP has begun working on the standardization of next generation cellular technology, called New Radio (NR), which is also referred to as "5G". 3GPP NR standards development is expected to include the definition of next generation radio access technology (new RAT), which is expected to include the provision of new flexible radio access below 6 GHz, and the provision of new ultra-mobile broadband radio access above 6 GHz. The flexible radio access is expected to consist of a new, non-backwards compatible radio access in new spectrum below 6 GHz, and it is expected to include different operating modes that can be multiplexed together in the same spectrum to address a broad set of 3GPP NR use cases with diverging requirements. The ultra-mobile broadband is expected to include cmWave and mmWave spectrum that will provide the opportunity for ultra-mobile broadband access for, e.g., indoor applications and hotspots. In particular, the ultra-mobile broadband is expected to share a common design framework with the flexible radio access below 6 GHz, with cmWave and mmWave specific design optimizations.

3GPP has identified a variety of use cases that NR is expected to support, resulting in a wide variety of user experience requirements for data rate, latency, and mobility. The use cases include the following general categories: enhanced mobile broadband (e.g., broadband access in dense areas, indoor ultra-high broadband access, broadband access in a crowd, 50+ Mbps everywhere, ultra-low cost broadband access, mobile broadband in vehicles), critical communications, massive machine type communications, network operation (e.g., network slicing, routing, migration and interworking, energy savings), and enhanced vehicle-to-everything (eV2X) communications. Specific service and applications in these categories include, e.g., monitoring and sensor networks, device remote controlling, bi-directional remote controlling, personal cloud computing, video streaming, wireless cloud-based office, first responder connectivity, automotive ecall, disaster alerts, real-time gaming, multiperson video calls, autonomous driving, augmented reality, tactile internet, and virtual reality to name a few. All of these use cases and others are contemplated herein.

Figure 36A:
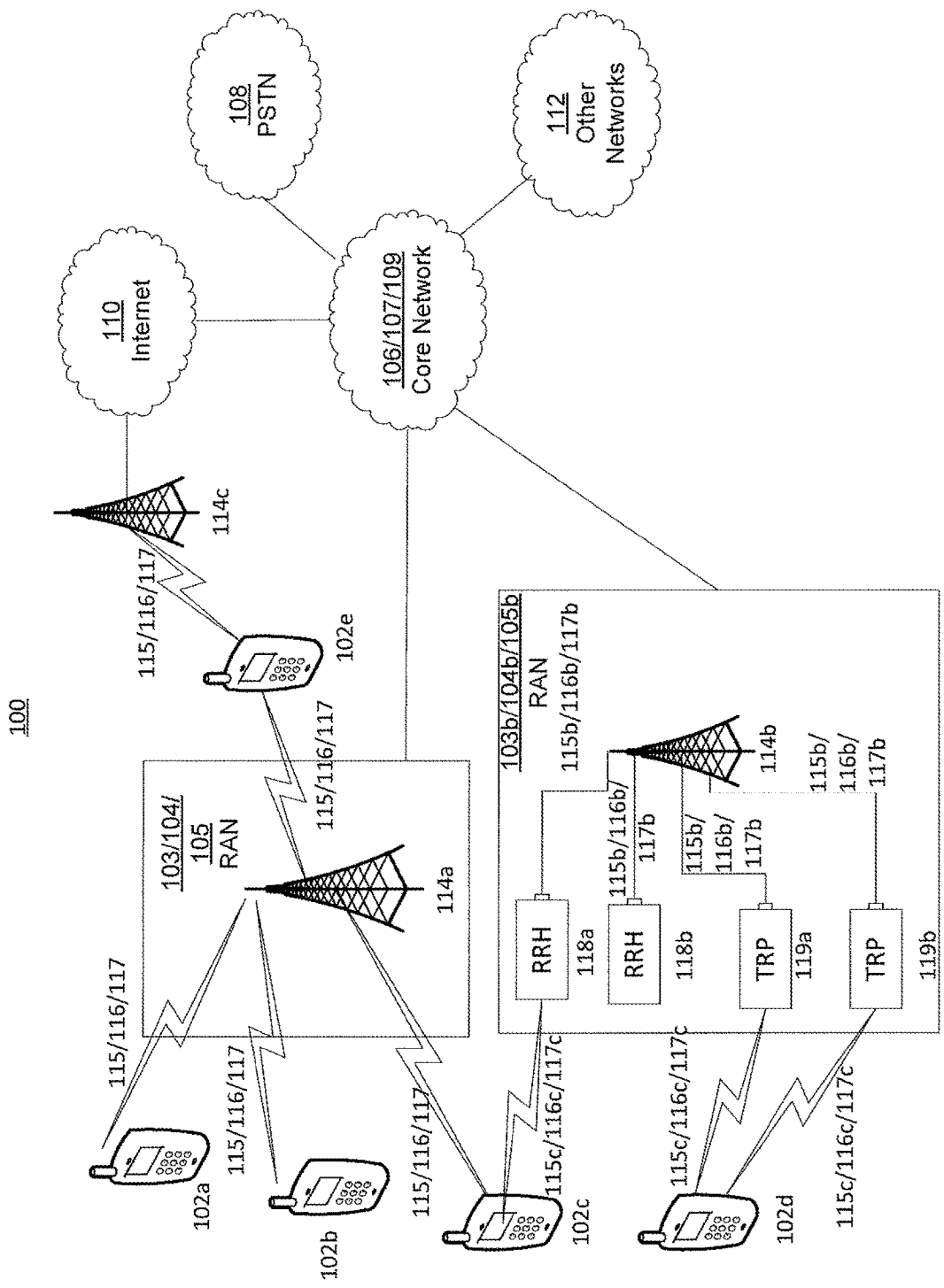
FIG. 36A illustrates one embodiment of an example communications system in which the methods and apparatuses described and claimed herein may be embodiment.

FIG. 36A illustrates one embodiment of an example communications system 100 in which the methods and apparatuses described and claimed herein may be embodied. As shown, the example communications system 100 may include wireless transmit/receive units (WTRUs) 102a, 102b, 102c, and/or 102d (which generally or collectively may be referred to as WTRU 102), a radio access network (RAN) 103/104/105/103b/104b/105b, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of apparatus or device configured to operate and/or communicate in a wireless environment. Although each WTRU 102a, 102b, 102c, 102d is depicted in FIGS. 36A-36E as a hand-held wireless communications apparatus, it is understood that with the wide variety of use cases contemplated for 5G wireless communications, each WTRU may comprise or be embodied in any type of apparatus or device configured to transmit and/or receive wireless signals, including, by way of example only, user equipment (UE), a mobile station, a fixed or mobile subscriber unit, a pager, a cellular telephone, a personal digital assistant (PDA), a smartphone, a laptop, a tablet, a netbook, a notebook computer, a personal computer, a wireless sensor, consumer electronics, a wearable device such as a smart watch or smart clothing, a medical or eHealth device, a robot, industrial equipment, a drone, a vehicle such as a car, truck, train, or airplane, and the like.

The communications system 100 may also include a base station 114a and a base station 114b. Base stations 114a may be any type of device configured to wirelessly interface with at least one of the WTRUs 102a, 102b, 102c to facilitate access to one or more communication networks, such as the core network 106/107/109, the Internet 110, and/or the other networks 112. Base stations 114b may be any type of device configured to wiredly and/or wirelessly interface with at least one of the RRHs (remote radio heads) 118a, 118b and/or TRPs (transmission and reception points) 119a, 119b to facilitate access to one or more communication networks, such as the core network 106/107/109, the Internet 110, and/or the other networks 112. RRHs 118a, 118b may be any type of device configured to wirelessly interface with at least one of the WTRUs 102c, to facilitate access to one or more communication networks, such as the core network 106/107/109, the Internet 110, and/or the other networks 112. TRPs 119a, 119b may be any type of device configured to wirelessly interface with at least one of the WTRUs 102d, to facilitate access to one or more communication networks, such as the core network 106/107/109, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114b may be part of the RAN 103b/104b/105b, which may also include other base stations and/or network elements (not shown), such as a base station controller (BSC), a radio network controller (RNC), relay nodes, etc. The base station 114a may be configured to transmit and/or receive wireless signals within a particular geographic region, which may be referred to as a cell (not shown). The base station 114b may be configured to transmit and/or receive wired and/or wireless signals within a particular geographic region, which may be referred to as a cell (not shown). The cell may further be divided into cell sectors. For example, the cell associated with the base station 114a may be divided into three sectors. Thus, in an embodiment, the base station 114a may include three transceivers, e.g., one for each sector of the cell. In an embodiment, the base station 114a may employ multiple-input multiple output (MIMO) technology and, therefore, may utilize multiple transceivers for each sector of the cell.

The base stations 114a may communicate with one or more of the WTRUs 102a, 102b, 102c over an air interface 115/116/117, which may be any suitable wireless communication link (e.g., radio frequency (RF), microwave, infrared (IR), ultraviolet (UV), visible light, cmWave, mmWave, etc.). The air interface 115/116/117 may be established using any suitable radio access technology (RAT).

The base stations 114b may communicate with one or more of the RRHs 118a, 118b and/or TRPs 119a, 119b over a wired or air interface 115b/116b/117b, which may be any suitable wired (e.g., cable, optical fiber, etc.) or wireless communication link (e.g., radio frequency (RF), microwave, infrared (IR), ultraviolet (UV), visible light, cmWave, mmWave, etc.). The air interface 115b/116b/117b may be established using any suitable radio access technology (RAT).

The RRHs 118a, 118b and/or TRPs 119a, 119b may communicate with one or more of the WTRUs 102c, 102d over an air interface 115c/116c/117c, which may be any suitable wireless communication link (e.g., radio frequency (RF), microwave, infrared (IR), ultraviolet (UV), visible light, cmWave, mmWave, etc.). The air interface 115c/116c/117c may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c, or RRHs 118a, 118b and TRPs 119a, 119b in the RAN 103b/104b/105b and the WTRUs 102c, 102d, may implement a radio technology such as Universal Mobile Telecommunications System (UMTS) Terrestrial Radio Access (UTRA), which may establish the air interface 115/116/117 or 115c/116c/117c respectively using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c, or RRHs 118a, 118b and TRPs 119a, 119b in the RAN 103b/104b/105b and the WTRUs 102c, 102d, may implement a radio technology such as Evolved UMTS Terrestrial Radio Access (E-UTRA), which may establish the air interface 115/116/117 or 115c/116c/117c respectively using Long Term Evolution (LTE) and/or LTE-Advanced (LTE-A). In the future, the air interface 115/116/117 may implement 3GPP NR technology.

In an embodiment, the base station 114a and the WTRUs 102a, 102b, 102c, or RRHs 118a, 118b and TRPS 119a, 119b in the RAN 103b/104b/105b and the WTRUs 102c, 102d, may implement radio technologies such as IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114c in FIG. 36A may be a wireless router, Home Node B, Home eNode B, or access point, for example, and may utilize any suitable RAT for facilitating wireless connectivity in a localized area, such as a place of business, a home, a vehicle, a campus, and the like. In an embodiment, the base station 114c and the WTRUs 102e, may implement a radio technology such as IEEE 802.11 to establish a wireless local area network (WLAN). In an embodiment, the base station 114c and the WTRUs 102d, may implement a radio technology such as IEEE 802.15 to establish a wireless personal area network (WPAN). In yet an embodiment, the base station 114c and the WTRUs 102e, may utilize a cellular-based RAT (e.g., WCDMA, CDMA2000, GSM, LTE, LTE-A, etc.) to establish a picocell or femtocell. As shown in FIG. 4A, the base station 114b may have a direct connection to the Internet 110. Thus, the base station 114c may not be required to access the Internet 110 via the core network 106/107/109.

The RAN 103/104/105 and/or RAN 103b/104b/105b may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication.

Although not shown in FIG. 36A, it will be appreciated that the RAN 103/104/105 and/or RAN 103b/104b/105b and/or the core network 106/107/109 may be in direct or indirect communication with other RANs that employ the same RAT as the RAN 103/104/105 and/or RAN 103b/104b/105b or a different RAT. For example, in addition to being connected to the RAN 103/104/105 and/or RAN 103b/104b/105b, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d, 102e to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 and/or RAN 103b/104b/105 or a different RAT.

Some or all of the WTRUs 102a, 102b, 102c, 102d in the communications system 100 may include multi-mode capabilities, e.g., the WTRUs 102a, 102b, 102c, 102d, and 102e may include multiple transceivers for communicating with different wireless networks over different wireless links. For example, the WTRU 102e shown in FIG. 4A may be configured to communicate with the base station 114a, which may employ a cellular-based radio technology, and with the base station 114c, which may employ an IEEE 802 radio technology.

Figure 36B:
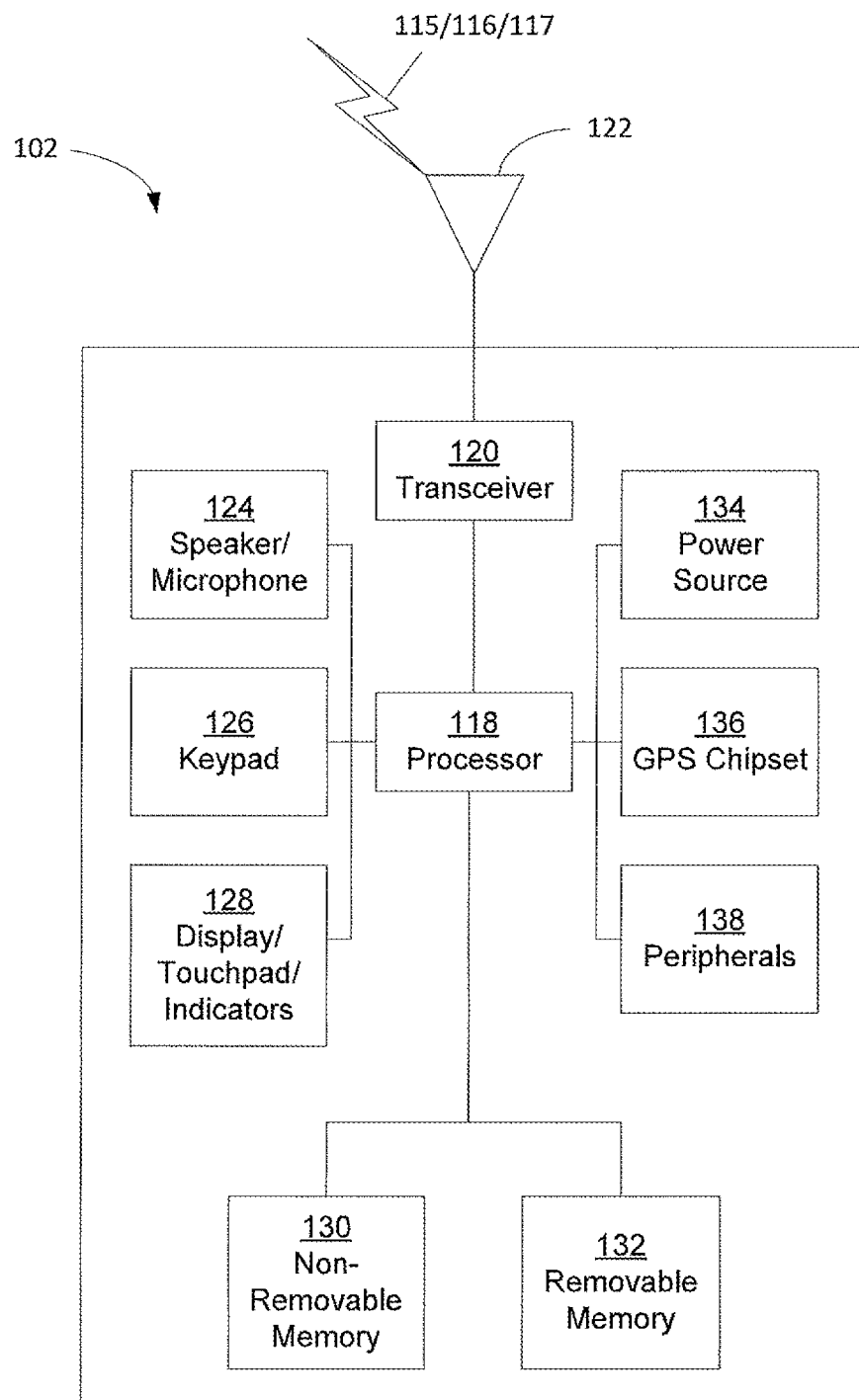
FIG. 36B is a block diagram of an example apparatus or device configured for wireless communications in accordance with the embodiments illustrated herein.

FIG. 36B is a block diagram of an example apparatus or device configured for wireless communications in accordance with the embodiments illustrated herein, such as for example, a WTRU 102. As shown in FIG. 36B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 36B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 36B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive Although not shown in FIG. 36A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, and 102d may include multiple transceivers for communicating with different wireless networks over different wireless links. For example, the WTRU 102c shown in FIG. 36A may be configured to communicate with the base station 114a, which may employ a cellular-based radio technology, and with the base station 114b, which may employ an IEEE 802 radio technology.

FIG. 36B is a block diagram of an example apparatus or device configured for wireless communications in accordance with the embodiments illustrated herein, such as for example, a WTRU 102. As shown in FIG. 36B, the example WTRU 102 may include a processor 118, a transceiver 120, a transmit/receive element 122, a speaker/microphone 124, a keypad 126, a display/touchpad/indicators 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include some or all of the elements depicted in FIG. 36B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 36B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet an embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 36B as a single element, the WTRU 102 may include any number of transmit/receive elements 122. More specifically, the WTRU 102 may employ MIMO technology. Thus, in an embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad/indicators 128 (e.g., a liquid crystal display (LCD) display unit or organic light-emitting diode (OLED) display unit). The processor 118 may also output user data to the speaker/microphone 124, the keypad 126, and/or the display/touchpad/indicators 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In an embodiment, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries, solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include various sensors such as an accelerometer, biometrics (e.g., finger print) sensors, an e-compass, a satellite transceiver, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The WTRU 102 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The WTRU 102 may connect to other components, modules, or systems of such apparatuses or devices via one or more interconnect interfaces, such as an interconnect interface that may comprise one of the peripherals 138.

Figure 36C:
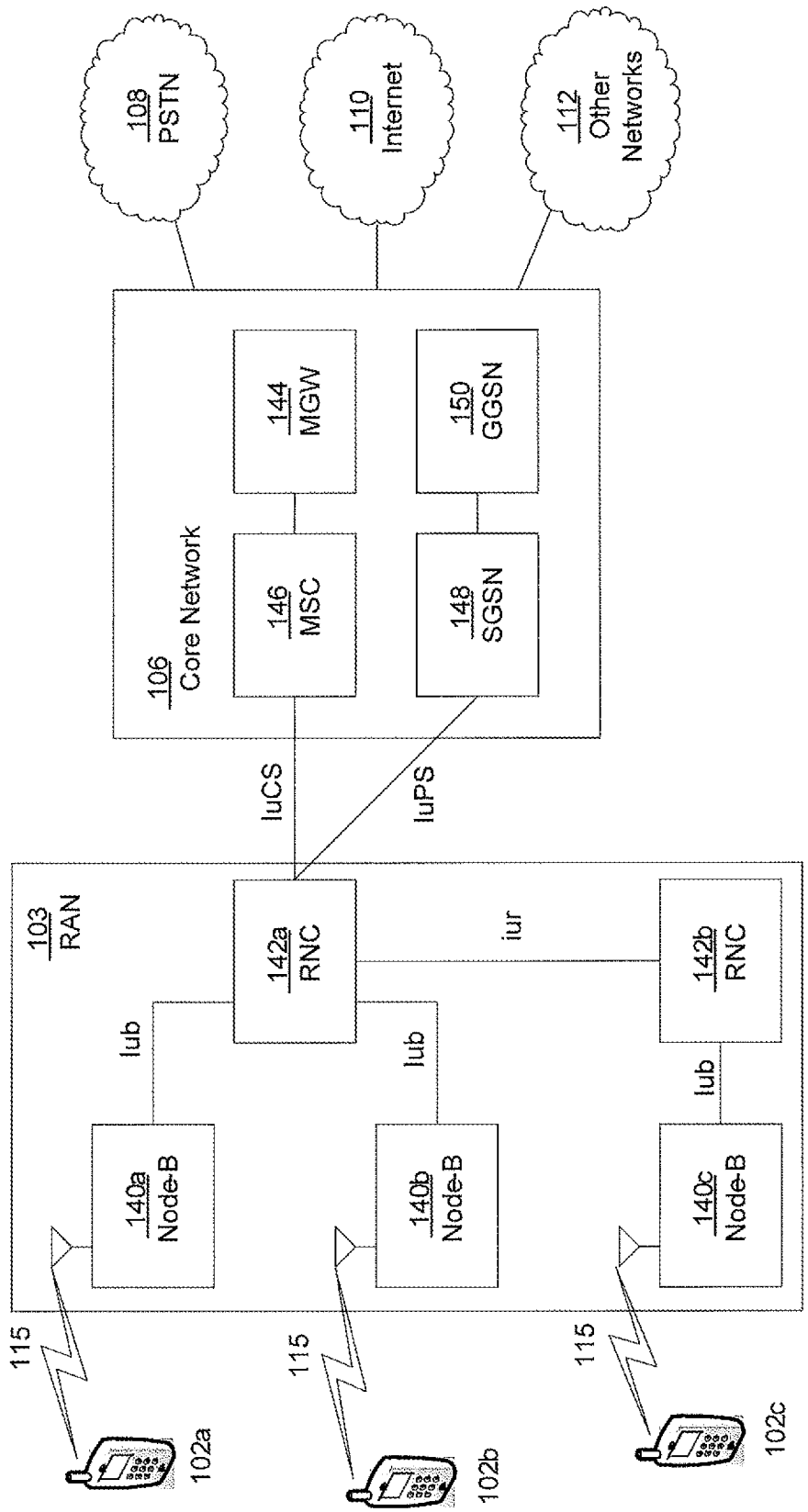
FIG. 36C is a system diagram of the RAN and the core network according to an embodiment.

FIG. 36C is a system diagram of the RAN 103 and the core network 106 according to an embodiment. As noted above, the RAN 103 may employ a UTRA radio technology to communicate with the WTRUs 102a, 102b, and 102c over the air interface 115. The RAN 103 may also be in communication with the core network 106. As shown in FIG. 36C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 4C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macro-diversity, security functions, data encryption, and the like.

The core network 106 shown in FIG. 4C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 36D:
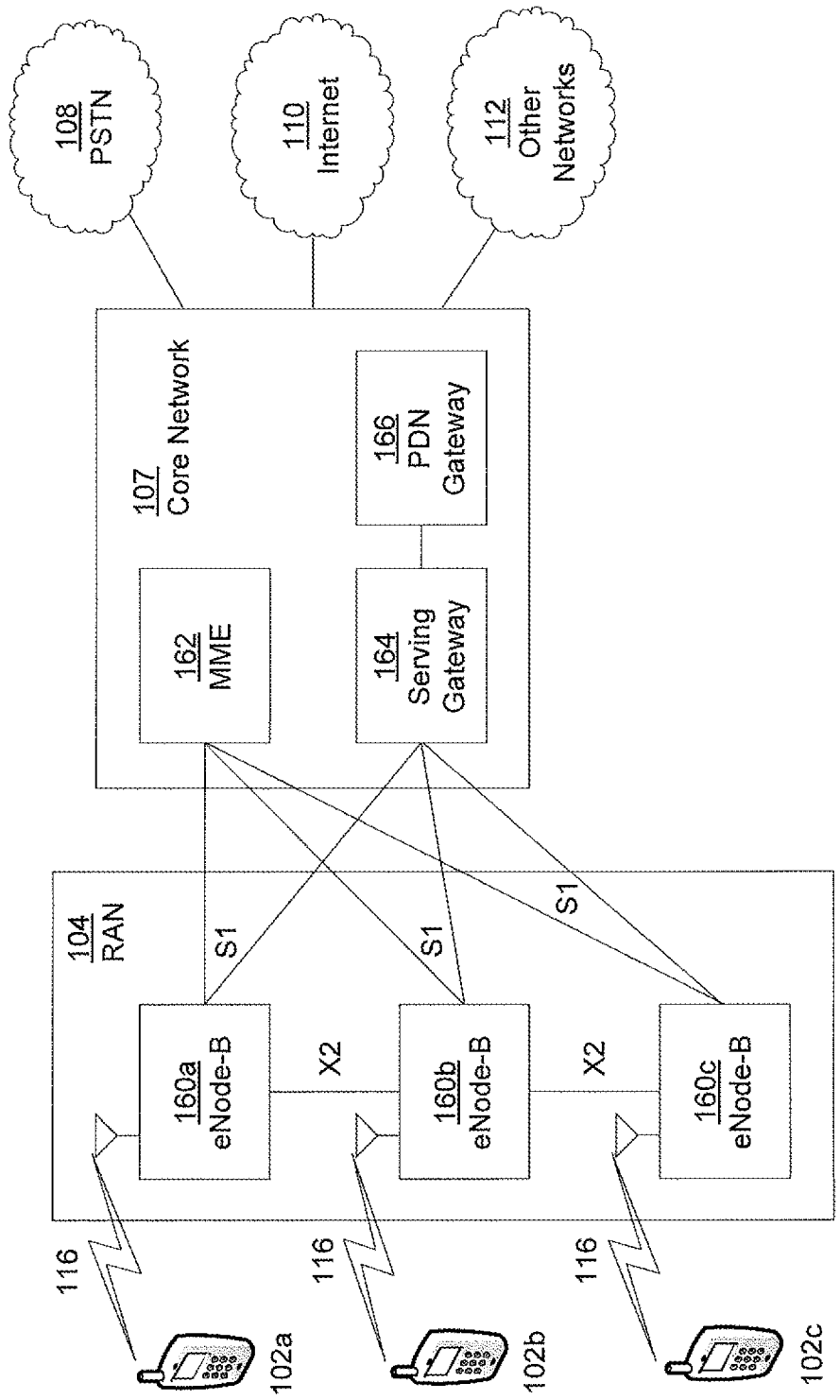
FIG. 36D is a system diagram of the RAN and the core network according to another embodiment.

FIG. 36D is a system diagram of the RAN 104 and the core network 107 according to an embodiment. As noted above, the RAN 104 may employ an E-UTRA radio technology to communicate with the WTRUs 102a, 102b, and 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 4D, the eNode-Bs 160a, 160b, 160c may communicate with one another over an X2 interface.

The core network 107 shown in FIG. 4D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, and 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 36E:
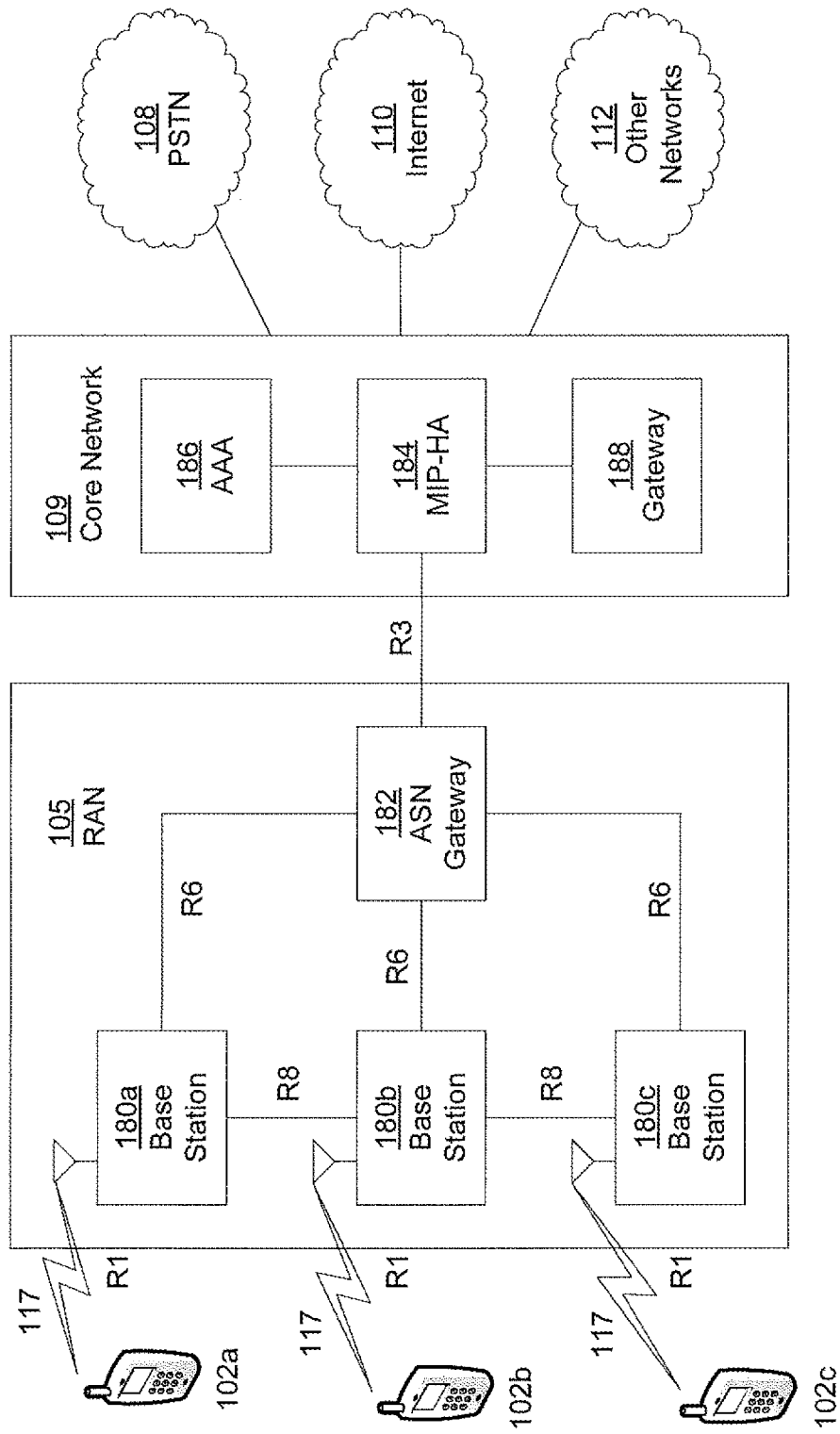
FIG. 36E is a system diagram of the RAN and the core network according to yet another embodiment.

FIG. 36E is a system diagram of the RAN 105 and the core network 109 according to an embodiment. The RAN 105 may be an access service network (ASN) that employs IEEE 802.16 radio technology to communicate with the WTRUs 102a, 102b, and 102c over the air interface 117. As will be further discussed below, the communication links between the different functional entities of the WTRUs 102a, 102b, 102c, the RAN 105, and the core network 109 may be defined as reference points.

As shown in FIG. 36E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell in the RAN 105 and may include one or more transceivers for communicating with the WTRUs 102a, 102b, 102c over the air interface 117. In an embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, and 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, and 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 36E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, and 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 36E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

The core network entities described herein and illustrated in FIGS. 36A, 36C, 36D, and 36E are identified by the names given to those entities in certain existing 3GPP specifications, but it is understood that in the future those entities and functionalities may be identified by other names and certain entities or functions may be combined in future specifications published by 3GPP, including future 3GPP NR specifications. Thus, the particular network entities and functionalities described and illustrated in FIGS. 36A, 36B, 36C, 36D, and 36E are provided by way of example only, and it is understood that the subject matter disclosed and claimed herein may be embodied or implemented in any similar communication system, whether presently defined or defined in the future.

Figure 36F:
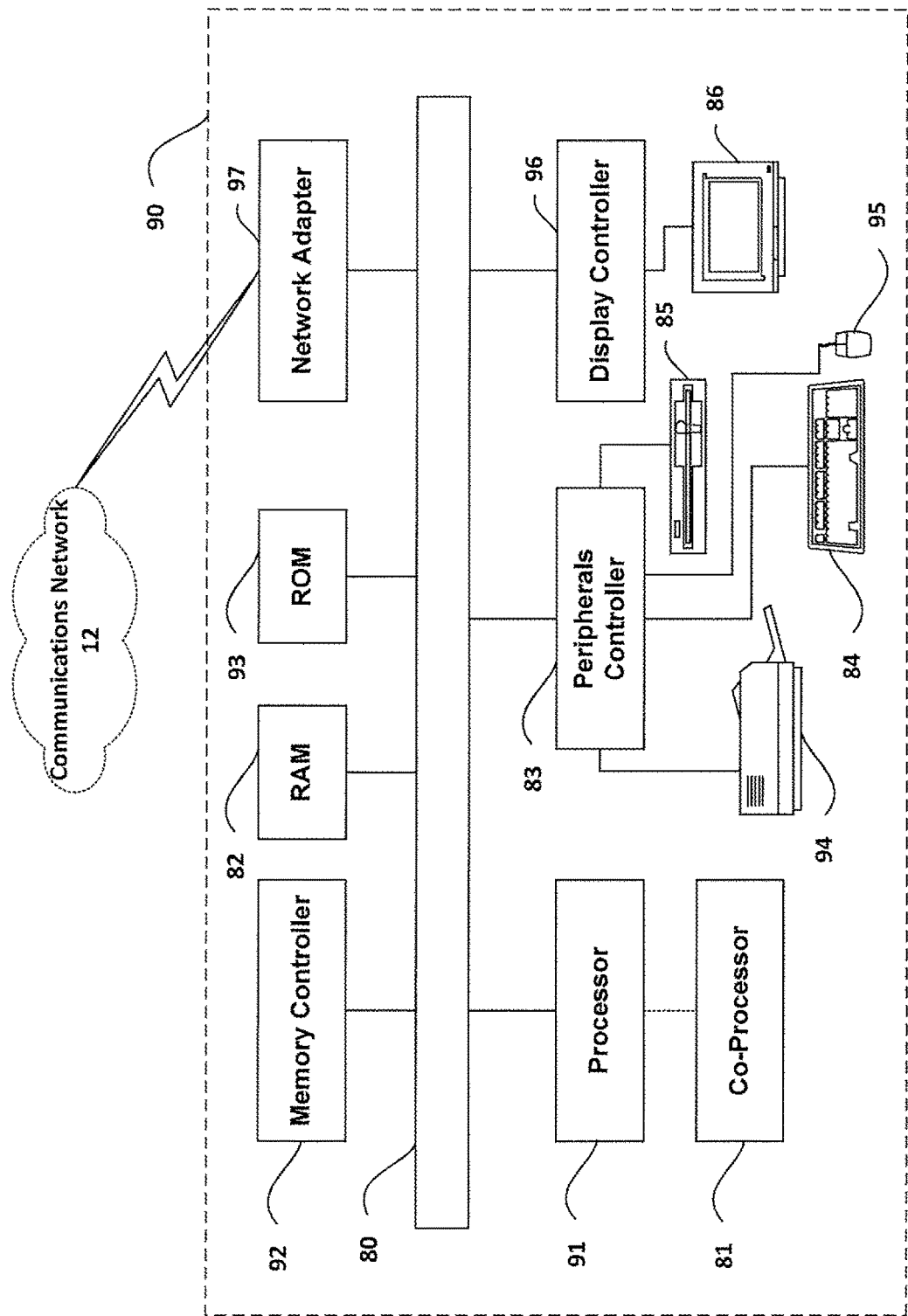
FIG. 36F is a block diagram of an exemplary computing system in which one or more apparatuses of the communications networks illustrated in FIGS. 36A, 36C, 36D and 36E may be embodied.

FIG. 36F is a block diagram of an exemplary computing system 90 in which one or more apparatuses of the communications networks illustrated in FIGS. 36A, 36C, 36D and 36E may be embodied, such as certain nodes or functional entities in the RAN 103/104/105, Core Network 106/107/109, PSTN 108, Internet 110, or Other Networks 112. Computing system 90 may comprise a computer or server and may be controlled primarily by computer readable instructions, which may be in the form of software, wherever, or by whatever means such software is stored or accessed. Such computer readable instructions may be executed within a processor 91, to cause computing system 90 to do work. The processor 91 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 91 may perform signal coding, data processing, power control, input/output processing, and/or any other functionality that enables the computing system 90 to operate in a communications network. Coprocessor 81 is an optional processor, distinct from main processor 91, that may perform additional functions or assist processor 91. Processor 91 and/or coprocessor 81 may receive, generate, and process data related to the methods and apparatuses disclosed herein.

In operation, processor 91 fetches, decodes, and executes instructions, and transfers information to and from other resources via the computing system's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by processor 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from processor 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. The visual output may be provided in the form of a graphical user interface (GUI). Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adapter 97, that may be used to connect computing system 90 to an external communications network, such as the RAN 103/104/105, Core Network 106/107/109, PSTN 108, Internet 110, or Other Networks 112 of FIGS. 36A, 36B, 36C, 36D, and 36E, to enable the computing system 90 to communicate with other nodes or functional entities of those networks. The communication circuitry, alone or in combination with the processor 91, may be used to perform the transmitting and receiving steps of certain apparatuses, nodes, or functional entities described herein.

It is understood that any or all of the apparatuses, systems, methods and processes described herein may be embodied in the form of computer executable instructions (e.g., program code) stored on a computer-readable storage medium which instructions, when executed by a processor, such as processors 118 or 91, cause the processor to perform and/or implement the systems, methods and processes described herein. Specifically, any of the steps, operations or functions described herein may be implemented in the form of such computer executable instructions, executing on the processor of an apparatus or computing system configured for wireless and/or wired network communications. Computer readable storage media include volatile and nonvolatile, removable and non-removable media implemented in any non-transitory (e.g., tangible or physical) method or technology for storage of information, but such computer readable storage media do not includes signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which can be used to store the desired information and which can be accessed by a computing system.

The invention claimed is:

1. An apparatus comprising:
a non-transitory memory including instructions stored thereon for configuring a wireless transmit/receive unit (WTRU); and
a processor operably coupled to the non-transitory memory configured to execute the instructions of:
sending configuration information indicating a set of channel state information interference channel measurement (CSI-ICM) resources and channel state information reference signal (CSI-RS) resources to the WTRU via radio resource control (RRC) signaling;
sending downlink control information (DCI) indicating a subset of CSI-ICM resources of the set of CSI-ICM resources to the WTRU;
receiving, from the WTRU, feedback based on a measurement of the subset of CSI-ICM resources; and
transmitting, to the WTRU, a MAC control element (CE) indicating an activation of a CSI report, wherein the CSI report includes feedback based on a measurement of the CSI-RS resources.

2. The apparatus of claim 1, wherein the CSI-ICM resources are based upon information selected from any one of a Group identification (ID), a CSI-ICM resources indication, a CSI-ICM feedback indication, a CSI-RS resource indication, a CSI-IM resource indication, a CSI feedback configuration, an index information of the one WTRU in the group, uplink resources of the WTRUs, and combinations thereof.

3. The apparatus of claim 1, wherein the feedback is based upon a channel-quality indication (CQI).

4. The apparatus of claim 3, wherein the feedback is based upon a rank indication (RI) and/or a precoder Matrix indication (PMI).

5. The apparatus of claim 1, wherein the feedback comprises information indicating one or more of the interference measurement, eigenvectors of the interference channel according to the largest eigenvalues, and a covariance matrix of the interference channel.

6. The apparatus of claim 1, wherein the configuration information indicates a period and an offset for the set of CSI-ICM resources.

7. The apparatus of claim 1, wherein the configuration information indicates all available channel state information reference signals (CSI-RSs) and the CSI-ICM resources used for the interference measurement.

8. A wireless transmit/receive unit (WTRU) comprising:
a non-transitory memory including instructions stored thereon; and
a processor operably coupled to the non-transitory memory configured to execute the instruction including:
receiving, from a base station, configuration information indicating a set of channel state information interference channel measurement (CSI-ICM) resources for the WTRU, where the configuration information indicates a period and an offset for the set of CSI-ICM resources;
receiving, from the base station, downlink control information indicating a subset of the set of (CSI-ICM) resources;
measuring the subset of CSI-ICM resources, where the subset of CSI-ICM resources is based on the indicated period and the offset for the set of CSI-ICM resources;
transmitting, to the base station, feedback based on the subset of CSI-ICM resources; and
receiving, from the base station, a MAC control element (CE) indicating an activation of a CSI report, wherein the CSI report includes feedback based on a measurement of CSI reference signal (CSI-RS) resources.

9. The WTRU of claim 8, wherein the CSI-ICM resources are based upon information selected from any one of a Group identification (ID), a CSI-ICM resources indication, a CSI-ICM feedback indication, a CSI-RS resource indication, a CSI-IM resource indication, a CSI feedback configuration, an index information of the WTRU in the group, uplink resources of the WTRUs in the group, and combinations thereof.

10. The WTRU of claim 8, wherein the feedback is based upon a channel quality indication (CQI).

11. The WTRU of claim 10, wherein the feedback is based upon a precoder matrix indication (PMI) and/or a rank indication (RI).

12. The WTRU of claim 8, wherein the feedback comprises information indicating one or more of an interference measurement, eigenvectors of the interference channel according to the largest eigenvalues, and a covariance matrix of the interference channel.

13. The WTRU of claim 8, wherein the received downlink control information indicates all available channel state interference reference signals (CSI-RSs) and the CSI-ICM resources used for the interference.

14. A method comprising:
receiving, from a base station, configuration information indicating a set of channel state information interference channel measurement (CSI-ICM) resources for a wireless transmit/receive unit (WTRU), where the configuration information indicates a period and an offset for the set of CSI-ICM resources;
receiving, from the base station, downlink control information indicating a subset of the set of (CSI-ICM) resources;
measuring the subset of CSI-ICM resources, where the subset of CSI-ICM resources is based on the indicated period and the offset for the set of CSI-ICM resources;
sending, to the base station, feedback based on the measured subset of CSI-ICM resources; and
receiving, from the base station, a MAC control element (CE) indicating an activation of a CSI report, wherein the CSI report includes feedback based on a measurement of CSI reference signal (CSI-RS) resources.

15. The method of claim 14, wherein the CSI-ICM resources are based upon information selected from any one of a Group identification (ID), a CSI-ICM resources indication, a CSI-ICM feedback indication, a CSI-RS resource indication, a CSI-IM resource indication, a CSI feedback configuration, an index information of the WTRUs in the group, uplink resources of the WTRU, and combinations thereof.

16. The method of claim 14, wherein the feedback is based upon a channel quality indication (CQI), precoder matrix indication, and rank indication.

17. The method of claim 16, wherein the feedback is based upon a rank indication (RI) and/or a precoder Matrix indication (PMI).

18. The method of claim 14, wherein the feedback comprises information indicating one or more of an interference measurement, eigenvectors of the interference channel according to the largest eigenvalues, and a covariance matrix of the interference channel.

19. The apparatus of claim 1, the MAC CE indicates a deactivation of the CSI report.

20. The WTRU of claim 8, wherein the MAC CE indicates a deactivation of the CSI report.

21. The method of claim 14, wherein the MAC CE indicates a deactivation of the CSI report.

* * * * *

UNITED STATES PATENT AND TRADEMARK OFFICE
CERTIFICATE OF CORRECTION

| | |
|---|---|
| PATENT NO. | : 11,877,308 B2 |
| APPLICATION NO. | : 17/870284 |
| DATED | : January 16, 2024 |
| INVENTOR(S) | : Lakshmi R. Iyer et al. |

It is certified that error appears in the above-identified patent and that said Letters Patent is hereby corrected as shown below:

On the Title Page

Item [72], delete "Salam Khan" and insert -- Salman Khan --.

Signed and Sealed this
Thirtieth Day of July, 2024

Katherine Kelly Vidal
*Director of the United States Patent and Trademark Office*